(12) United States Patent
Funamura et al.

(10) Patent No.: US 10,683,677 B1
(45) Date of Patent: Jun. 16, 2020

(54) INTELLIGENT DOOR LOCK SYSTEM FOR USE WITH A DOOR ASSEMBLY

(71) Applicant: Otto LLC, San Mateo, CA (US)

(72) Inventors: Joshua Funamura, San Francisco, CA (US); Nicolas Pedro Lylyk, Palo Alto, CA (US); Patrick Kessler, San Francisco, CA (US); Eric Jadallah, Hillsborough, CA (US); Jordan Fountain, San Jose, CA (US); Robert Sean Murphy, Sunnyvale, CA (US); Phillip Satterfield, San Francisco, CA (US); Greg Springer, Los Altos, CA (US); David Morgenstern, Los Altos, CA (US)

(73) Assignee: Otto LLC, San Mateo, CA (US)

( * ) Notice: Subject to any disclaimer, the term of this patent is extended or adjusted under 35 U.S.C. 154(b) by 293 days.

(21) Appl. No.: 15/354,994

(22) Filed: Nov. 17, 2016

Related U.S. Application Data

(60) Provisional application No. 62/256,637, filed on Nov. 17, 2015.

(51) Int. Cl.
*E05B 9/02* (2006.01)
*E05B 47/00* (2006.01)
(Continued)

(52) U.S. Cl.
CPC ............ *E05B 9/02* (2013.01); *E05B 17/0075* (2013.01); *E05B 17/0083* (2013.01);
(Continued)

(58) Field of Classification Search
CPC .... E05B 9/02; E05B 17/0075; E05B 17/0083; E05B 17/10; E05B 41/00; E05B 45/00; E05B 47/0012; E05B 53/008; E05B 2047/0048; E05B 2047/0097; F16H 19/001; G07C 9/00309; G07C 2009/00769; G08B 5/26
(Continued)

(56) References Cited

U.S. PATENT DOCUMENTS 2,829,913 A * 4/1958 North ................... E05B 55/005
235/60 MT
5,873,276 A * 2/1999 Dawson ............. G07C 9/00912
340/5.54
(Continued)

*Primary Examiner* — Suzanne L Barrett
(74) *Attorney, Agent, or Firm* — Nelson Mullins Riley & Scarborough LLP; Anthony A. Laurentano

(57) ABSTRACT

An intelligent door lock system that permits both electronic and manual control of a deadbolt. The door lock system can include an inner bezel assembly, an outer bezel assembly, and a deadbolt assembly, where the deadbolt assembly can be coupled to the outer bezel assembly via a twist-lock feature. The inner bezel assembly also includes a puck assembly that seats within an inner bezel. The puck assembly can be retained within or released from the inner bezel via a latch assembly. The outer bezel assembly includes a display assembly that seats within an outer bezel. The outer bezel is coupled to a motor chassis assembly that includes a motor and gear assembly having a series of gears that translate movement of dial elements or a motor into movement of a bolt element between locked and unlocked positions.

16 Claims, 66 Drawing Sheets

(51) Int. Cl.
  *E05B 53/00* (2006.01)
  *E05B 41/00* (2006.01)
  *E05B 45/00* (2006.01)
  *E05B 17/10* (2006.01)
  *E05B 17/00* (2006.01)
  *F16H 19/00* (2006.01)
  *G07C 9/00* (2020.01)
  *G08B 5/36* (2006.01)

(52) U.S. Cl.
  CPC .............. *E05B 17/10* (2013.01); *E05B 41/00* (2013.01); *E05B 45/00* (2013.01); *E05B 47/0012* (2013.01); *E05B 53/008* (2013.01); *F16H 19/001* (2013.01); *E05B 2047/0048* (2013.01); *E05B 2047/0097* (2013.01); *G07C 9/00309* (2013.01); *G07C 2009/00769* (2013.01); *G08B 5/36* (2013.01)

(58) Field of Classification Search
  USPC .............................. 70/278.1–287.7; 340/5.26
  See application file for complete search history.

(56) References Cited

U.S. PATENT DOCUMENTS

| | | | | |
|---|---|---|---|---|
| 5,933,086 A * | 8/1999 | Tischendorf | ........ | E05B 47/0661 340/12.22 |
| 6,116,066 A * | 9/2000 | Gartner | ................. | E05B 41/00 292/348 |
| 6,651,468 B2 * | 11/2003 | Aramburu | ............ | E05B 13/005 70/189 |
| 7,389,661 B2 * | 6/2008 | Viviano | ................ | E05B 55/005 70/190 |
| 7,748,244 B2 * | 7/2010 | Garza | ................ | E05B 63/0017 292/166 |
| 7,963,134 B2 * | 6/2011 | Rafferty | ................ | E05B 13/00 192/69.8 |
| 8,011,217 B2 * | 9/2011 | Marschalek | ........ | E05B 47/0011 70/149 |
| 9,487,971 B2 * | 11/2016 | Quach | ................ | E05B 47/0012 |
| 9,528,294 B2 * | 12/2016 | Johnson | ............ | G07C 9/00174 |
| 9,916,746 B2 * | 3/2018 | Johnson | ........... | G08B 13/19695 |
| 2002/0056300 A1 * | 5/2002 | Pierre | ................ | E05B 47/0688 70/303 A |
| 2006/0114099 A1 * | 6/2006 | Deng | ................ | G07C 9/00563 340/5.53 |
| 2010/0011822 A1 * | 1/2010 | Imedio Ocana | .... | E05B 47/0615 70/278.7 |
| 2010/0257906 A1 * | 10/2010 | Sorensen | ............. | E05B 47/068 70/91 |
| 2011/0259059 A1 * | 10/2011 | Wu | ..................... | E05B 47/0012 70/91 |
| 2011/0265527 A1 * | 11/2011 | Saari | ................ | E05B 47/0011 70/91 |
| 2011/0291428 A1 * | 12/2011 | Milton-Benoit | .... | E05B 47/0692 292/228 |
| 2013/0192318 A1 * | 8/2013 | Yanar | ................ | E05B 47/0012 70/279.1 |
| 2014/0109633 A1 * | 4/2014 | Romero | ............. | E05B 47/0684 70/133 |
| 2015/0096341 A1 * | 4/2015 | Overgaard | ............. | E05B 47/02 70/283.1 |
| 2016/0049025 A1 * | 2/2016 | Johnson | ................ | H04W 4/80 340/5.61 |
| 2016/0343181 A1 * | 11/2016 | Cheng | ................ | G07C 9/00007 |

* cited by examiner

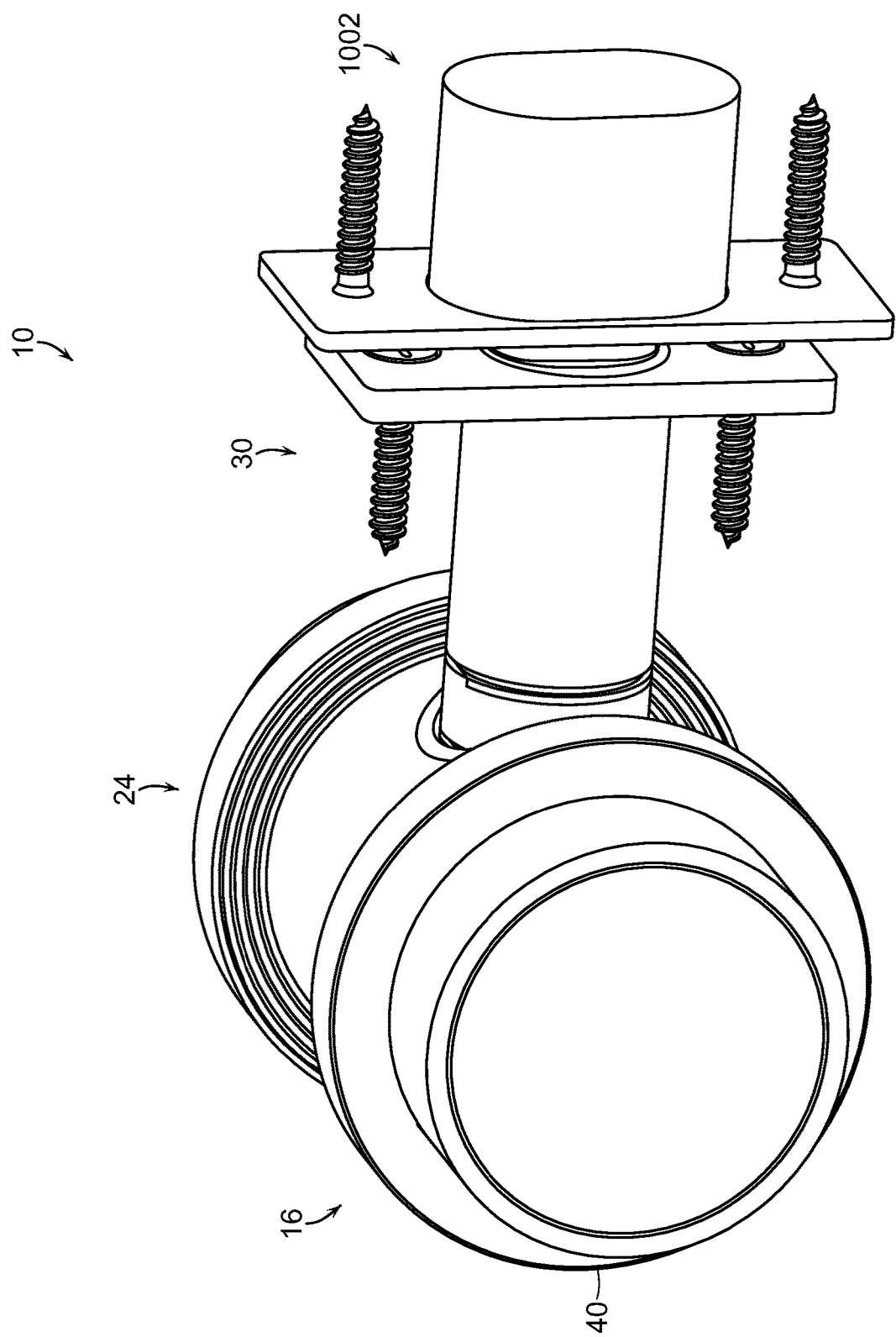

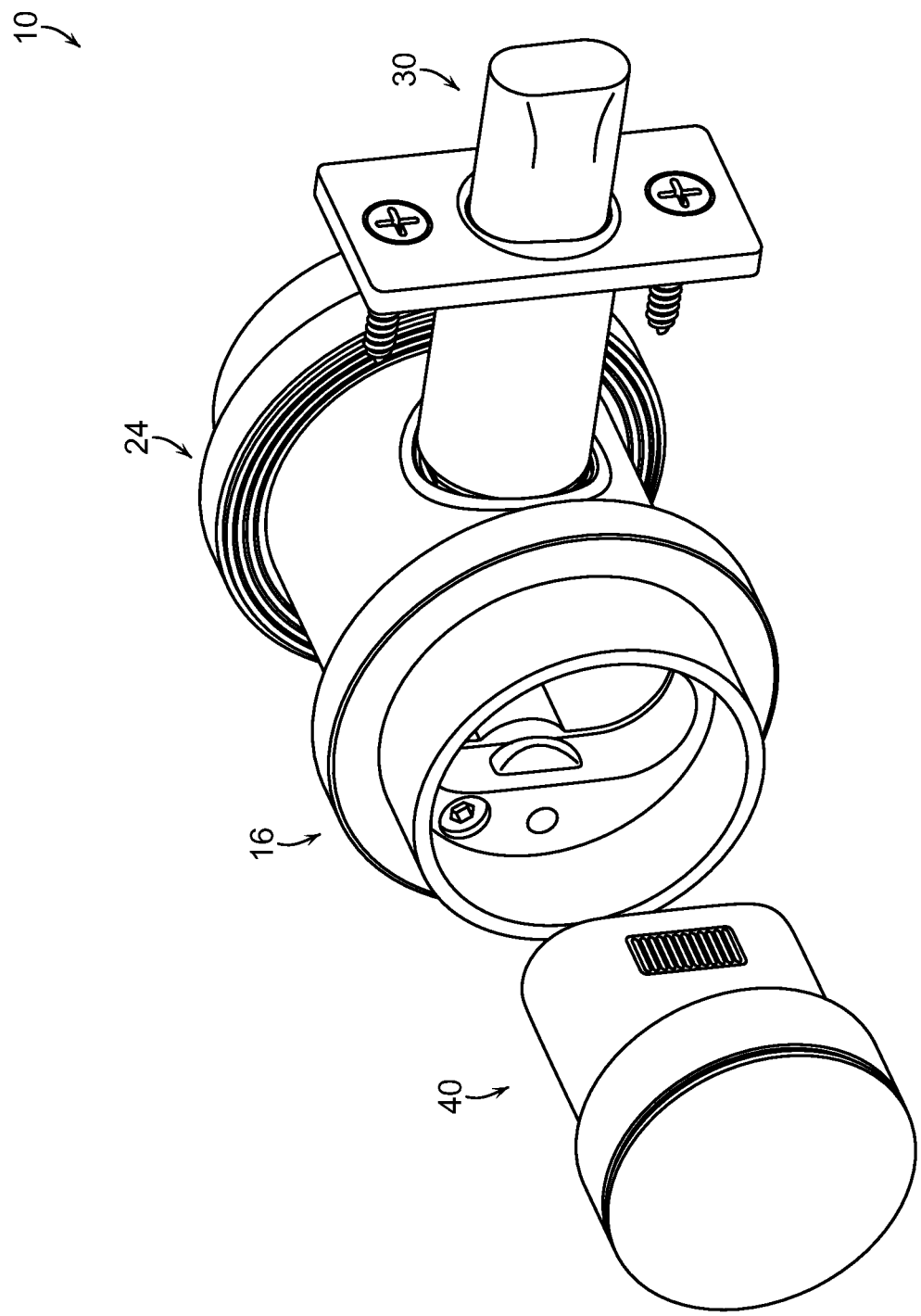

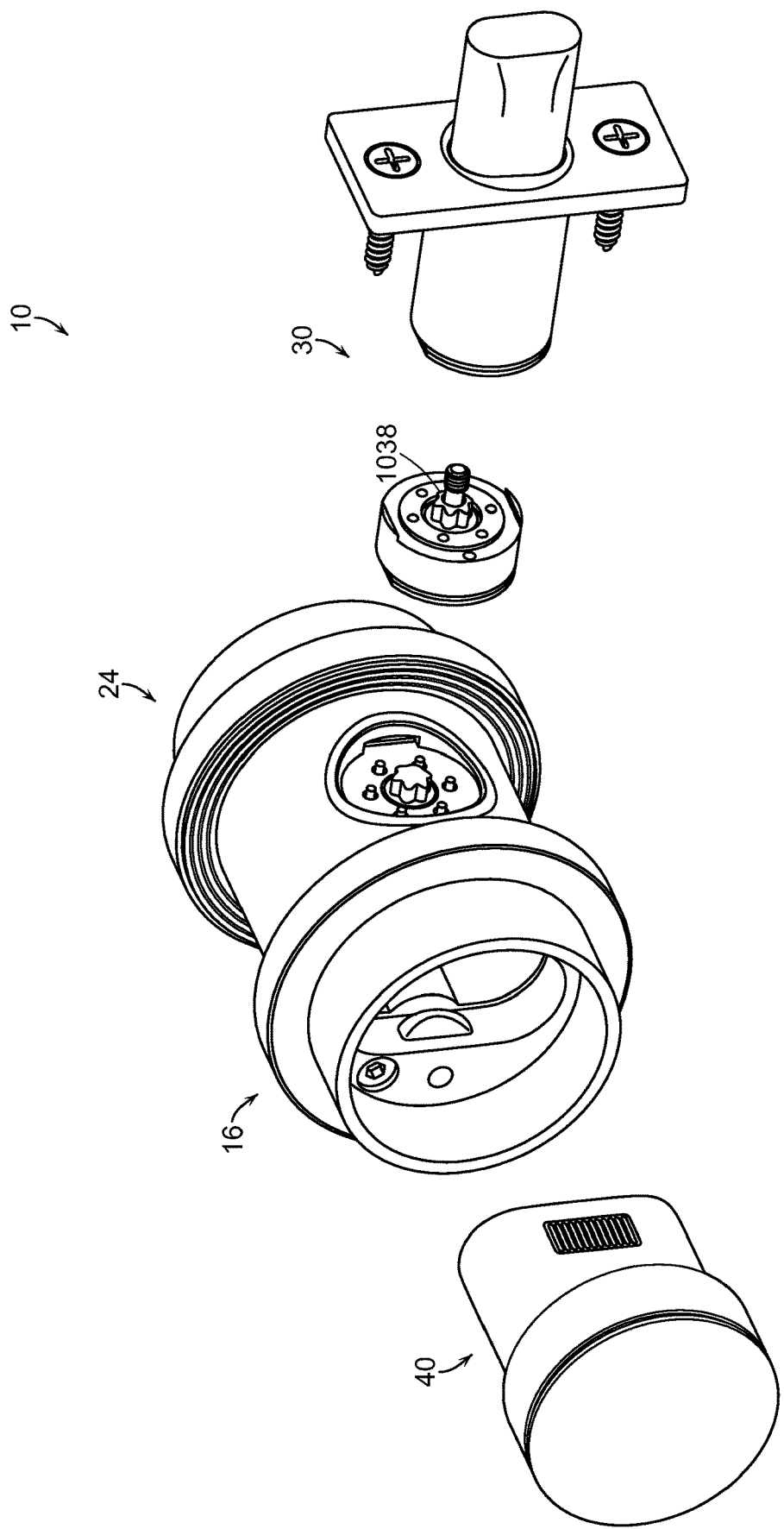

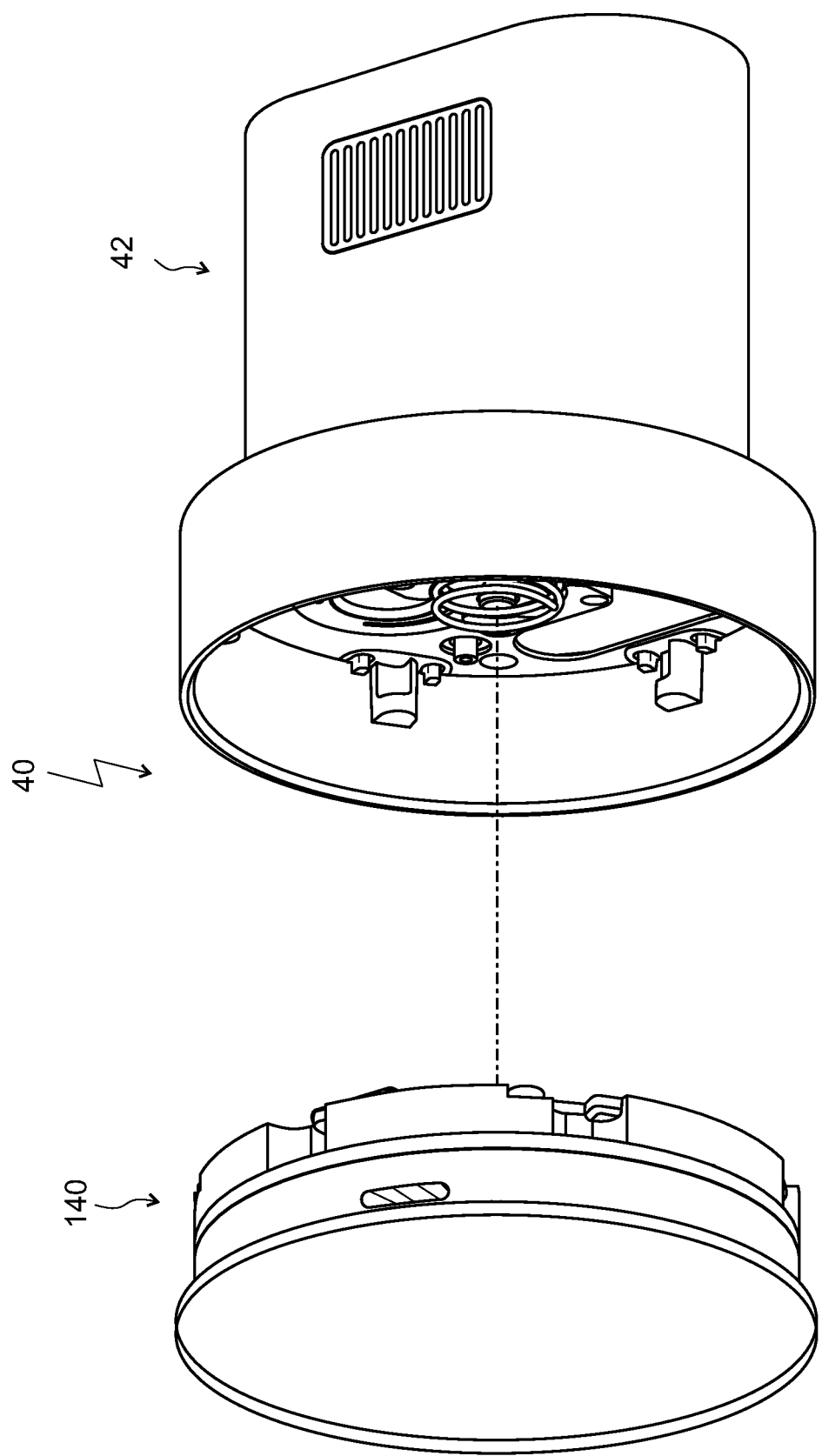

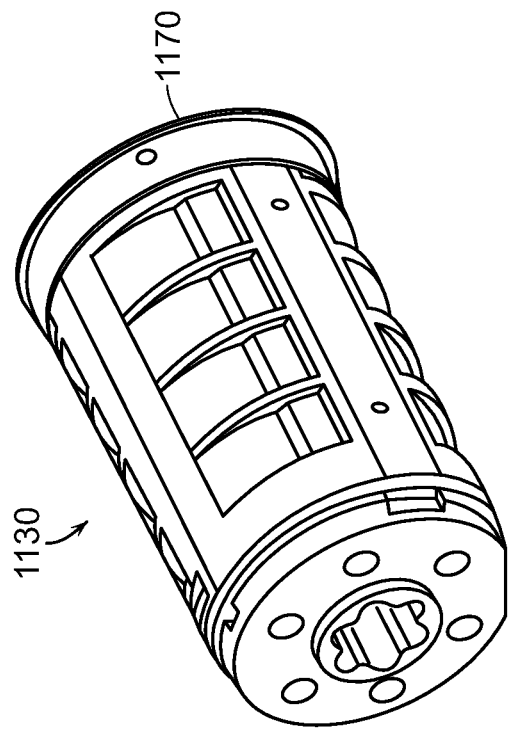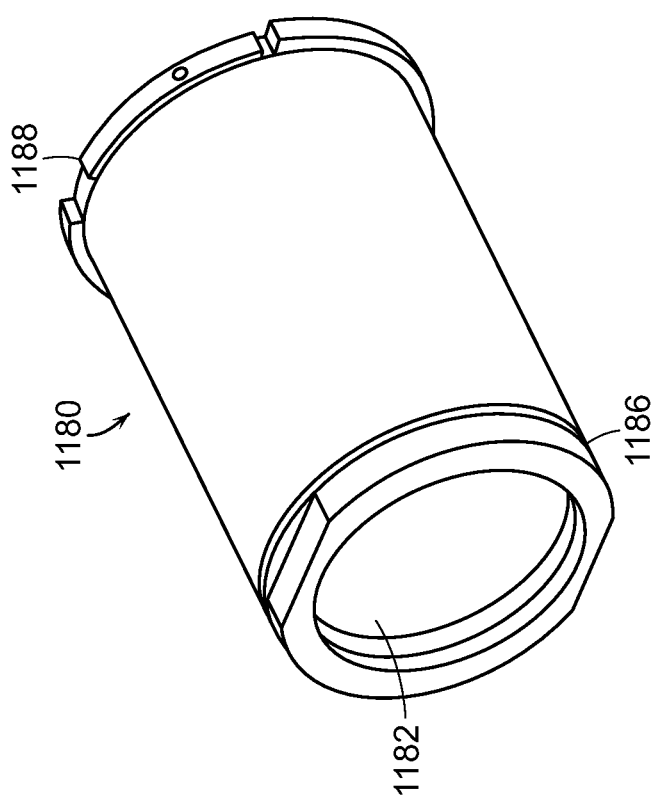
FIG. 48

US 10,683,677 B1

INTELLIGENT DOOR LOCK SYSTEM FOR USE WITH A DOOR ASSEMBLY

RELATED APPLICATION

The present application is related to U.S. provisional patent application Ser. No. 62/256,637, entitled Intelligent Door Lock System For Use With A Door Assembly, filed on Nov. 17, 2015, the contents of which are herein incorporated by reference.

FIELD OF THE INVENTION

The present invention relates generally to intelligent door lock systems, and more particularly relates to an intelligent, electronic dead bolt assembly for use with a door assembly.

BACKGROUND OF THE INVENTION

As is known in the art, mechanically and electro-mechanically operated door assemblies serve an important function at both commercial and residential sites, ensuring that personnel and/or visitors who are not authorized to access the particular premises are restricted from such access, while concomitantly providing access to authorized parties. Either an unauthorized access or an unintended refusal of access can have financial consequences and/or cause delay and disruption in service or result in unwanted inconvenience. Thus, when conditions and/or persons having physical access to a dwelling or restricted items within the dwelling change dynamically, access management becomes an important priority.

The use of electronic and/or mechanical door locking systems for the control and operation of the door is becoming increasingly commonplace. One such known device is a conventional dead bolt assembly employing solely mechanical components. As is known in the art, a typical single cylinder dead bolt assembly has an exterior cylinder lock that typically accepts a key to actuate the internal bolt mechanism and an interior manual twist knob that is also used to actuate the bolt mechanism. The cylinder lock and the manual knob are both centrally located and are directly coupled with the deadbolt mechanism. In double cylinder assemblies, the deadbolt accepts a key on both sides and therefore does not require and often does not have any twist knob.

Current electronic dead bolt assemblies closely follow the above construction in that there is typically an outer or exterior cylinder lock and an interior manual knob augmented with a secondary motor drive and possibly an input device for entering selected information, such as a PIN. A disadvantage of this prior art configuration is that it compels current electronic lock manufacturers to create additional "real-estate" in the lock assembly to accommodate the additional structure that is necessary to operate the electronic door lock. Consequently, the prior art devices are quite large and hence conspicuous when mounted on the door assembly, thus affecting the overall aesthetic appeal of the room, while concomitantly providing limited operational functionality.

Many other known security devices and systems for use in securing access to a facility also require passwords, key codes, biometric data or other inputs to allow a user to control or access such a device or system. Such devices and systems often employ a local control panel or proprietary control software that is run on a local computer or web server. Each device or system has its own hardware or software control interface. As a result of the disparate control systems and separate methods for granting permissions, it is often inconvenient for a user or administrator to access, program and control each security device or system efficiently. Furthermore, self-contained, on-site security systems or devices can be compromised or malfunction without being able to issue notification to an interested party.

SUMMARY OF THE INVENTION

In light of the foregoing disadvantages, there is a need in the art for a door lock system that is easy to mount and use, is aesthetically pleasing when mounted to the door panel, and provides sufficient operational functionality and access control.

The present invention is directed to an intelligent door lock system that permits both electronic (motor) and manual control of a deadbolt or lock. Specifically, the system of the present invention allows for the manual operation of the lock to be independent of the electronic or motor drive operation of the lock. The lock of the present invention is useful in situations where an electronic controller is temporarily unavailable, for example, where a controller has been lost, misplaced or damaged. The various and numerous features mentioned below and through out this application form the basis, either separately or in various combinations with each other, of the present invention.

According to one feature, the door lock system of the present invention can include an inner bezel assembly 16, an outer bezel assembly 24, and a deadbolt assembly 30, where the deadbolt assembly 30 can be coupled to the outer bezel assembly either directly or through an extension component 1038. The extension component and/or the deadbolt assembly can be coupled to the outer bezel assembly via a twist-lock feature. As used herein, the term "twist-lock" is intended to include any selected structural component and/or combination of surface features, such as either protrusions or cuts formed in a surface, which allows a first component to connect to a second component and to be secured thereto by twisting the first component relative to the second component. Broadly stated, one or more surface features are formed on the first component and one or more surface features are formed on the second component that allow the components to initially engage with each other and to seat the first component on the second component, and then when the components are twisted or turned relative to each other, securely coupling or connecting together the components. Examples of suitable twist-lock features include combinations of flats and one or more spiral grooves or threads formed on the first and/or second components, to allow the components to engage with each other via the flats and to be secured to each other by twisting the first components to allow the threads to engage each other. Other twist lock designs can include posts and grooves, where posts are formed on the second component and selected configurations of grooves are formed on the first component that are shaped to first seat the post and then when the first component is twisted to move the post further into a groove to secure the first and second components together. The use of the extension component allows the deadbolt assembly 30 to accommodate doors having different size setback features.

The door lock system of the present invention can include an outer bezel assembly 24 that includes an outer bezel 420 and a motor chassis assembly 520. The outer bezel is adapted to be mounted to an exterior side of a door panel and a sealing element 546 is coupled to a back or rear surface of the outer bezel and is configured to seat between the door panel and the outer bezel so as to provide a weather-tight seal. Specifically, the outer bezel 420 includes a display assembly 422 and a bezel assembly 424, where the display assembly is adapted to mount within a central chamber or opening 602 formed in the bezel assembly 424. The bezel assembly 424 includes a security plate 550 and a dial element 600. The dial element can be coupled to the security plate by any known manner, such as through fasteners or other structural components, such as gear rings and the like. The security plate 550 has a rear surface 554 that mounts the sealing element 546.

According to another feature of the present invention, the security plate 550 also mounts to the rear surface 554 plural posts or stand-off elements 582 that provide selected functionality. For example, the stand-offs 582 allow the outer bezel 420 to be coupled to the motor chassis assembly 520, while also providing when coupled to the inner bezel assembly 16 a selected degree of movement of the inner bezel assembly relative to the outer bezel assembly to accommodate doors of varying thicknesses.

According to still another feature of the present invention, the inner bezel assembly of the door lock system 10 includes an inner bezel 220 and a puck assembly 40 that mounts a power source, such as one or more batteries. The inner bezel 220 includes a central opening 224/318 that is sized and configured for seating the puck assembly. The puck assembly 40 includes a display assembly 140 that is mounted within a central opening or chamber 66 formed in an outer housing assembly 42. The puck assembly also includes a puck stop element 22 that interacts with a latch assembly for retaining the puck assembly within the opening of the inner bezel 220. The latch assembly 328 is movable between a deployed position where it interfaces with and engages the stop element for retaining the puck assembly 40 within the inner bezel 220, and a retracted position where the latch assembly 328 disengages from the stop element while concomitantly providing a force to move or expel the puck assembly from the inner bezel 220. The removal of the puck assembly 40 from the inner bezel 220 allows the user to service the puck assembly, such as by replacing the batteries.

According to yet another feature, the latch assembly 328 cooperates and interacts with a torque link assembly 269 to move the latch assembly between the deployed and retracted positions. The torque link assembly 269 includes a torque link 270, an ejector spring 274, an ejector element 278, a latch cam 284, and an ejection ramp 290. The latch assembly 328 includes a latch element 330, springs 336, and retaining plates 338. The torque link 270 is coupled to the ejection ramp 290, which in turn is coupled to the latch cam 284. The latch cam 274 interacts with one or more of the retaining plates 338 of the latch assembly 328, so that the latch cam when moved pulls on the retaining plate thus moving the latch element 330 from the normally biased deployed position (FIG. 10C) to the retracted position (FIG. 10D). The ejection ramp 290 has a slanted ramp-like groove 294 formed therein that seats the post 280 of the ejector element 278. The ejector element seats within an ejector pin opening 320 formed in the gear cover 310. When the post element 280 of the ejector element is moved along the ramp-like groove by, for example, movement of the torque link 270 that is in turn moved by rotational movement of the outer washer cover 396, the ejector element moves through and outwardly from the opening 320 to press or push against a portion of the housing of the puck assembly. The movement of the latch element into the retracted position coupled with movement of the ejector element against the puck assembly helps release the puck assembly 40 from the inner bezel 220.

According to still yet another feature of the present invention, the motor chassis assembly 520 of the outer bezel assembly 24 has formed therein a series of selected gears and power output shafts that allow the bezel assemblies to move a bolt element 1040 of the deadbolt assembly 30 between a locked position, where the bolt element 1040 extends outwardly from the deadbolt assembly and engages a strike cup assembly 1002, and an unlocked position, where the bolt element is retracted within the deadbolt assembly and hence does not engage the strike cup assembly. The motor chassis assembly 520 includes an outer housing 526 that seats or mounts a motor and gear assembly 670. The motor chassis assembly 520 includes a main housing subassembly 702 that is coupled to a motor unit subassembly 750. A spline cover assembly 728 is then coupled to the main housing assembly and the motor unit subassembly.

The motor unit subassembly 750 includes a shifter gear assembly 770, a manual output gear assembly 860, and a motor gear assembly 880. The shifter gear assembly 770 includes a set of shifter gears 780-784 that are coupled to a shifter shaft 772. The shifter shaft includes an upper housing portion 774 that mounts a shuttle element 776. The shuttle element 776 is coupled to a shifter nut assembly 800 via a collar 796 and an associated pin element 794. The shifter nut assembly is coupled to a motor 718. The motor 718 moves a lead screw 806 associated with the shifter nut assembly, which in turn moves the shuttle element 776 via the collar and pin into one of a selected number of positions depending on the handedness of the door as well a determination of whether the door lock system is operating in an emergency mode (low or no power mode). The shifter gears interface with selected gears, such as the input gears, of the manual output gear assembly 860. The rotational movement of the dial element 260 of the inner bezel assembly 16 rotationally moves a pinion gear assembly 350 that includes a pinion gear 354. The rotational movement of the pinion gear moves an associated triangular drive element 360 that interacts with and rotates an input gear 826 associated with the motor housing. The input gear 826 in turn rotates a shifter input gear 798 that is associated with the shifter shaft 772. The rotation of the shifter shaft rotates one or more selected gears of the manual output gear assembly through the shifter gears, which in turn rotates a spline gear 530. The rotational movement of the spline gear 530 moves the bolt element 1040 of the deadbolt assembly 30 between the deployed and retracted positions (locked and unlocked positions). As is clear from the above, rotational movement of the dial element 260 results in movement of the bolt element between the locked and unlocked positions.

According to another feature of the present invention, the manual output gear assembly 860 includes a manual power output shaft 872 that has a series of gears mounted thereon. The manual power output shaft 872 can include an outermost manual output gear 862 and innermost manual output gear 864. The outermost manual output gear 862 rotationally engages with the outermost shifter gear 780 and the innermost manual output gear 864 engages with the intermediate shifter gear 782. The manual power output shaft 872 also includes a kicker gear assembly 866, a manual output transfer gear 868, and a manual output beveled gear 870 that is adapted to rotationally engage the output spline gear 530. Separately and independently, the motor and gear assembly 670 includes a motor gear assembly 880. The motor gear assembly 880 includes a power output shaft 890 that has a motor input gear coupled thereto and which in turn is rotationally coupled to a motor shaft gear 764 of the primary motor 752. The shaft 890 also mounts a cam gear 884, a power shat transfer gear 886, and a power transfer gear 888. The motor input gear 882 includes a spring element and associated plate mounted within a chamber 882A of the gear 882. The chamber also mounts a spacer element 918 and a pin element 920 having a post 920A formed thereon that seats within a cam groove 924 formed in the cam gear 884.

According to still another feature, the kicker gear assembly 866 includes a kicker gear 896 having a wireform kicker element 900 formed thereon. The manual power output shaft 872 has an upper housing portion that mounts a kicker spring 874 and a kicker bar 876. The kicker bar 876 is sized and configured to interact with cam features 904 formed on a surface of the kicker gear 896. The cam features, pin, and spring element, in combination with the wireform kicker element, function or operate as an over-torque prevention assembly or mechanism.

According to yet another feature, the deadbolt assembly 30 includes a bolt helix subassembly 1100 that includes a bolt element 1040 coupled to a bolt helix 1070. The bolt helix 1070 has a spiral groove formed 1086 formed thereon that engages with one or more cam followers 1064 mounted in the bolt element 1040. The cam followers move within the spiral groove when the bolt helix is rotated by the spline gear 530, thus moving the bolt element between a deployed or locking position and a retracted or unlocked position. The deadbolt assembly further includes housing elements 1106, 1108 that are coupled to the bolt helix subassembly to form a short bolt chassis subassembly 1130. A bolt flex circuit with associated sensors is coupled to the housing portions, and the resulting subassembly is mounted within an outer housing enclosure 1180. The housing enclosure has a twist-lock feature formed at one end for engaging with a corresponding twist lock feature formed on the spline gear assembly. A face plate assembly is also coupled to the bolt assembly. The face plate employs a pair of shutter plates 1208 for selectively covering a pair of fastener receiving apertures formed in the face plate.

The present invention is also directed to a door lock system for mounting within a central opening formed in a door panel, the door panel further includes a transverse opening formed therein that is transverse to the central opening and which communicates therewith. The door lock system also includes an inner bezel assembly mounted to an inner surface of the door panel and being sized and is configured for mounting within the central opening. The inner bezel assembly has an inner bezel unit that is mounted to the inner surface of the door and includes an inner opening that communicates with the central opening of the door, and a removable puck assembly that is mounted within the inner opening of the bezel assembly and within the central opening of the door, wherein the puck assembly includes a display assembly mounted within an outer housing assembly. The lock assembly also includes an outer bezel assembly that is coupled to an outer surface of the door panel and to the inner bezel assembly and where a portion of the outer bezel assembly is sized and configured for seating within the central opening of the door, and a deadbolt assembly that is sized and configured for mounting within the transverse opening formed in the door panel and includes a bolt element that is movable between an unlocked position and a locked position. The deadbolt assembly is coupled to the outer bezel assembly via a twist-lock connection feature. Further, the deadbolt assembly is sized and configured for seating only within the transverse opening of the door panel.

The inner bezel unit includes a security plate that mounts to the inner surface of the door panel, a bearing ring that is coupled to the security plate, and a gear ring that is rotatably coupled to the bearing ring for rotating therewith, and a dial element that is coupled to the gear ring and is rotatable therewith, wherein rotational movement of the dial element results in rotational movement of the gear ring. The inner bezel unit further includes a pinion gear assembly that is coupled to the security plate and is rotationally coupled to the gear ring, the pinion gear assembly includes a pinion gear ring that is rotationally coupled to the gear ring and a drive element that is coupled to the pinion gear and rotates therewith and which extends outwardly from a rear surface of the security plate, wherein the drive element is coupled to the outer bezel assembly, and wherein rotational movement of the dial element results in rotational movement of the pinion gear and the drive element for transferring the rotational movement of the dial to the outer bezel assembly.

The inner bezel unit includes a plate that mounts to the inner surface of the door panel, where the plate has a front surface and a peripheral side surface, where the peripheral side surface has an arcuate shaped slot formed therein, and wherein the plate further has a central opening formed therein. The inner bezel unit also includes a torque link assembly that is coupled to the front surface of the plate and wherein a portion of the torque link assembly seats within the arcuate slot; a gear cover having a central opening formed therein that is coupled to the plate and when mounted thereto the central opening of the plate is aligned with the central opening of the gear cover, and wherein a rear surface of the gear cover includes a latch housing portion having a slot formed therein that communicates with the central opening and front surface having an ejector opening formed therein; and an outer washer cover that is coupled to the plate and which is sized and configured for overlying a portion of the front surface of the plate and the peripheral side surface of the plate. The outer washer has a connection element that is connected to at least a portion of the torque link assembly for moving the torque link assembly within the arcuate slot.

The inner bezel assembly also includes a latch assembly that is coupled to the latch housing portion of the gear cover and which seats at least partly within the slot formed therein and is coupled to the torque link assembly. The outer washer cover can be rotationally moved by the user such that at least a portion of the torque link assembly moves within the arcuate slot via the connection element, and wherein movement of at least a portion of the torque link assembly within the arcuate slot moves the latch assembly within the slot formed in the latch housing, which in turn can be moved between a deployed position and a retracted position.

According to another practice, the present invention is directed to a door lock system for mounting to a door panel, comprising an inner bezel assembly mounted to an inner surface of the door panel having an inner bezel unit that is mounted to the inner surface of the door and having an inner opening, and a removable puck assembly that is mounted within the inner opening of the bezel assembly. The puck assembly includes an electronic display assembly mounted within an outer housing assembly. The door lock system also includes an outer bezel assembly that is coupled to an outer surface of the door panel and to the inner bezel assembly, wherein the outer bezel assembly includes an electronic display assembly, and a deadbolt assembly that is coupled to the outer bezel assembly and having a bolt element that is movable between an unlocked position and a locked position by one or more of the inner bezel assembly and the outer bezel assembly.

The inner bezel unit includes a security plate that mounts to the inner surface of the door panel, a bearing ring that is coupled to the security plate, and a gear ring that is rotatably coupled to the bearing ring for rotating therewith, and a dial element that is coupled to the gear ring and is rotatable therewith, wherein rotational movement of the dial element results in rotational movement of the gear ring. The inner bezel unit further includes a pinion gear assembly that is coupled to the security plate and is rotationally coupled to the gear ring. The pinion gear assembly includes a pinion gear ring that is rotationally coupled to the gear ring and a drive element that is coupled to the pinion gear and rotates therewith and which extends outwardly from a rear surface of the security plate. The drive element is coupled to the outer bezel assembly and rotational movement of the dial element results in rotational movement of the pinion gear and the drive element for transferring the rotational movement of the dial to the outer bezel assembly.

According to another embodiment, the inner bezel unit comprises a plate that mounts to the inner surface of the door panel, where the plate has a front surface having a central plate opening formed therein and a peripheral side surface. The peripheral side surface has an arcuate shaped slot formed therein. The inner bezel unit also includes a torque link assembly that is coupled to the front surface of the plate and wherein a portion of the torque link assembly seats within the arcuate slot, and a gear cover having a central opening formed therein that is coupled to the plate and when mounted thereto the central plate opening is aligned with the central opening of the gear cover. A rear surface of the gear cover includes a latch housing portion having a slot formed therein that communicates with the central opening of the gear cover, and the gear cover has a front surface having an ejector opening formed therein. The inner bezel unit also includes an outer washer cover that is coupled to the plate and which is sized and configured for overlying a portion of the front surface of the plate and the peripheral side surface of the plate. The outer washer has a connection element formed along an inner surface that is connected to at least a portion of the torque link assembly that is seated within the arcuate shaped slot for moving the torque link assembly therein.

The torque link assembly comprises a torque link element that is coupled to the front surface of the plate, wherein the torque link element has a main body having a first end that seats within the arcuate shaped groove and an opposed second end that seats on the front surface of the plate; a biasing element that is coupled to the main body of the torque link for biasing the torque link in a selected direction; a movable ejection ramp having a slanted ramp-like groove formed therein and which is coupled to the second end of the torque link; a movable latch cam being coupled to the front surface of the plate and to the ejection ramp; and a movable ejector element having a post that extends outwardly from a main body thereof and which seats within the ramp-like groove of the ejection ramp, wherein at least a portion of the main body of the ejector element seats within the ejector opening formed in the gear cover. The latch assembly is coupled to the latch housing portion of the gear cover and to the torque link assembly.

The latch assembly comprises a latch element that is movable between a deployed position and a retracted position by the torque link assembly, and the latch element includes a pair of opposed leg portions each having a retaining plate coupled thereto, and wherein a biasing element is coupled to each leg portion of the latch element for providing a biasing force for moving the latch element into the deployed position. Further, the latch cam of the torque link assembly is coupled to one of the retaining plates, such that rotational movement of the washer cover moves the torque link element disposed within the arcuate slot via the connection element, and wherein the arcuate slot defines the maximum extent of movement of the washer cover. Still further, movement of the torque link element by the washer cover moves the ejection ramp, and movement of the ejection ramp moves the latch cam which is engaged with the retaining plate, and thus movement of the retaining plate by the latch cam moves the latch element in the slot from the deployed position to the retracted position.

The inner bezel assembly has a central opening and further comprises a torque link assembly and a latch assembly coupled to the torque link assembly. The latch assembly includes a latch element movable by the torque link assembly between a deployed position where the latch element extends into the central opening and a retracted position where the latch element is at least partly removed from the central opening. Also, movement of the latch element from the deployed position to the retracted position enables the puck assembly to be removed from the inner bezel assembly.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 4A is an isolation perspective view of the various assembled components of the door locking system of the present invention.

FIG. 4B is a perspective view of the various assembled components of the door locking system of the present invention with the battery puck assembly removed from the inner bezel assembly.

FIG. 4C is a perspective view of the various assembled components of the door locking system of the present invention with the battery puck assembly removed from the inner bezel assembly and illustrating an extension component employed as part of the deadbolt assembly.

FIG. 5H is a perspective view of the display assembly and housing assembly portions of the battery puck assembly according to the teachings of the present invention.

FIG. 48 is a perspective view of the short bolt chassis subassembly and the outer housing enclosure portions of the deadbolt assembly.

DETAILED DESCRIPTION

The intelligent door lock system of the present invention is sized and configured so as to maintain all feature sets or components in a generally centrally located, compact fashion that does not impede on the surrounding door surfaces. Further, the door lock system of the present invention is easy to install and set-up, and hence easy to use.

Figure 5A:
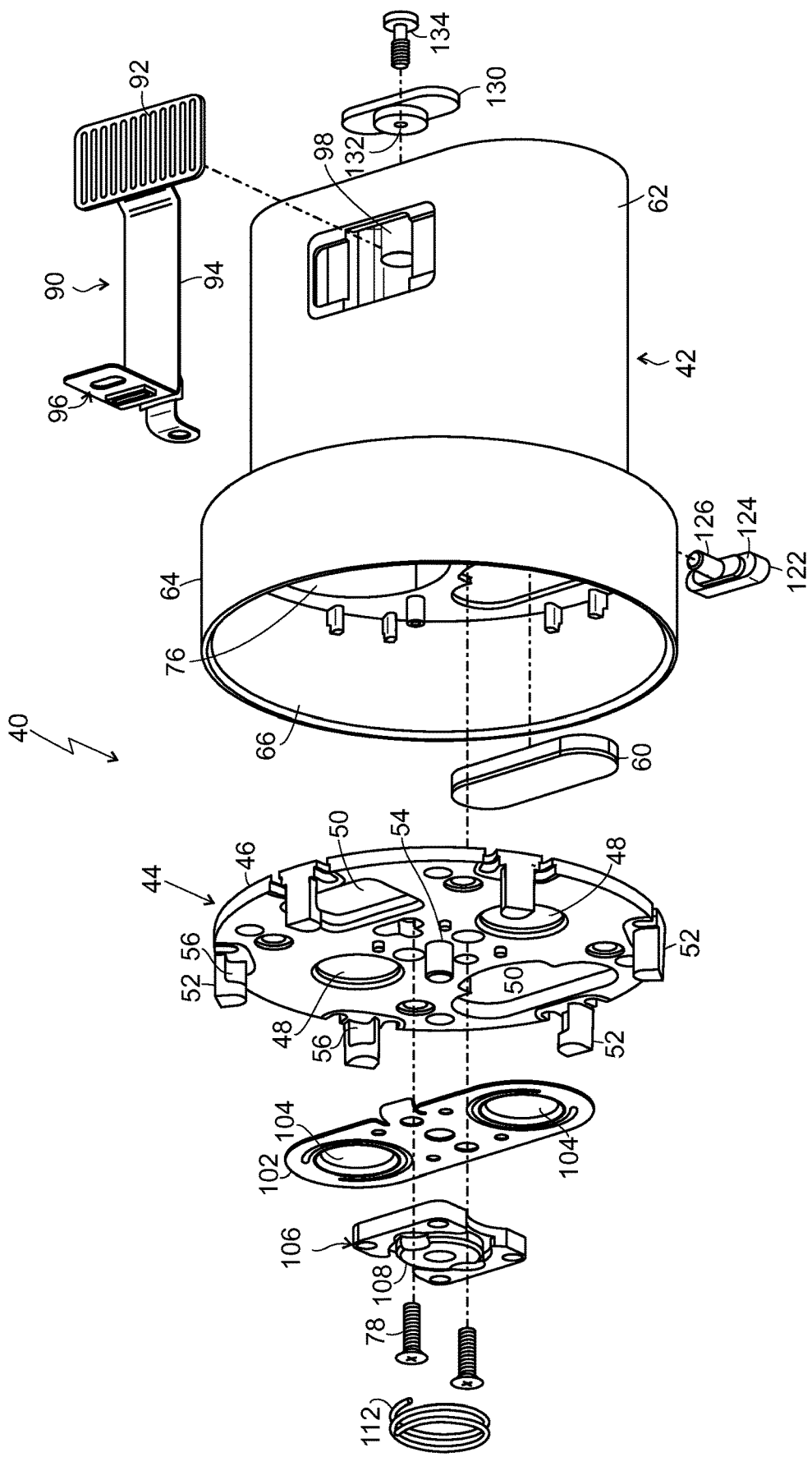
FIG. 5A is an exploded view of the battery puck assembly of the door locking system of the present invention.
Figure 5B:
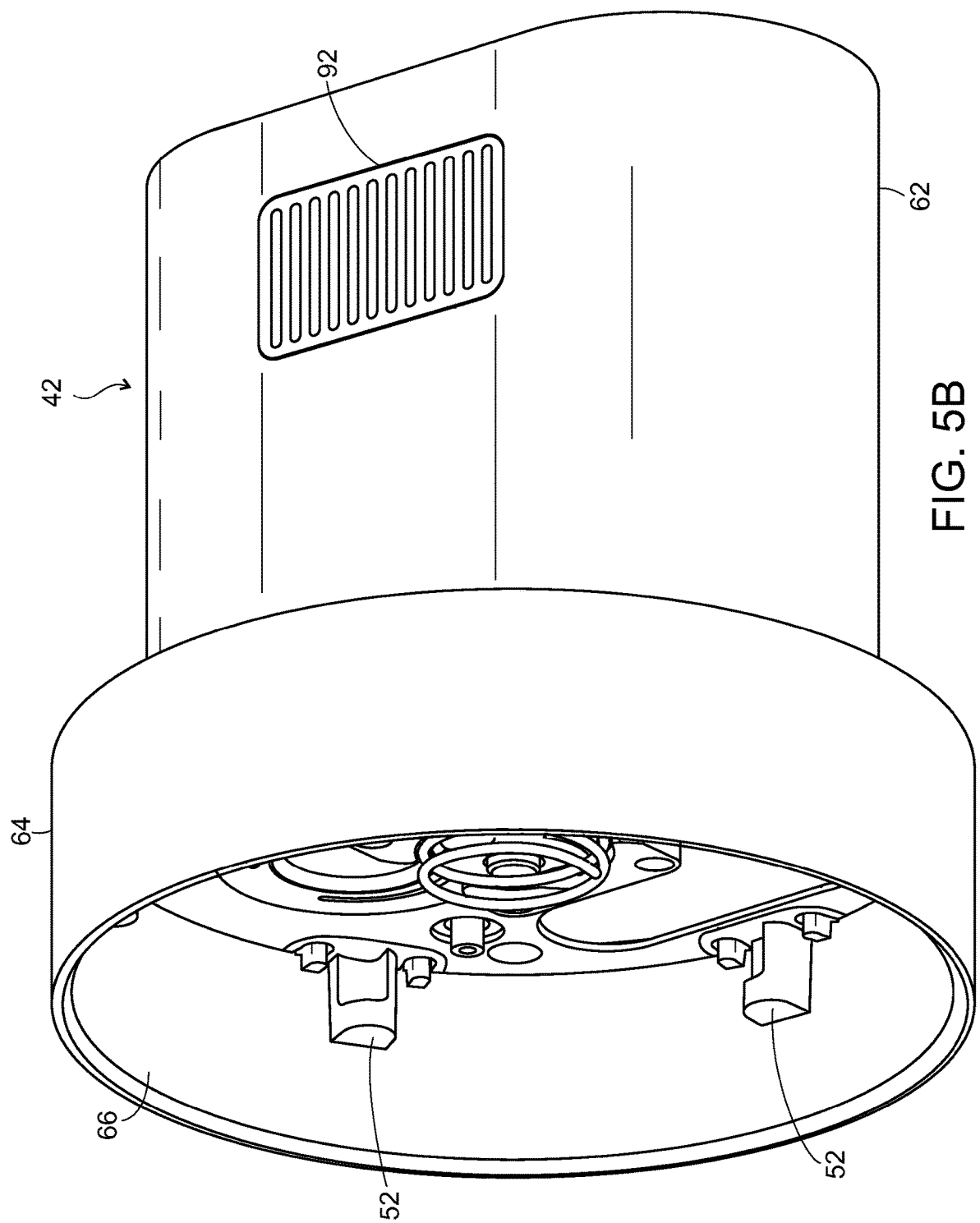
FIG. 5B is a perspective view of the housing assembly of the battery puck assembly according to the teachings of the present invention.
Figure 5C:
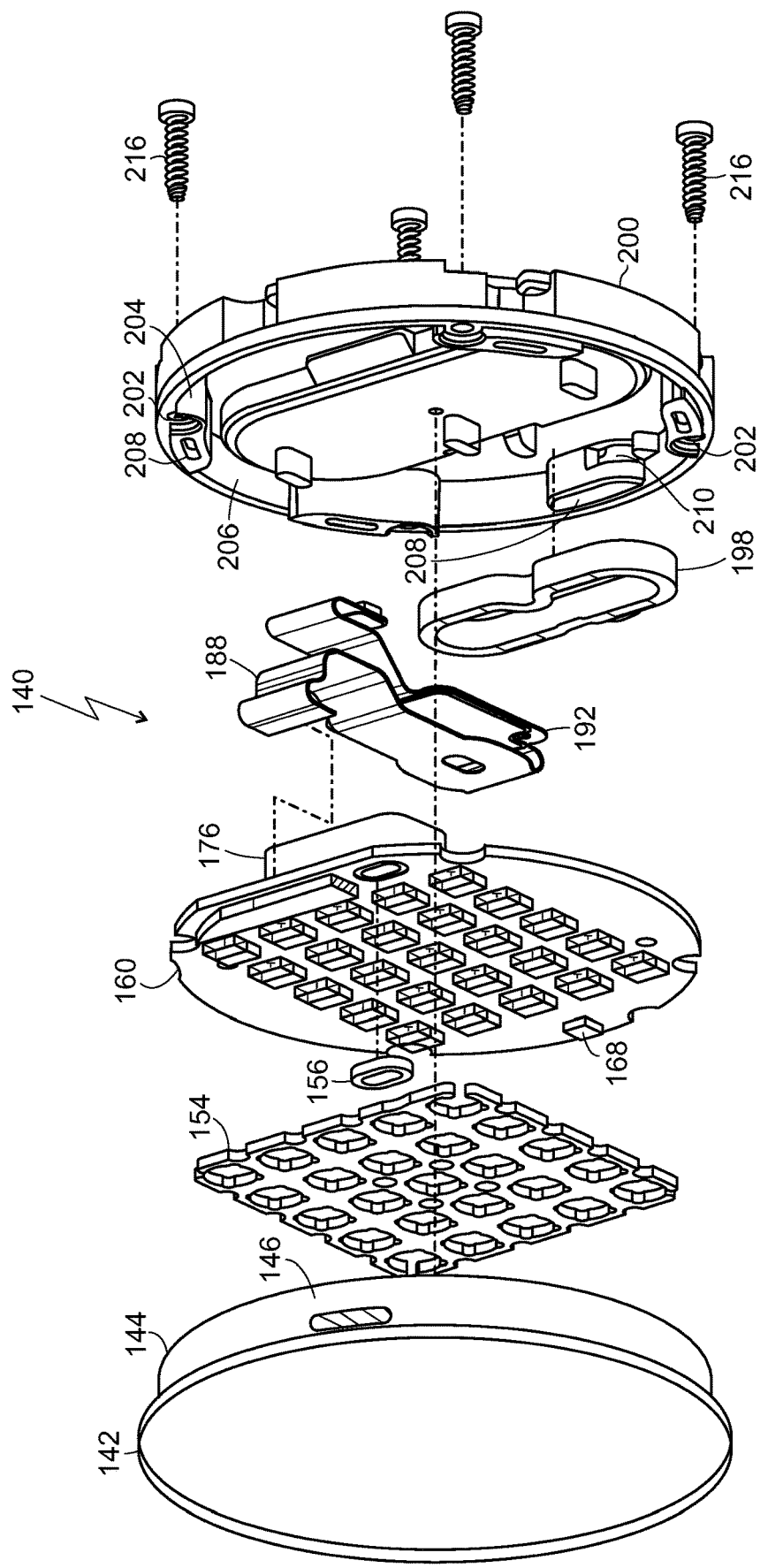
FIG. 5C is an exploded view of the display assembly portion of the battery puck assembly according to the teachings of the present invention.
Figure 5D:
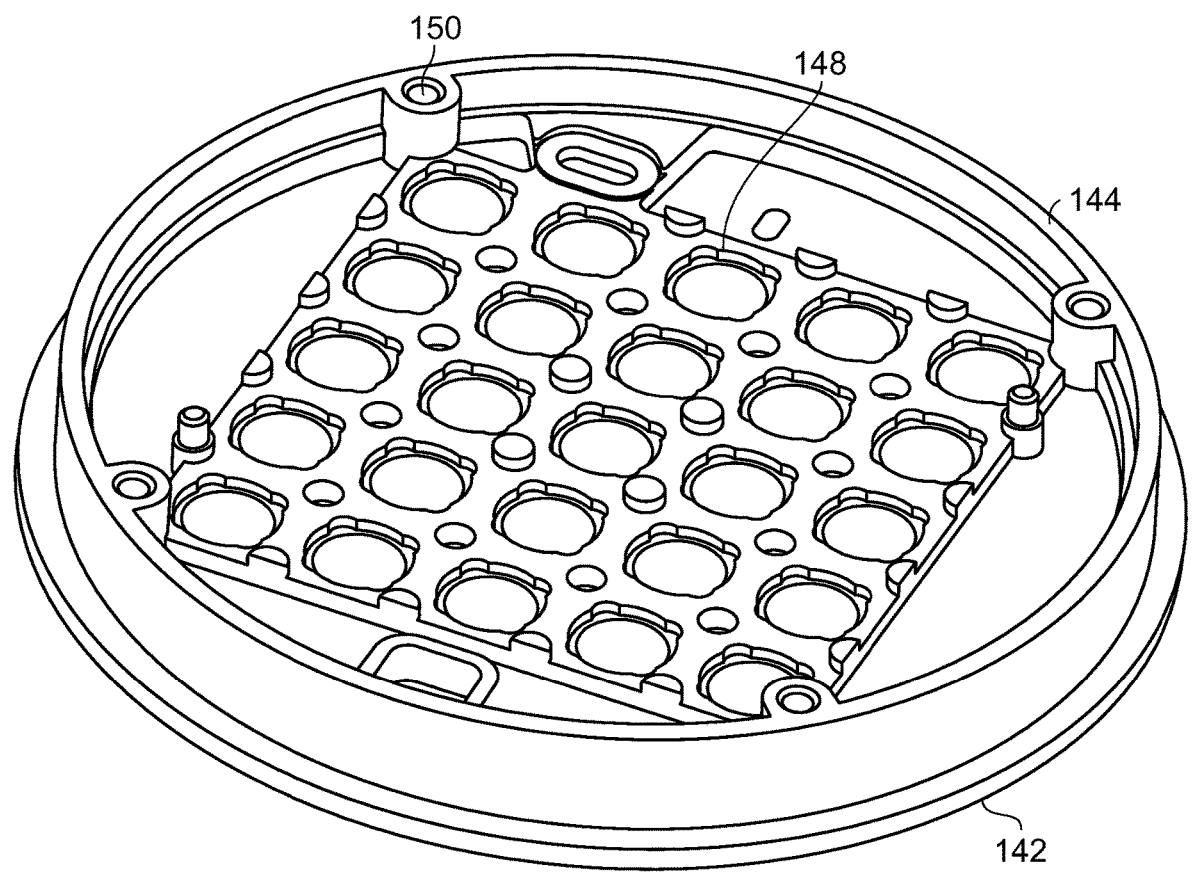
FIG. 5D is a perspective rear view of the glass cover layer and diffuser of the display assembly according to the teachings of the present invention.

The intelligent door lock system 10 of the present invention is illustrated for example in FIGS. 1-4C. The door lock system 10 is shown mounted within a door panel 12 of a door assembly. The door assembly can also include a frame element (not shown) for mounting a strike cup assembly 1002. The door lock system 10 according to the present invention includes an inner bezel assembly 16 and an outer bezel assembly 24 that is mounted within a bore 18 formed in the door panel 12. A deadbolt assembly 30 is mounted within a transverse bore 20 formed within a side of the door panel and which communicates with the central bore 18 as is known in the art. The deadbolt assembly 30 is mechanically coupled to the outer bezel assembly 24 either directly (FIG. 4B) or through an extension component (FIG. 4A). The extension component can thus form part of the deadbolt assembly 30. The deadbolt assembly 30 is secured or fastened to the door panel by a pair of fasteners 32. The dead bolt assembly 30 can interface with the strike cup assembly 1002 that is mounted within the door frame, FIG. 4A. Likewise, a portion of the inner bezel assembly 16 is fastened to the door panel by a pair of fasteners 22. The door lock system 10 also includes a battery puck assembly 40 which can be mechanically and electrically connected to the inner bezel assembly 16 and which is removable therefrom. The removable battery puck assembly 40 includes a display assembly 140, FIG. 5C.

As illustrated for example in FIGS. 5A-5H and 6, the battery puck assembly 40 includes an outer housing assembly 42 that houses or mounts various components and a display assembly 140. The housing assembly 42 includes a battery housing portion 62 for mounting a pair of power sources, such as batteries (not shown), and an electronics housing portion 64 for mounting selected electronics. The battery housing portion 62 has a generally elliptical shape that is configured to seat a pair of batteries and the electronics housing portion 64 has a generally cylindrical shape that has a diameter greater than the longest width of the battery housing portion. The battery housing portion 62 and the electronics housing portion 64 are in mechanical and electrical communication with each other, such that the batteries provide power to selected components housed within the display assembly and within the electronics housing portion. The electronics housing portion 64 also includes a central opening 66 that forms a chamber that communicates with a pair of battery chambers 76.

The illustrated battery puck assembly 40 further includes a mechanism or support plate 44 that seat within the chamber 66 and is secures thereto by fasteners 78. The mechanism plate 44 has a generally circular main body 46 that has a series of openings formed therein. Among the openings is a pair of power source openings 48 that communicate with and are aligned with the battery chambers 76. The main body 46 also includes an electrical opening 50 that communicates with an electrical contact pad and associated conductive lead assembly 90. The conductive lead assembly includes a contact pad or pin portion 92 that seats within a recess 98 formed in an outer surface of the battery housing portion 62. The conductive lead assembly 90 also includes a lead portion 94 and an associated electrical connector portion 96 that seats within the electrical opening 50 of the mechanism plate. The conductive lead assembly 90 is in electrical communication with a main circuit board of the door lock system 10. The mechanism plate 44 also includes a series of up-stop protrusions 52 that are disposed about the peripheral edge or circumference of the plate main body 46. Each of the up-stops 52 also has formed therein selected slots 56 for engaging with selected mechanical features of the display assembly 140 to help retain the assembly thereto. The up-stops 52 also help limit the axial travel of the display assembly when it is moved axially within the outer housing 42, as well as to allow the display to pivot or deflect back and forth in a see-saw manner. The main body 46 also has a force concentrator element 54 disposed in a central region thereof. The force concentrator operates in conjunction with the dome switch 192 to help concentrate forces thereon.

The battery puck assembly 40 also includes a magnet 60 that is adapted to seat within a selected recess formed in a bottom surface of the chamber 66. The magnet helps the battery puck assembly 40 seat flush or flat within the inner bezel assembly 16. The battery puck assembly 40 also includes a battery contact plate 102, a back plate 106, a spring 112, a battery puck stop 122, and a battery lock plate 130. The battery contact plate 106 is mounted on the mechanism plate 44 and has a main body that includes a central aperture that seats the force concentrator 54 and a pair of openings 104 that align with the power source openings 48 of the mechanism plate 44. The battery contact plate 106 helps form the electrical connection between the power sources mounted within the battery housing portion 62 and the electronics of the display assembly. The back plate 106 is mounted on top of the battery contact plate 102 and has a main body that includes a central opening that is also sized and configured for seating the force concentrator 54. The back plate 106 also includes a pair of fastener receiving openings that are adapted to mount the fasteners 78 and to hence secure the mechanism plate 44, the battery contact plate 102 and the back plate 106 to the housing 42 of the battery puck assembly 40. The spring 112 is then mounted on a spring seat 108 formed on the back plate 106. The spring helps form a resilient biasing mechanism that helps return the display assembly to an initial axial position during use. The battery puck stop 122 seats within an aperture 68 formed in the battery housing portion 62 of the housing assembly 42, FIG. 6. The battery puck stop 122 includes an elongated top portion 124 that protrudes outwardly from the housing and a post 126 that seats within the aperture 68. The battery puck stop 122 is movable within the aperture and radially movable relative to the housing to help retain the battery puck assembly 40 within the inner bezel assembly 16 when mounted therein according to known techniques. The battery puck assembly is removable relative to the housing assembly 42. The battery plate 130 has an elongated main body that has a central aperture 132 formed therein for receiving the fastener 134. The fastener is mounted within a corresponding aperture formed within the end portion of the battery housing portion 62 (not shown) for retaining the battery lock plate 130 thereto. The battery lock plate helps retain the batteries within the puck assembly 40, and specifically within the battery chambers 76 of the battery housing portion 62.

The illustrated battery puck assembly 40 also includes a display assembly 140 that seats within the chamber 66 of the electronics housing portion 64 of the housing assembly 42 and is coupled thereto via undercuts or slots 56 formed in the up-stops 52 of the mechanism plate 44. As shown specifically in FIGS. 5C-5G and 6, the illustrated display assembly 140 includes an outer glass layer 142 that is coupled to a diffuser 144. The outer glass layer 142 can be coupled to the diffuser 144 by any suitable means, including an optically transparent adhesive. The illustrated diffuser 144 has formed along a peripheral surface thereof a sound passage 146 for conveying sounds generated within the display assembly 140. The diffuser 144 also includes a matrix of slots or openings 148 that corresponds to the pattern of LEDS formed on the electronics layer 160. The diffuser 144 also includes a series of fastener receiving apertures 150 that are adapted to receive the fasteners 216. The display assembly 140 further includes a foam gasket 154 and an audio seal gasket 156, where the foam gasket is mounted on the matrix of openings 148 and the audio seal is coupled to the sound passage 146.

Figure 5E:
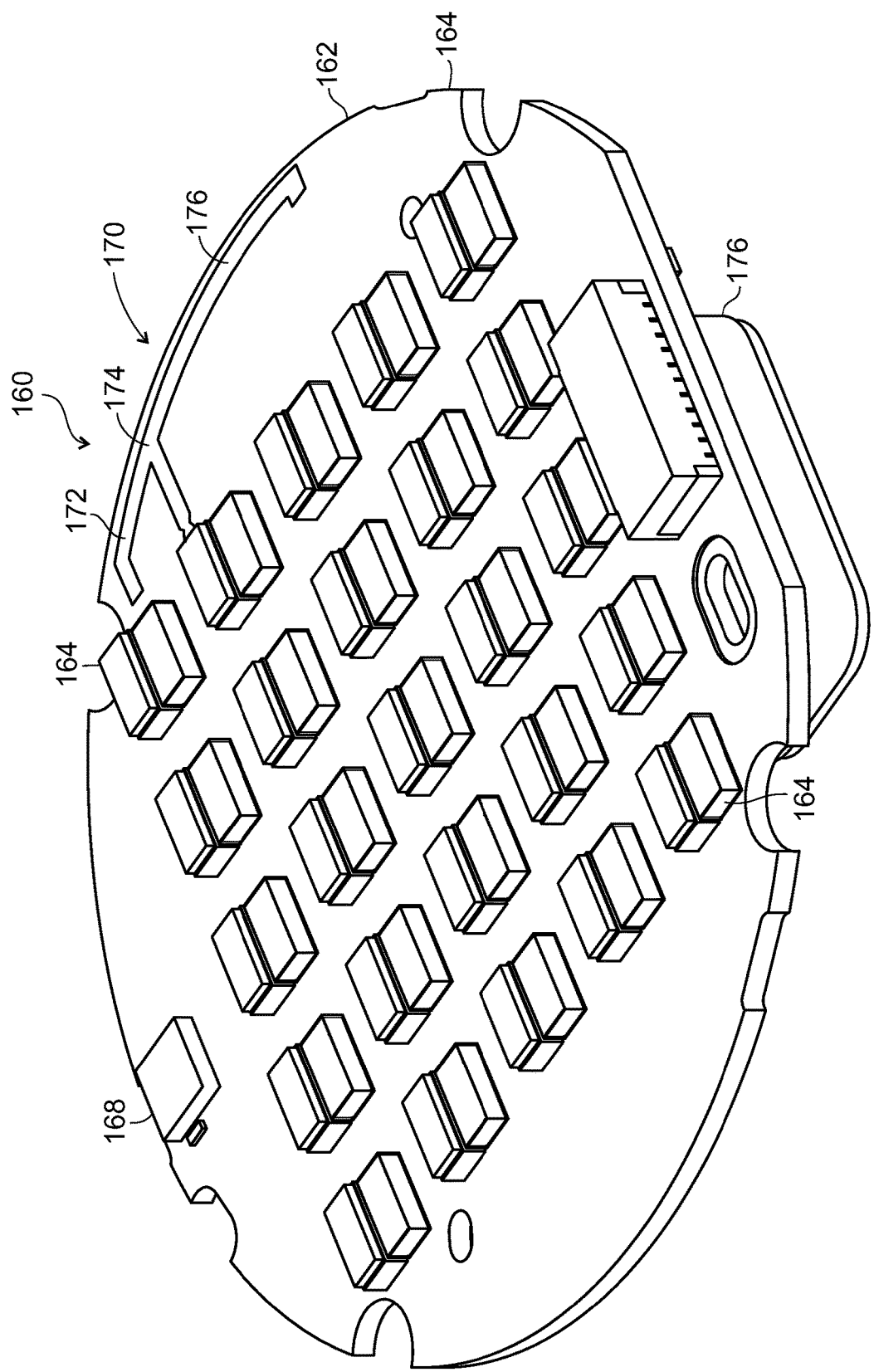
FIG. 5E is a perspective view of the electronics layer of the display assembly according to the teachings of the present invention.
Figure 5F:
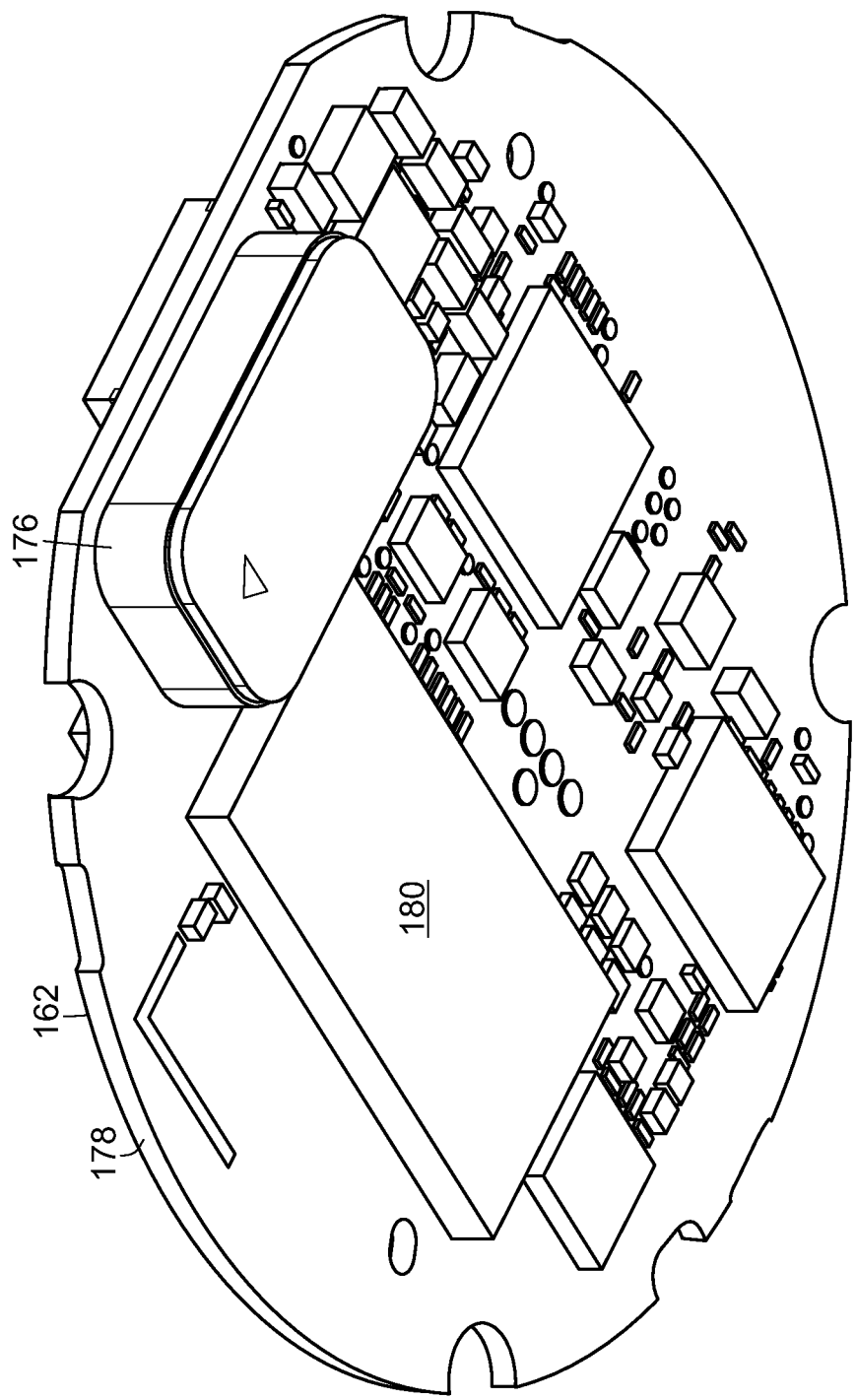
FIG. 5F is a rear view of the electronics layer of the display assembly according to the teachings of the present invention.
Figure 5G:
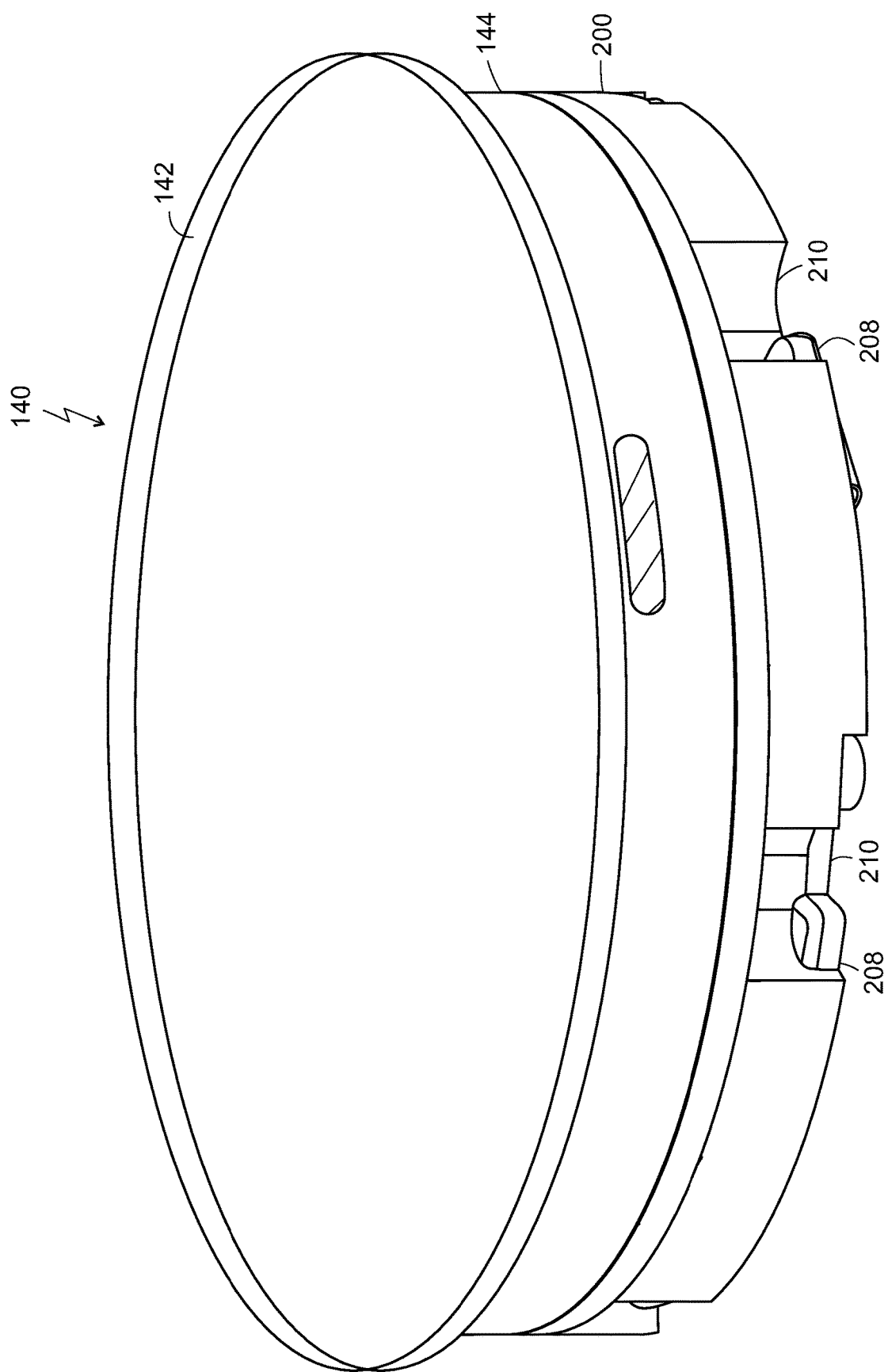
FIG. 5G is a perspective view of the assembled display assembly of the battery puck according to the teachings of the present invention.
Figure 6:
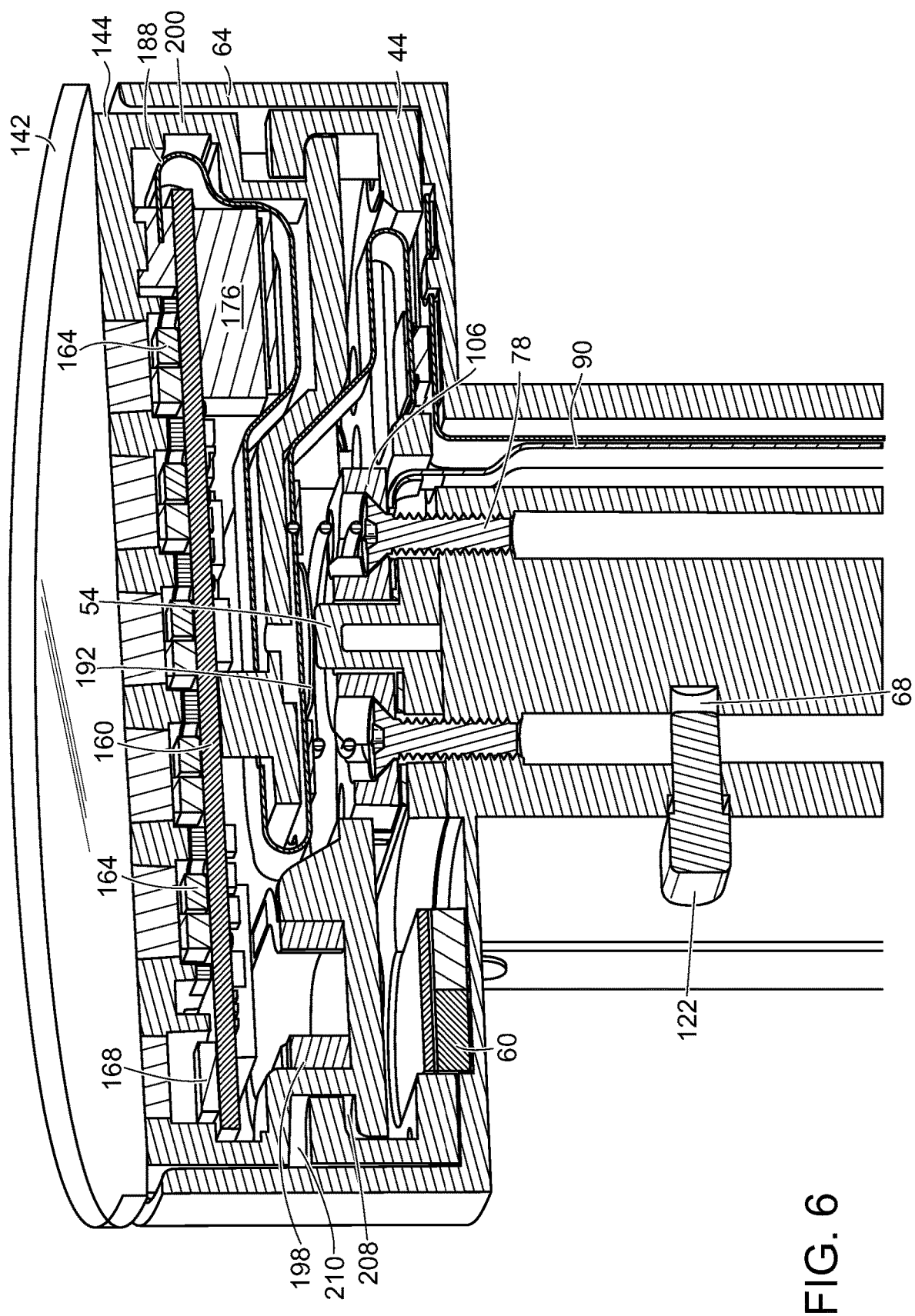
FIG. 6 is a cross-sectional view of the battery puck assembly according to the teachings of the present invention.
Figure 7:
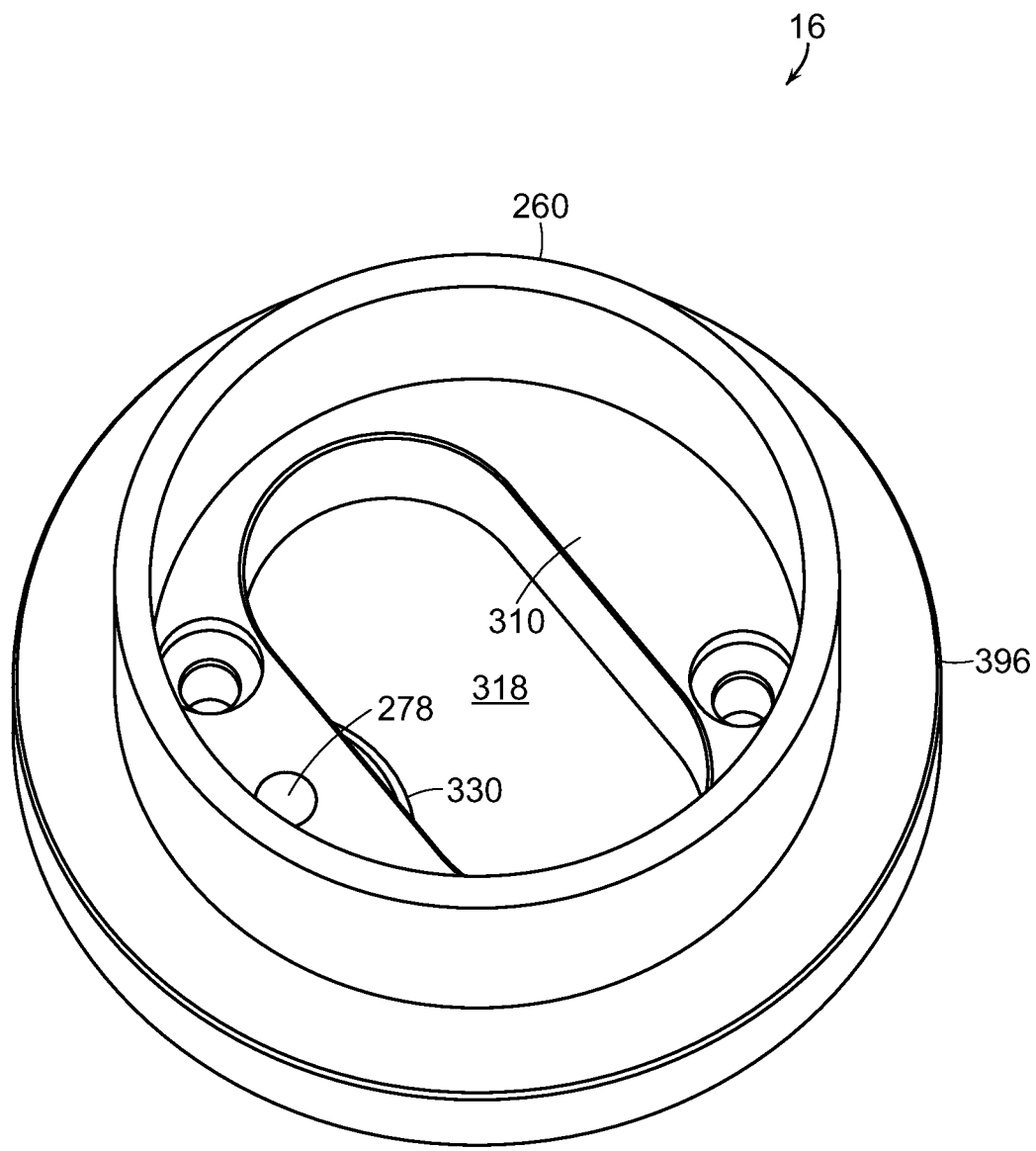
FIG. 7 is a perspective view in partial elevation of the inner bezel assembly of the door locking system according to the teachings of the present invention.
Figure 8:
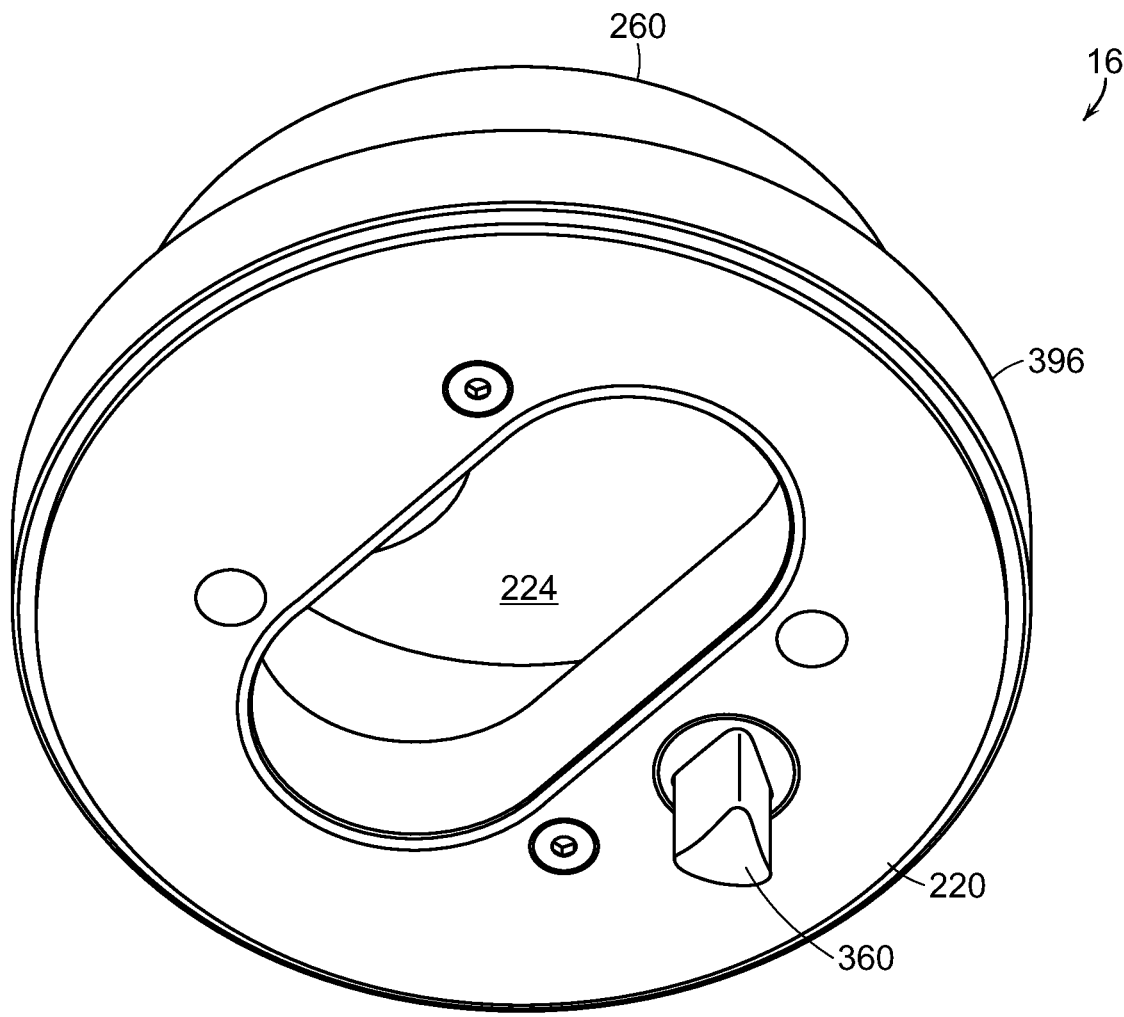
FIG. 8 is a perspective rear view of the inner bezel assembly of the door locking system of the present invention illustrating the drive housing assembly that extends outwardly therefrom.
Figure 9:
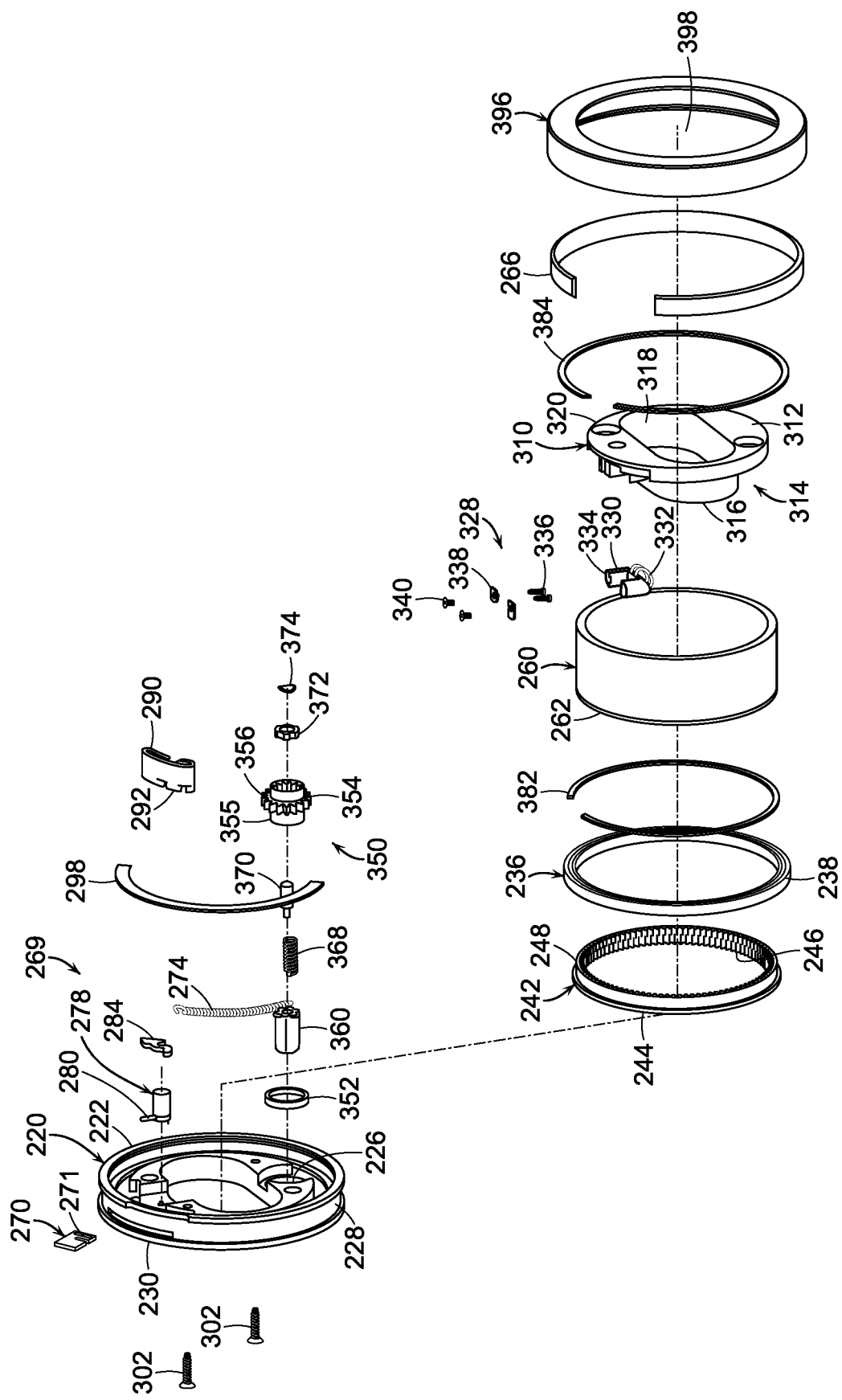
FIG. 9 is an exploded view of the inner bezel assembly of the door locking system according to the teachings of the present invention.
Figure 10A:
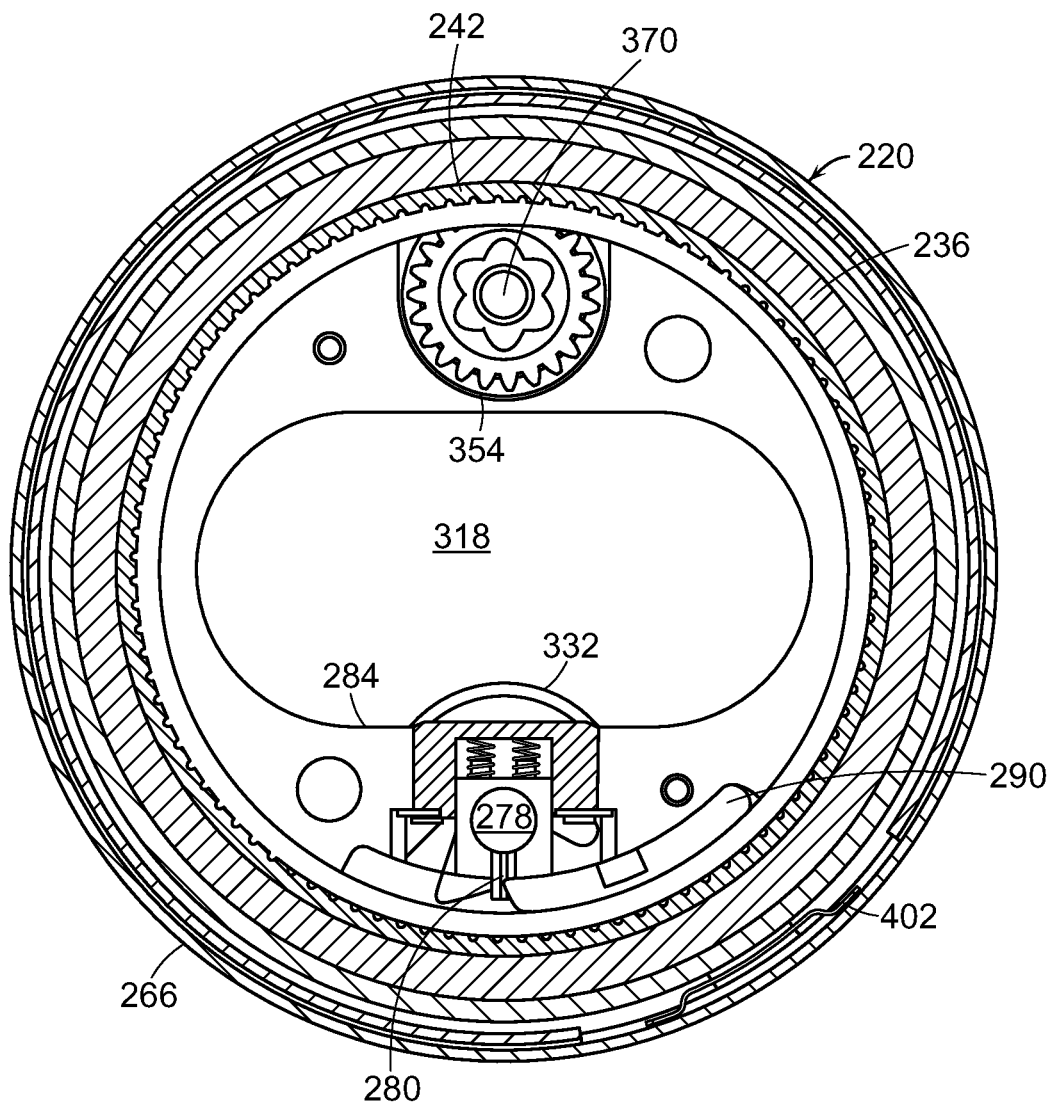
FIGS. 10A and 10B are partial rear views of the inner bezel portion of the inner bezel assembly illustrating the connection between the latch assembly and the torque link assembly according to the teachings of the present invention.
Figure 10B:
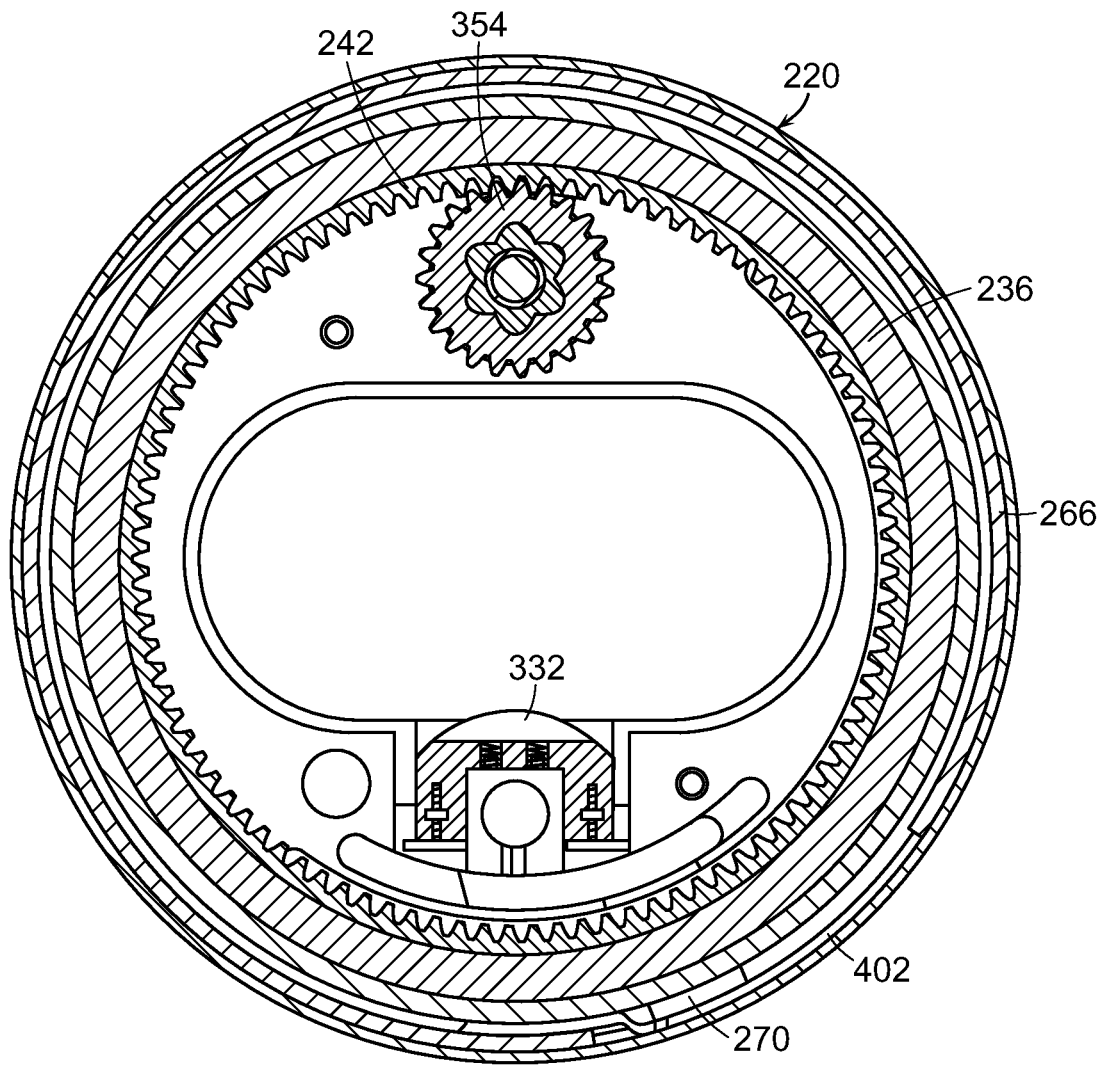
Figure 10C:
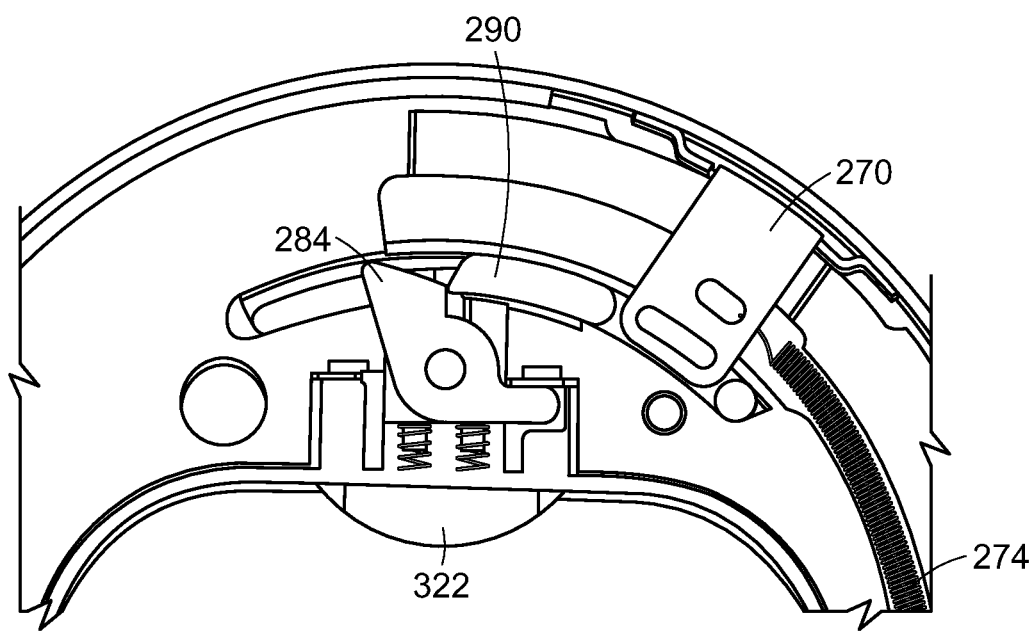
FIG. 10C is a partial view of the inner bezel illustrating the latch assembly in the normally disposed deployed position according to the teachings of the present invention.
Figure 10D:
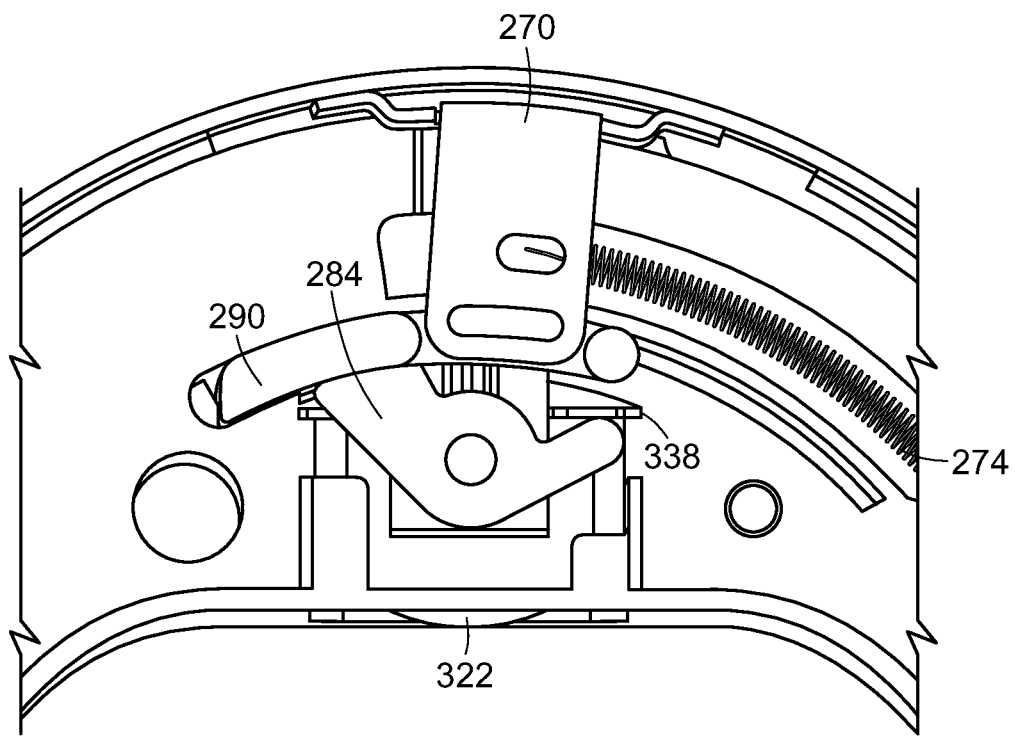
FIG. 10D is a partial view of the inner bezel illustrating the latch assembly in the retracted position according to the teachings of the present invention.
Figure 11A:
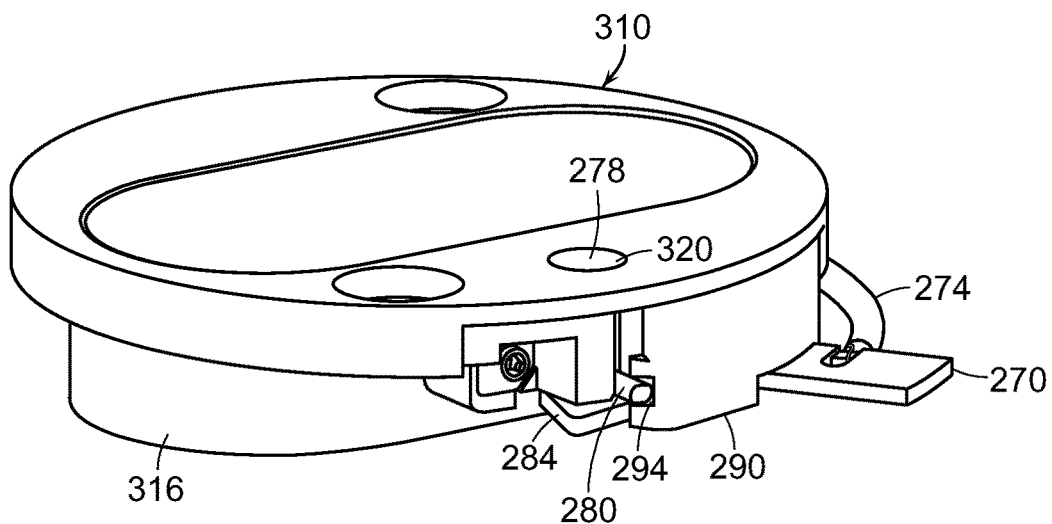
FIG. 11A is a perspective side view of part of the bezel assembly illustrating the interaction between selected components of the torque link assembly according to the teachings of the present invention.
Figure 11B:
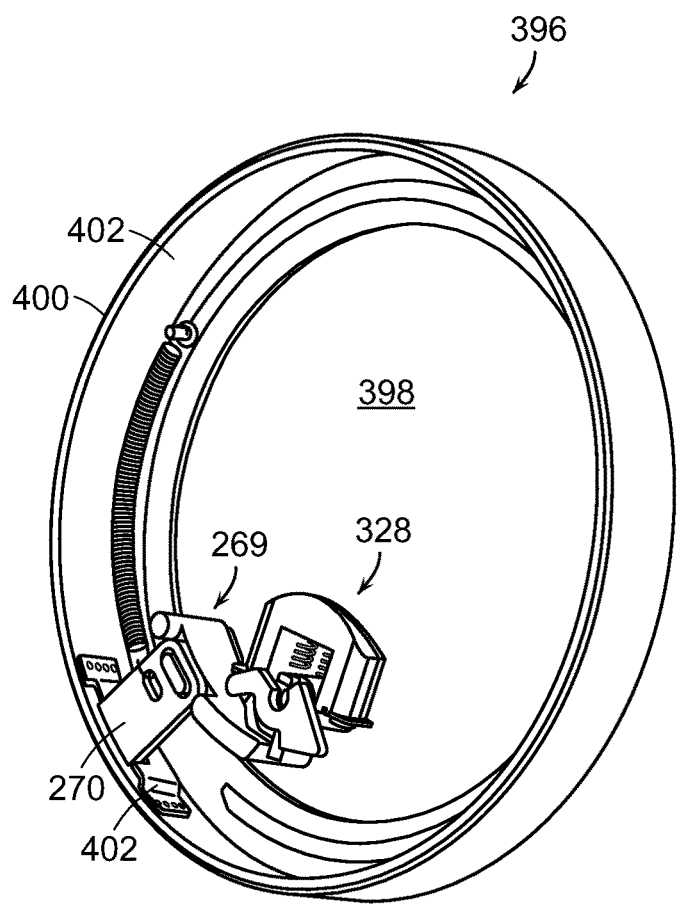
FIG. 11B is a perspective rear view of part of the bezel assembly illustrating the interaction between the components of the torque link assembly and the latch assembly according to the teachings of the present invention.
Figure 12:
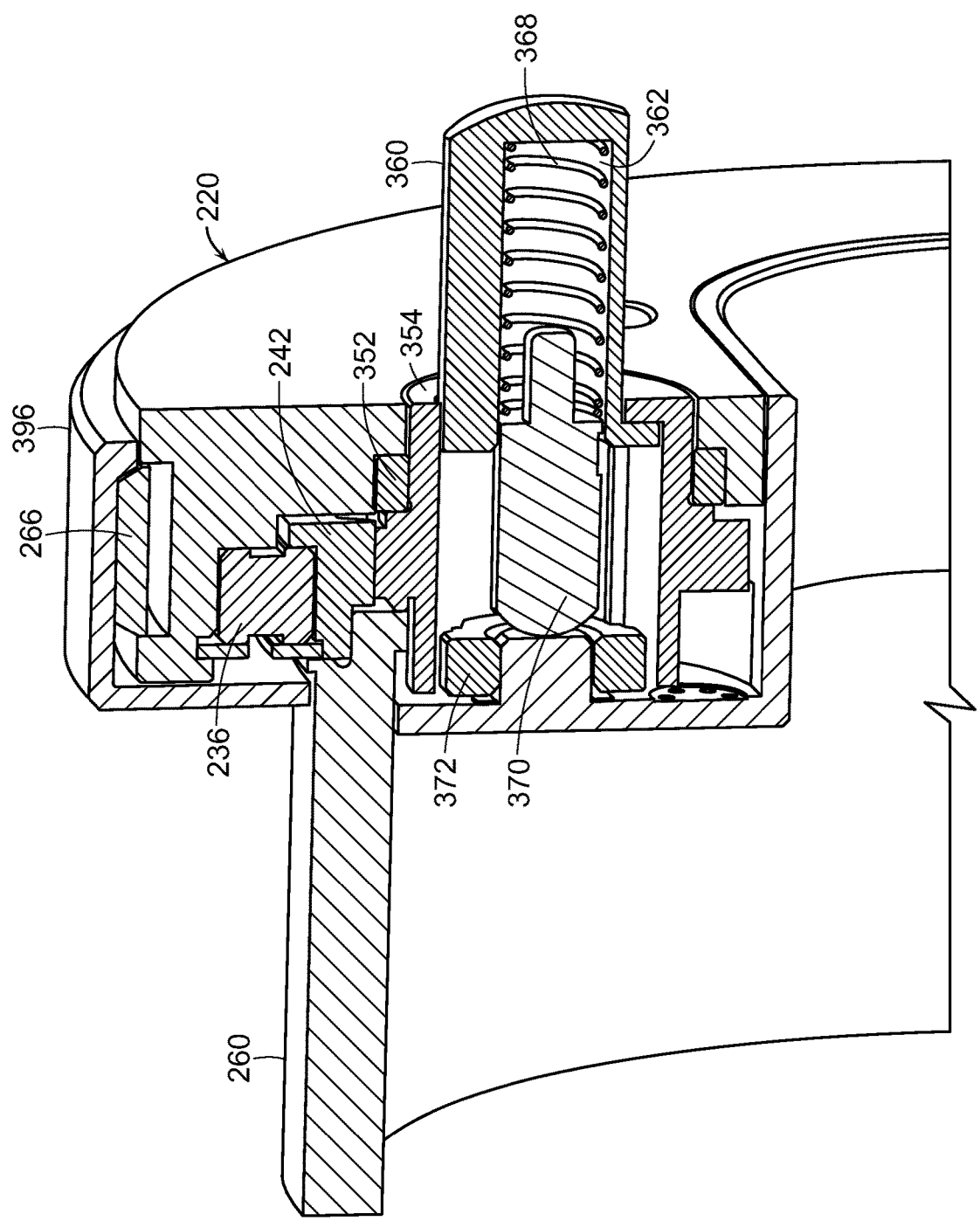
FIGS. 12 and 13 are partial cross-sectional views of the inner bezel assembly of the present invention illustrating the various operational positions of the drive housing element of the drive assembly depending upon the thickness of the door panel.
Figure 13:
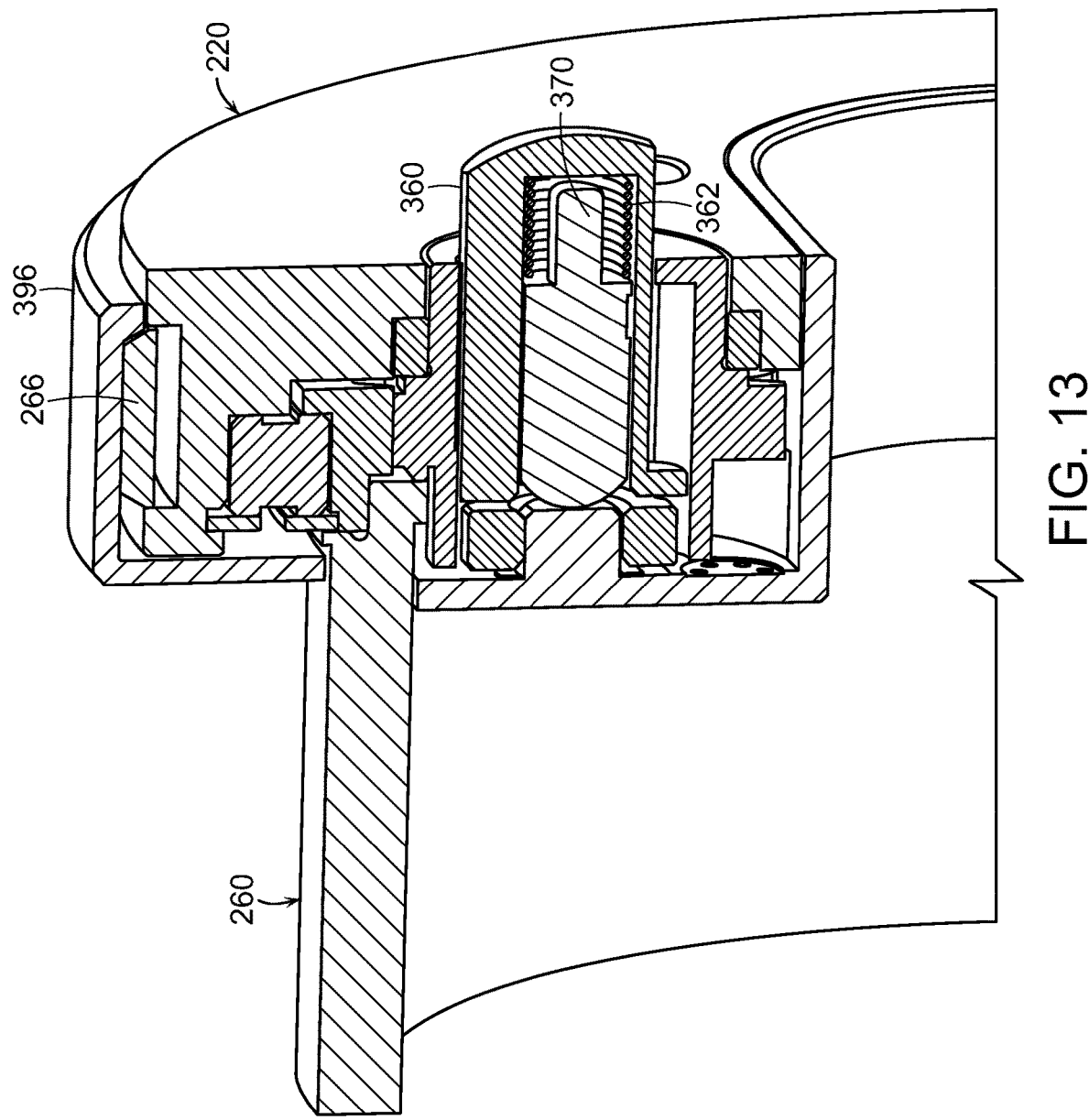

The electronics layer 160 includes for example an LED printed circuit board (PCB) 162 that forms the electronics portion of the display assembly 140, FIG. 5E. The printed circuit board 162 can include on a top surface thereof an array of light-emitting-diodes (LEDs) 164, which can be arranged in any particular pattern and can include any selected number of LEDs. According to a preferred embodiment, the LEDs are arranged in a five-by-five array that includes both white and red LEDs and which form indicia suitable for display through the protective glass layer 142. For example, the LEDs 164 can be arranged to form numbers from 0-9 as well as other symbols or characters, such as vertical or horizontal hyphens or lines, to indicate one or more states of the door lock system or to display or communicate selected information. For example, the display can be actuated to show a vertical line which indicates that the door lock system is in an unlocked state or a horizontal line to indicate that the system is in a locked state. The printed circuit board 162 can also include other system electronics, such as controllers, memory, sensors, and antennas, as well as other suitable electronic devices. For example, the PCB 162 includes an ambient light sensor 168 for sensing ambient light. The ambient light sensor 168 in conjunction with other electrical components can adjust, vary or control the brightness level of the display assembly 140 based on the brightness of the external environment. The PCB 162 also includes a radiating element 170 that includes a pair of separate antennas that are coupled to a single radiating element. For example, the PCB 162 can include a Bluetooth® antenna 172 and a Wi-Fi® antenna 174 that are coupled to a single radiating antenna element 176. This two-to-one antenna arrangement allows different types of antennas to operate over a single antenna element. One of ordinary skill in the art will readily recognize that other types of antennas can also be used.

The antennas can be employed to sense the proximity of a selected electronic device, such as a mobile or smart phone, key fob and like electronic devices. The sensed proximity of a selected electronic device can serve to activate the door lock system 10. If the device is not sensed and a selected period of time has passed, then the system can power down, thus conserving battery power. The antenna can be preset at the factory such that the door lock system of the present invention has a predefined distance (proximity) for sensing the presence of an electronic device. The PCB 162 can also include on a bottom surface thereof a sound generating element 176, such as a buzzer. Also formed on the bottom surface of the PCB is a radar emitting and/or receiving element 178 that is coupled to a radar transmitter module 180. The radar components 178, 180 help detect objects in the vicinity of the door lock assembly 10. Other electronic components can also be provided.

The display assembly 140 also includes an electronic flex assembly 188 that is coupled to the dome switch 192. The flex assembly 188 is coupled to the conductive lead assembly 90 via the connector portion 96. The dome switch 192 is adapted to be seated adjacent the force concentrator 54 and they work together to generate an electrical signal when the display assembly is depressed in the housing assembly 42. The display assembly 40 also includes a support plate 200 that mounts a retaining lock 198. The retaining lock has an elongated shape with a central indentation that allows the retaining lock 198 to flex, which better enables the retaining lock to be mounted on the support plate 200. The support plate 200 has a main body that has a peripheral wall portion 204 that forms a cavity 206. The support plate also includes a set of fastener receiving apertures 202 that are sized and configured for seating the fasteners 216. The plate also includes a series of locking elements 208 formed adjacent to or in the wall portion 204. The locking elements 208 have an opening 210 formed therein. The locking elements are adapted to engage with the up-stop elements 52 of the mechanism plate 44. That is, the up-stop elements 52 are disposed within the opening 210 of the locking elements and then the support plate is rotated so as to engage in a locking manner both the support plate 200 and the mechanism plate 44. The fasteners 216 also help secure the diffuser 144 to the support plate 200.

The PCB package and the other components are coupled together to form the display assembly 140. The battery puck assembly 40 is then inserted into the inner bezel assembly 16. Once assembled together, it forms an electronics assembly that can be mounted within the electronic housing portion 64 of the housing 42. The display assembly 140 is axially movable within the chamber 66 of the electronic housing portion 64 of the battery puck housing so as to allow the display assembly to be depressed or moved relative to the housing portion 64. This axial or pivoting movement of the display allows the user to select or enter displayed information. In this regard, the display assembly 140 includes on a backside thereof a dome switch 192 that is adapted to be resilient and hence can be depressed. The dome switch is positioned adjacent the force concentrator 54 of the mechanism plate 44. The user can depress the dome switch 192 by applying an axial force to the display assembly. When the axial force is applied, the dome switch 192 is forced against the force concentrator 54 and hence is flexed. The dome switch 192 in combination with the force concentrator 54, as well as other structure such as the up-stop elements, serves to limit the axial travel of the display assembly during use and to allow the user to select and enter information in the door lock system or to activate the deadbolt portion of the system. Further, the illustrated inner bezel assembly 16 allows for the display assembly 140 to be manipulated (e.g., clicked) at any location on the display surface and to have the door lock assembly respond to the user's input.

The main features and components of the inner bezel assembly 16 are illustrated in FIGS. 7-13. With specific reference to FIGS. 7-9, the inner bezel assembly 16 includes a security plate or inner bezel 220 that is securely mounted to a surface of the door panel 12 of the door assembly via any suitable securing mechanism, such as by the fasteners 22, FIG. 3. The security plate 220 has formed therein a bearing race 222 that seats a bearing element, such as the bearing ring 236. The bearing ring 236 can include if desired a series of integrated bearing elements that are spaced circumferentially about the ring portion 238 of the bearing ring or can employ a series of discrete bearing elements. The bearing ring 236 in turn is preferably mounted on or over a ring gear 242. The ring gear 242 is an annular element that has an outer lip or groove 244 formed in an outer peripheral surface of the gear main body for seating the bearing ring 236. When assembled together, the bearing ring 236 and the ring gear 242 seat within the security plate 220, and the bearing ring 236 seats within the bearing race 222. The ring gear 242 further includes along an inner surface a series of teeth 246 and has a relatively flat top surface 248. A stepped portion is formed between the top surface and the teeth 246 to seat or accommodate an annular dial element 260 when mounted to the ring gear 242. Specifically, the dial element 260 has a main body that includes opposed end regions. A selected end of the dial element 260 has a stepped surface 262 forming a flat that is then pressed or mounted onto the top surface of the ring gear 242.

The security plate 220 further includes a relatively planar inner surface that has a central opening 224 having any selected shape or size formed therein. According to one embodiment, the central opening 224 has a generally oval configuration. The inner surface of the security plate 220 also has formed therein a recess or aperture 226 forming a gear opening for seating a pinion gear assembly 350. The security plate 220 also has a peripheral edge or surface that has formed therein a circumferentially extending groove 228 for seating a retaining ring 266. The bottom surface of the groove 228 has formed therein a torque link groove or recess 230 that is sized and configured for seating one or more components of a torque link assembly 269. The torque link assembly 269 is intended to interact with a latch assembly 328 to move the latch assembly between deployed and retracted positions. The torque link assembly includes a torque link 270, an ejector spring 274, an ejector element 278, a latch cam 284, and an ejection ramp 290. The torque link 270 has a relatively flat main body and is sized and configured for at least partially seating within the tab groove 230. The torque link 270 is also adapted to seat at least partially within a recess formed in the inner surface of the security plate 220. The torque link 270 is adapted to move under bias in an arcuate travel path corresponding to an arc created by the tab groove 230. The torque link 270 is coupled to one end of the ejector spring 274 which is seated within a dedicated arcuate shaped groove. The other end of the spring 274 is secured by suitable fasteners to the inner surface of the security plate 220. The cover plate 298 is seated over the spring 274 and within the groove to cover the spring. The ejection ramp 290 is also coupled to a slot 271 formed in one end of the torque link 270 opposite the end that seats within the tab groove 230. Specifically, the ramp 290 has a main body having a bottom surface that has a projection 292 formed thereon for seating within the slot 271 of the torque link 270. Further, an inner surface of the ejection ramp 290 has a ramp groove 294 formed therein. The ramp groove 294 increases in height from one end of the groove to the other end of the groove. The ejection ramp helps convert rotary movements of the outer washer cover 396 and associated torque link 270 into axial movement of the ejector element 278. The latch cam 284 is also coupled to the inner surface of the security plate 220 adjacent the ejection ramp 290 and is secured thereto by any suitable technique. The latch cam 284 is also coupled to the latch assembly 328 via the retaining plates 338 to help move the latch assembly between the deployed and retracted positions. The ejector element 278 is also coupled to the latch cam 284. The ejector element 278 has a circular main body, although any suitable shape can be used, and has a post 280 formed at one end thereof which extends outwardly from the main body. The post 280 of the ejector element 278 seats within the ramp groove 294 of the ejection ramp 290 and is configured to move therealong during use.

The illustrated inner bezel assembly 16 further includes a gear cover 310. The illustrated gear cover 310 has a main body that has a front surface 312 that has a central opening 318 formed therein. The central opening 318 is shaped similarly to the opening 224 formed in the security plate 220. The front surface 312 further has formed therein selected fastener receiving apertures for seating the fasteners 22, and an ejector element opening 320 for seating a portion of the main body of the ejector element 278 when mounted therein. The fastener receiving apertures of the gear cover 310 are preferably aligned with the fastener apertures formed in the inner surface of the security plate 220 when assembled together. The gear cover 310 also includes an opposed back or rear surface 314 that has an outwardly projecting extension portion 316 that is adapted to at least partly seat within the opening 224. The back surface 314 of the gear cover 310 also includes a mounting portion for mounting a latch assembly 328. The latch assembly 328 includes a latch element 330, a pair of biasing members, such as springs 336, and a pair of retaining plates 338, 338 and associated fasteners 340. The latch element 330 has a main body having a rounded first end 332 forming a latch engaging surface that seats within a groove formed in the extension portion 316 of the gear cover 310. The opposed end of the latch element has a pair of leg portions 334 that are axially spaced from each other to form a spring receiving or mounting area. The springs provide resilient bias to this area so as to allow the latch element to move within the groove formed in the extension portion 316. When mounted as such, the first end 332 of the latch element 330 extends into the opening 318 when disposed in the deployed position.

Figure 14:
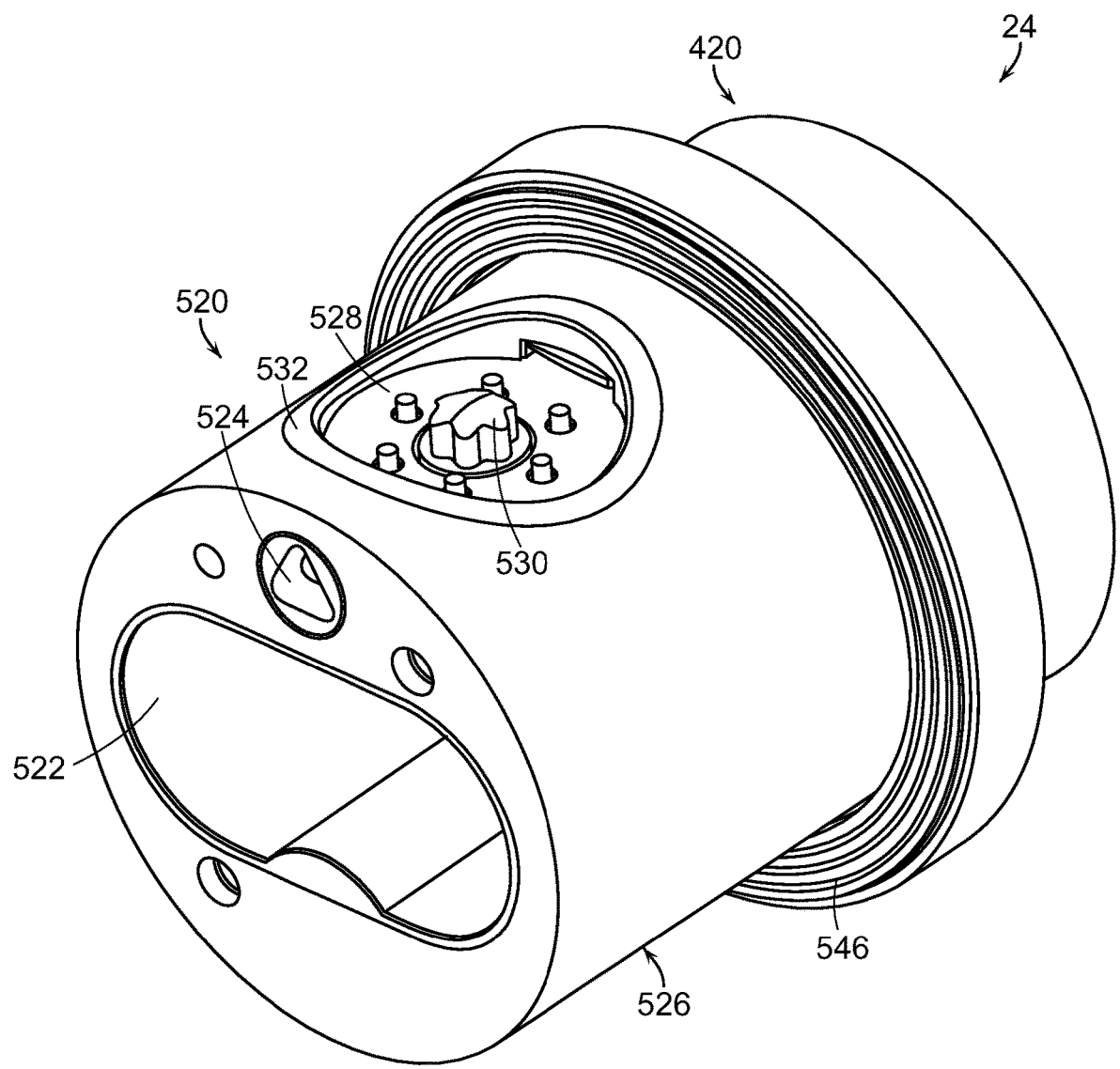
FIG. 14 is a perspective view of the outer bezel assembly when fully assembled according to the teachings of the present invention.

A pinion gear assembly 350 is mounted in the recess 226 of the security plate 220. The pinion gear assembly includes a lower bearing element 352 that is seated within the recess 226. The assembly also includes a pinion gear 354, a triangular drive housing element 360, a spring 368, a plunger 370, an upper bearing element 372, and a washer 374. The pinion gear 354 is mounted within a central opening formed in the lower bearing element 352 and thus is mounted on the bearing element 372. The pinion gear 354 includes an extension portion 355 and has a plurality of teeth 356 formed along a circumferential portion or region of the gear. The lower bearing element 352 is adapted to be mounted about the extension portion 355. The upper bearing element 372 seats within a central opening formed in the pinion gear 354. When assembled together, the pinion gear extension portion 266 is adapted to seat within the recess or opening 226. The drive housing element 360 can have any selected shape or size. According to one practice, the drive housing element 360 has a generally triangular shape to form a triangular drive element. The drive housing element 360 has a housing forming a chamber 362 that mounts the spring 368. The plunger 370 which functions as a spring seat and a spring stop element is also mounted within the chamber 362 and is coupled to one end of the biasing element. The spring 368 in cooperation with the plunger 370 is adapted to move the drive housing element 278 between various axial positions depending upon the width of the door panel during use. The drive housing element 360 is intended to cooperate with the input gear 826 (FIG. 31) so as to drive the shifter gear assembly 770. For example, the drive housing element 360 is intended to connect with the drive element connection part or chamber 524 (FIG. 14) formed in the rear portion of the outer bezel assembly 24. This ability of the drive housing element 360 to move between various axial positions based upon the thickness of the door panel allows the inner and outer bezel assemblies 16, 24 in essence to float relative to each other and to hence to be able to accommodate varying door thicknesses.

The inner bezel assembly 16 can be assembled for example by mounting the torque link assembly 269 and the pinion gear assembly 350 to the security plate 220. The latch assembly 328 is then mounted to the gear cover 310. The gear cover 310 is positioned so that the latch assembly 328 overlies the torque link assembly 269 and then the gear cover 310 is secured to the security plate 220 via the fasteners 302. The bearing ring 236 is then mounted over the ring gear 242, and then the inner bezel dial element 260 is pressed onto the ring gear 242. A retaining ring 382 is then disposed over the dial element 260 to form a dial assembly. The dial assembly is then mounted to the security plate 220 over the gear cover 310 such that the bearing ring 236 seats within the bearing race 222. In this arrangement, the teeth of the pinion gear 354 interface and engage with the teeth of the ring gear 242. A second security or retaining ring 384 is then mounted over the dial element 260 and into a groove formed in the security plate 220. The retaining ring 266 is then mounted about the security plate 220 and is disposed within the groove 228. The retaining ring 266 thus functions as an internal retaining ring. The retaining ring 266 is positioned so as to be free of the tab groove 230. When assembled as such, the latch element 330 is disposed in the normally biased deployed position, FIG. 10A.

The outer washer cover 396 is then disposed over the dial element 260 and about the security plate 220. The outer washer cover 396 includes a main body that has a front surface and a back surface. The front surface has a central opening 398 formed therein for seating the dial element 260. The back surface includes an outer circumferential wall portion 400 that forms a chamber 402. The inner surface of the wall portion 400 includes a connector element 402 that is secured thereto. The connector element 402 is sized and configured to engage with the torque link 270 that extends outwardly from the tab groove, such that upon rotational movement of the outer washer cover 396 about the security plate 220, the torque link 270 is moved within the tab groove 230.

As shown in FIGS. 10A-11B, the torque link 270 is coupled to the connector element 402 of the outer washer cover 396. When the outer washer cover is rotated, the connection between the connector element 402 and the torque link 270 moves the torque link 270 within the groove 230 along the arcuate travel path. The ejection ramp 290 is connected to the torque link 270 via the slot and protrusion 292, and hence when the torque link moves along the travel path, the ejection ramp 290 moves along the same path as well. The ejection ramp 290 in turn interfaces with and moves the latch cam 284 and the ejector element 278. The front edge of the ejection ramp 290 contacts a portion of the latch cam. When the ramp is moved by the torque link in this manner, the ramp contacts and moves the latch cam, which in turn pivots about a pivot point. Simultaneously, the post 280 of the ejector element 278 seats within a groove 294 of the ejection ramp. The movement of the ramp 290 via the torque link 270 allows the post to ride up the slanted groove 294 formed in the ramp, thus axially raising the ejector element 278 in the corresponding ejector pin opening 320. As the ejector element 278 is raised therein, the ejector moves upwardly in the opening 320 and a portion of the ejector passes the front surface of the gear cover 310. The ejector element 278 when raised as such presses against the back side of the electronics housing portion 64 of the battery puck assembly 40. Concomitantly, the latch cam 284 engages with the latch element 330 via the retainer plate 338 and moves the latch element from the normally biased deployed position (FIGS. 10A and 10C) to the retracted position (FIGS. 10B and 10D) where the latch element 330 is moved substantially into the gear cover 310. The dual function of raising the ejector element 278 within the ejector pin opening 320 to apply a force against the backside of the battery puck assembly 40 while concomitantly moving or pulling in the latch element 330 allows the ejector element 278 to break the magnetic and mechanical connections between the battery puck assembly 40 and the remainder of the inner bezel assembly 16, thus releasing the battery puck assembly 40 thereof. This allows a user to remove the battery puck assembly 40 from the inner bezel assembly 16.

Further, the dial element 260 is adapted to rotate so as to be able to lock or unlock the door, and is able to be pushed inwardly against the force concentrator 54 to activate the dome switch 192. The multiple different types of movement allow the user to enter or input selected commands or data into the door lock system 10, such as during initial set-up, or to reset the device once installed, such as for example, by pressing the dial element inwardly for a selected duration. When the dial element 260 is rotated, the bearing ring 236 and hence the ring gear 242 are rotated therewith. Since the teeth 246 of the ring gear 242 engage the teeth 356 of the pinion gear 354 of the pinion gear assembly 350, the pinion gear 354 thus functions as a conventional pinion and rotates therewith. The rotation of the pinion gear 354 serves to rotate the drive housing element 360. The rotation of the drive housing element 360 allows the force associated with rotation of the dial element 260 to be transferred or conveyed to the motor chassis assembly with associated gear assemblies, which in turn transfers the force to the dead bolt assembly 30 in order to move the dead bolt of the deadbolt assembly between locked and unlocked positions. Further, as is readily apparent from the above, the latch element 330 can operate independently of the rest of the torque link assembly 269.

Figure 1:
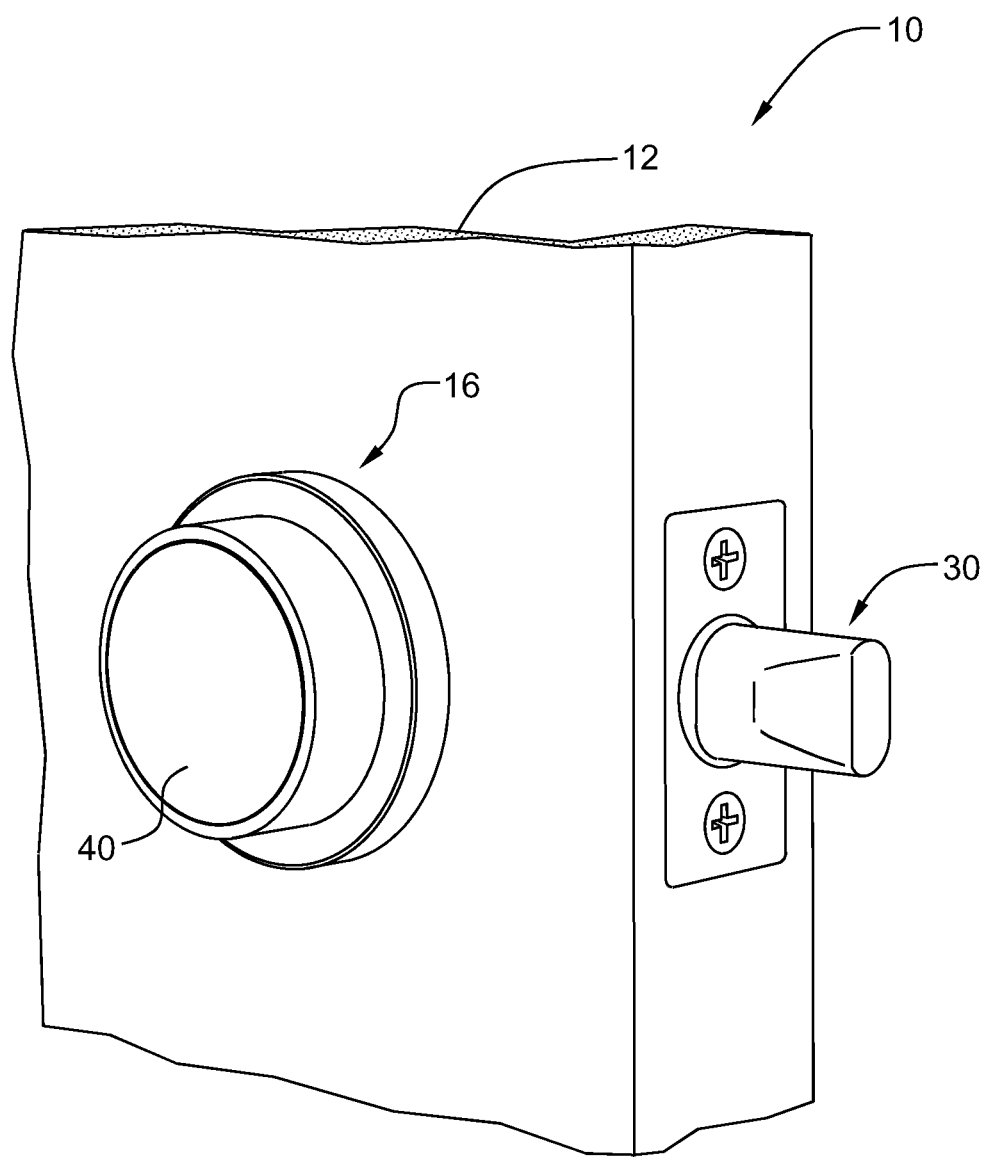
FIG. 1 is a schematic view of the intelligent door locking system of the present invention mounted within a door panel of a door assembly.
Figure 2:
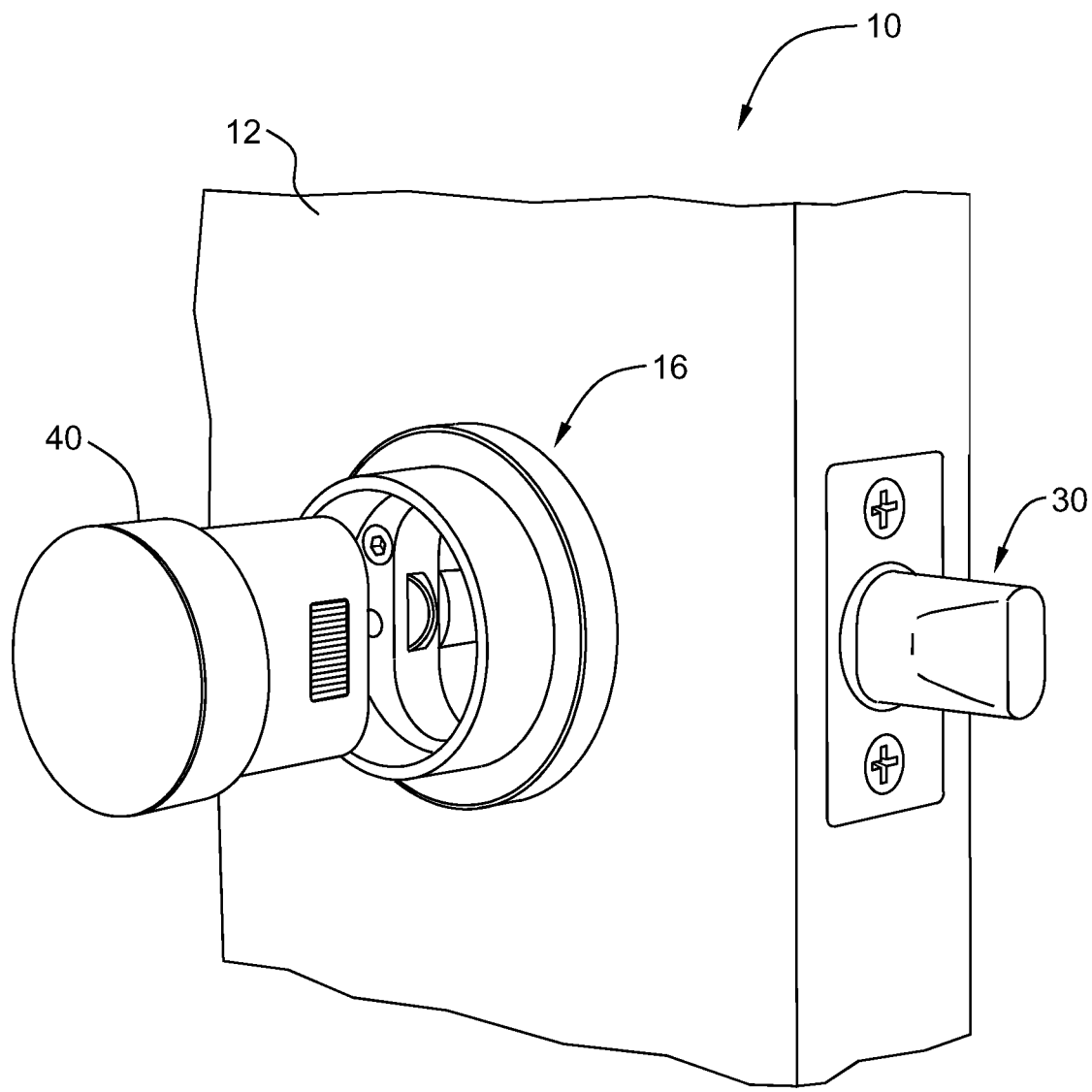
FIG. 2 is a schematic view of the intelligent door locking system of the present invention mounted within the door panel of a door assembly with the battery puck assembly partly removed from the inner bezel assembly.
Figure 3:
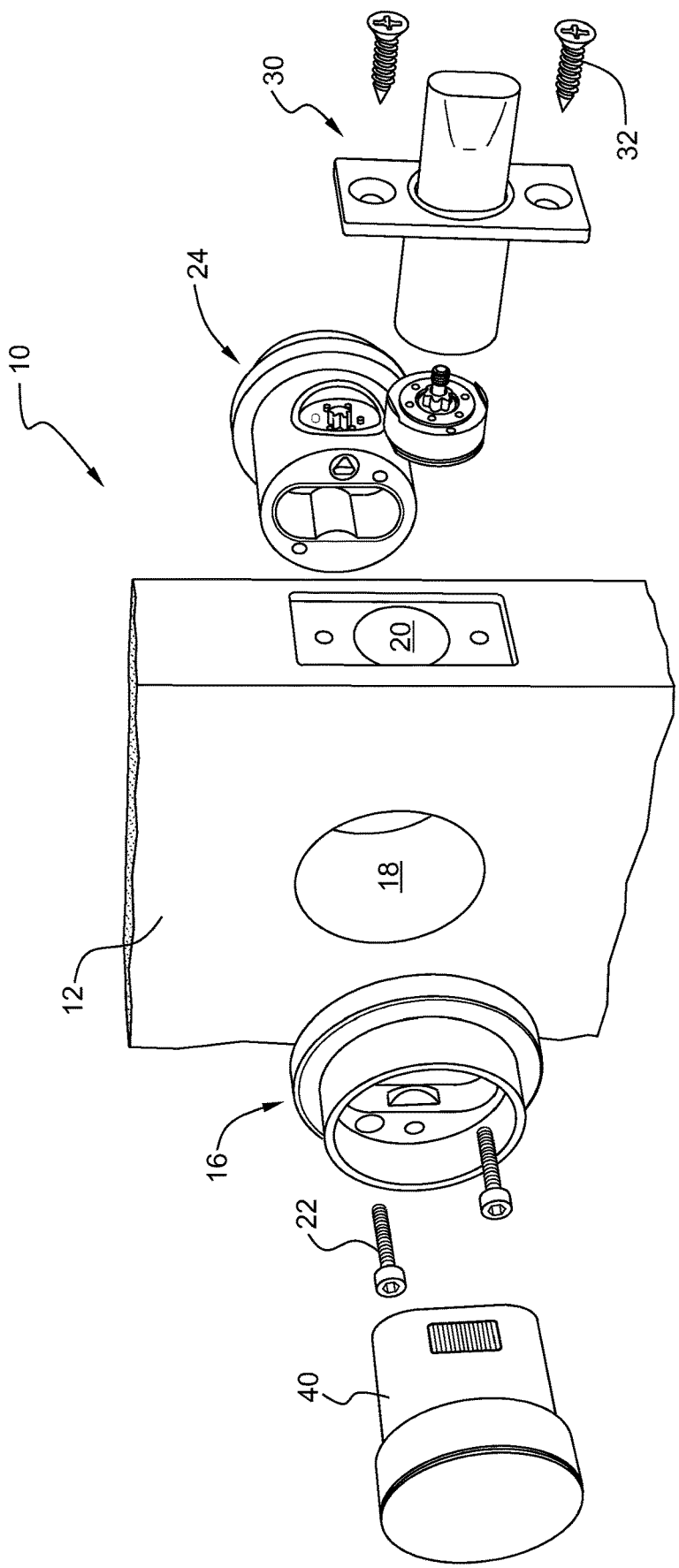
FIG. 3 is an exploded schematic view of the intelligent door locking system of the present invention mounted within the door panel of a door assembly.

FIGS. 14-40 depict the features and components of the outer bezel assembly 24 of the present invention. The outer bezel assembly 24 of the present invention includes an outer bezel portion 420 and a motor chassis assembly 520, FIG. 14. The outer bezel assembly 24 is preferably mounted to the exterior panel of the door assembly. When mounted as such, the motor chassis assembly 520 extends into the central bore 18 and the battery housing portion 62 of the battery puck assembly 40 extends into and seats within the chamber 522 (FIG. 3). Further, the drive housing element 360 of the pinion gear assembly 350 seats within a chamber 524 formed in a rear surface of the motor chassis assembly 520. The motor chassis assembly 520 includes an outer housing 526 that can either be a single integrated component, such as a can, or can include a plurality of spline elements or covers, as described further below. The outer housing 526 also includes an opening 528 that seats an insert or trim ring 532 to form a spline gear interface 510 having a spline gear 530 suitable for interfacing with the dead bolt assembly 30.

Figure 15:
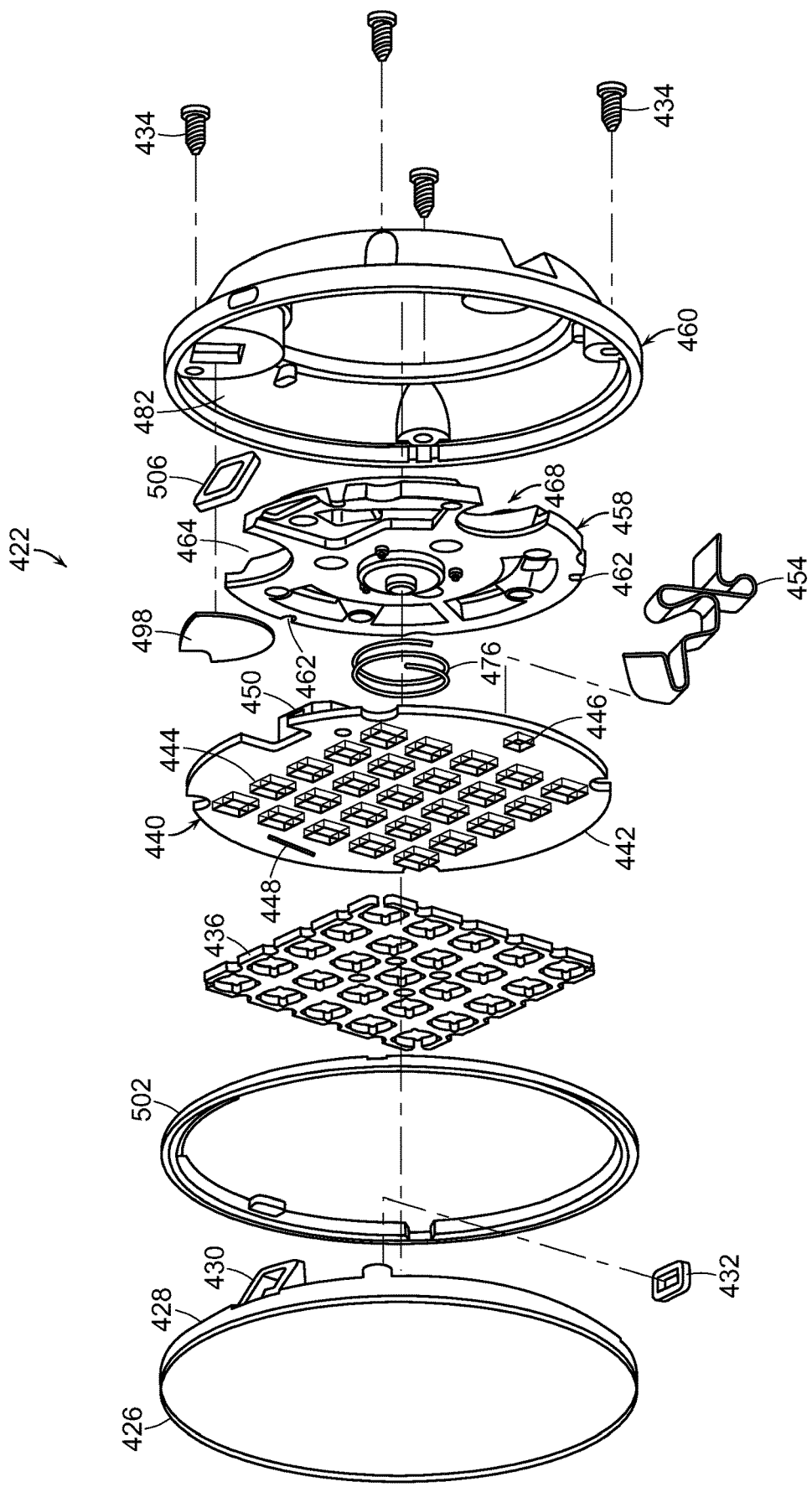
FIG. 15 is an exploded view of the outer bezel assembly of the door locking system according to the teachings of the present invention.
Figure 16:
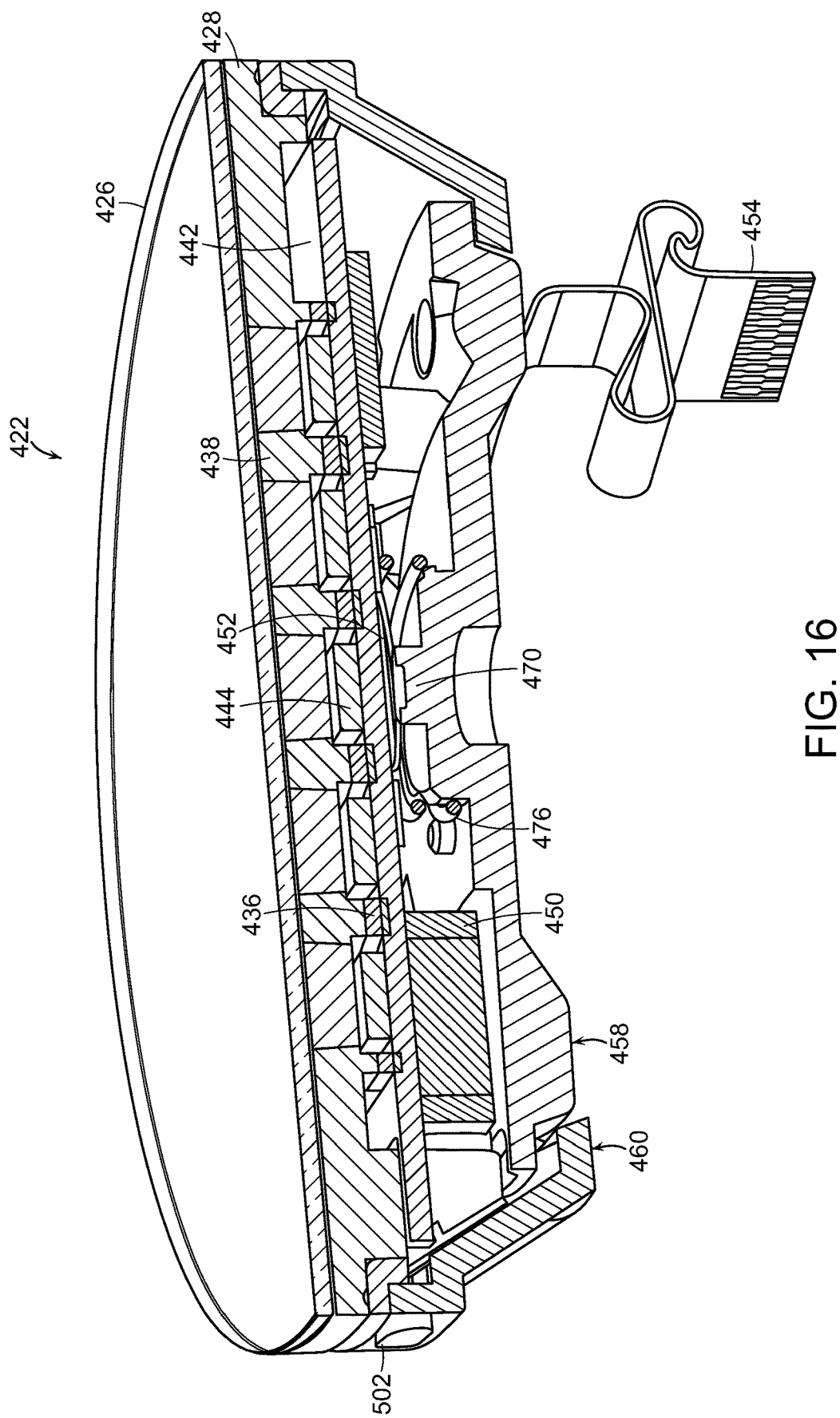
FIG. 16 is a cross-sectional view of the display assembly portion of the outer bezel according to the teachings of the present invention.
Figure 17:
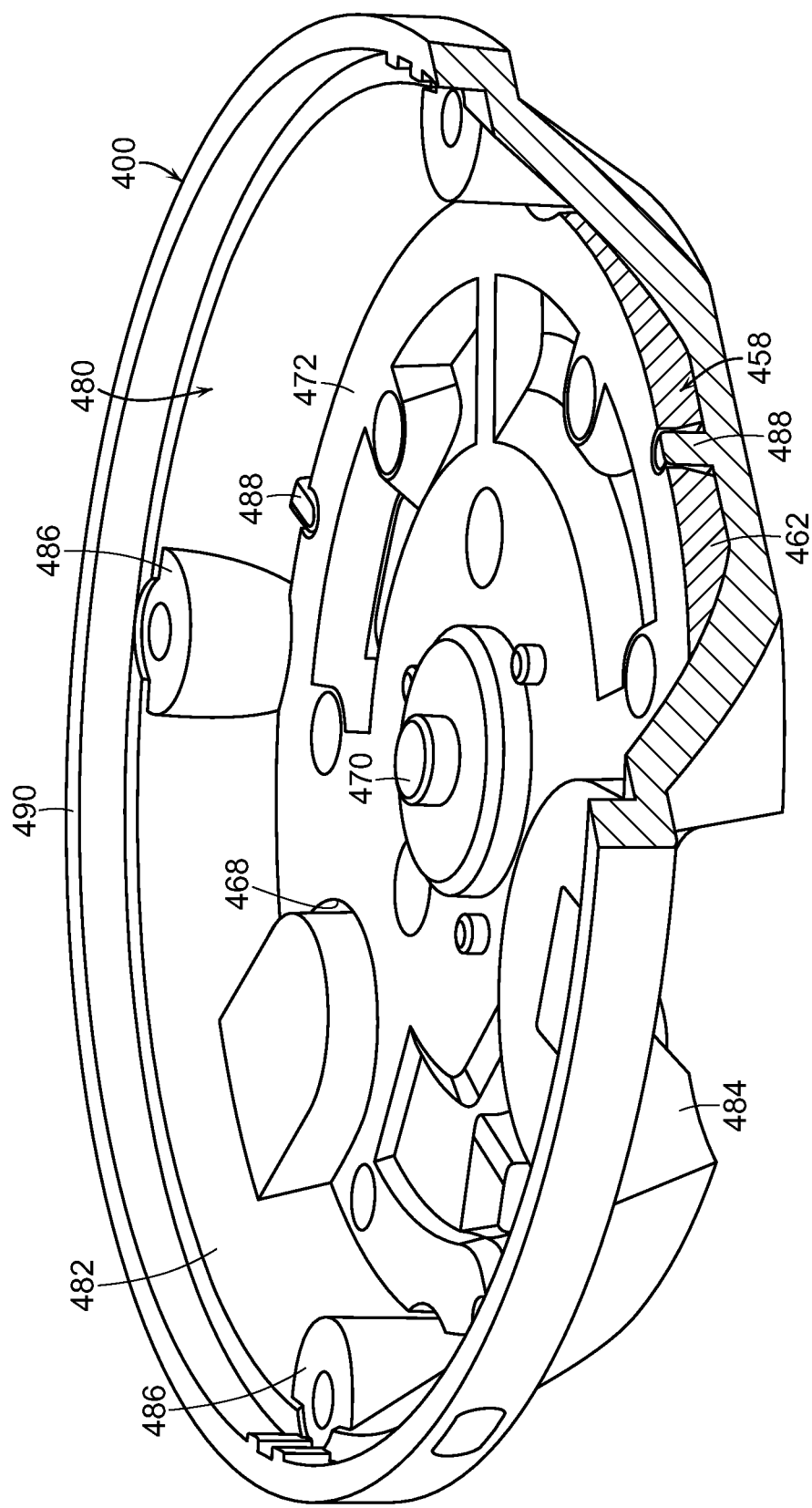
FIG. 17 is a perspective view of portions of the outer display housing and upstop plate portions of the display assembly according to the teachings of the present invention.

The illustrated outer bezel 420 includes a bezel assembly 424 and a display assembly 422 that is adapted to seat within a chamber formed in the bezel assembly 424. The illustrated display assembly 422 is similar to the display assembly 140 of the battery puck assembly 40. As shown in FIGS. 15-17, the illustrated display assembly 422 includes an outer glass layer 426 that is coupled to a diffuser 428. The outer glass layer 426 can be coupled to the diffuser by any suitable means, including for example by an optically transparent adhesive. The glass layer can be optically clear or can have any selected coating or film applied thereto, as is known in the art. The illustrated diffuser 428 has formed along a peripheral surface thereof a sound passage 430 for conveying any sounds generated within the display assembly 422. The display employs a first audio gasket 432 for sealing the gasket from the external environment while concomitantly allowing audio signals to pass therethrough. The diffuser 428 also includes a matrix of slots or openings 438 that corresponds to the pattern of LEDS formed on the electronics layer 440. The diffuser also includes a series of fastener receiving apertures that are adapted to receive the fasteners 434. The display assembly 422 also includes a foam gasket 154 and an audio seal gasket 156, where the foam gasket is mounted on the matrix of openings 438 and the audio seal is coupled to the sound passage 146.

The electronics layer 440 includes for example an LED printed circuit board (PCB) 442 that forms the electronics portion of the display assembly 422. The PCB 442 can include on a top surface thereof an array of light-emitting-diodes (LEDs) 444. Those of ordinary skill will readily recognize that the PCB can mount any selected number of LEDs and which can be arranged in any selected pattern. According to a preferred embodiment, the LEDs can be arranged in a five-by-five array of LEDs that includes both white and red LEDs and which form indicia suitable for display through the glass layer 426. For example, the LEDs 444 can be arranged to form numbers from 0-9 as well as other symbols or characters, such as vertical or horizontal hyphens or lines, to indicate one or more states of the door lock system or to display or communicate selected information. For example, the display can be actuated to show a vertical line which indicates that the door lock system is in an unlocked state or a horizontal line to indicate that the system is in a locked state. The PCB 442 can also include other system electronics, such as controllers, memory, antennas, sensors, and the like. For example, the PCB 442 preferably includes an ambient light sensor 446 for sensing the amount of light present in an external environment. The ambient light sensor 446 in conjunction with other electrical components can adjust, vary or control the brightness level of the display based on the brightness of the surroundings. The sensing of the ambient light allows the system to determine for example the illumination levels of the LEDs among other functions to thereby ensure optimal readability of the display. The PCB 442 can also include one or more radiating elements 448, which can include one or more antennas. The antenna can be any suitable type of antennas, and preferably includes a Bluetooth® antenna 448. The antenna 448 can be employed to sense the proximity of a selected electronic device, such as a smart phone, key fob and like electronic devices. The sensed proximity of a selected electronic device can serve to activate the door lock system 10. If the device is not sensed and a selected period of time has passed, then the system can power down, thus conserving battery power. The antenna can be preset at the factory such that the door lock system of the present invention has a predefined distance (proximity) for sensing the presence of an electronic device. The antenna is preferably a low power antenna so that the energy consumption requirements are relatively minimal and hence are not an unwanted drain on the on-board power source. The PCB 442 can also include on a bottom surface thereof a sound generating element, such as a buzzer 450. The buzzer can be used to create audible and/or tactile signals to provide the user with feedback and associated alerts. The PCB 442 can also include one or more sensors for sensing one or more system parameters. For example, the PCB can include one or more rotary encoders or other types of sensors, such as Hall Effect sensors, that can function as a rotary encoder. The rotary encoder can be used to determine the relative position of one or more system components. The PCB also includes on the rear surface thereof a dome switch 452 for operating in conjunction with a force concentrator to allow the user to input information into the door lock system. Other electronic components can also be provided on the PCB. The display assembly 422 also includes an electronics flex assembly 454 that can be coupled to the dome switch 452.

The illustrated display assembly 422 further includes an up-stop plate 458 that is configured for mounting to an outer display housing 460. The up-stop plate 458 has a generally circular shape that includes a plurality of cut-outs disposed at different radial positions. For example, the up-stop plate 458 has a series of radially spaced apart notches 462 formed in the edge region of the plate main body. The notches 462 are sized and configured for seating a rib-like protrusion formed on and extending outwardly from a front surface of the display housing 460. The up-stop plate 458 also includes other cut-outs formed in the peripheral edge of the plate, including for example audio cut-outs 464 and 468. The front surface 472 of the up-stop plate also includes a force concentrator 470 formed in a central region of the surface 472. The force concentrator is adapted to interact with the dome switch 452 to allow the user to input selected commands, such as to lock or unlock the door assembly, or to enter selected information or data, such as a PIN number. A biasing element, such as spring 476, is mounted about the force concentrator and is adapted to contact both the front surface 472 of the up-stop plate 458 and a back surface of the PCB 442 in order to provide resilient biasing to selected portions of the display assembly, such as to the display sub-assembly formed by the electronics layer 440, the glass layer 426 and the diffuser 428. This resilient biasing allows the display sub-assembly to deflect relative to the display housing 460 at any particular location when an axial force is applied to the display sub-assembly by the user. Specifically, the user can press the display at any location the display sub-assembly deflects in response.

The outer display housing 460 includes a cup-like main body that forms a central chamber 480 having a circumferential inner surface 482. The inner surface 482 has a series of different surface features formed thereon, including an audio surface protrusion 484 that is adapted to seat an audio mesh or seal 506. A further seal 498 is provided and is coupled to the display housing to provide additional sealing capabilities from the external environment. The inner surface 482 further includes a series of fastener receiving apertures 486 that are sized to seat the fasteners 434, and a series of spaced apart ribs 488. The ribs are adapted to seat within the notches 462 formed in the up-stop plate 458. When the ribs are seated within the notches, the combined mechanical assembly helps prevent rotation of the up-stop plate 458.

The display subassembly can be mounted within the chamber 480 of the display housing 460. The display assembly can be secured to the display housing via the fasteners 434. Prior to mounting the display subassembly within the chamber 480, the seal element 502 is disposed about the top peripheral edge surface 490 of the display housing 460. The seal element 502 is then squeezed between the edge region of the underside of the display subassembly and the display housing, thus forming a seal therebetween. The seal helps keep unwanted contaminants and moisture out of the display assembly 422.

The illustrated outer bezel 420 further includes, in addition to the display assembly 422, a bezel assembly 424. As shown in FIGS. 18-24, the bezel assembly 424 includes a security plate 550 that is configured for mounting to the outside surface of the door panel 12. The security plate 550 has a front surface 552 and an opposed rear or back surface 554 that has a cup like shape. The front surface 552 has an opening or aperture 556 formed therein for seating a bearing ring 566. The bearing ring has a central opening that is sized and dimensioned for seating a pinion gear 570. The pinion gear 570 includes a gear ring portion 572 that has a plurality of gear teeth 574 disposed about the outer circumferential surface thereof. The gear ring portion also has a cavity formed in a top portion thereof for seating a magnet 576. The pinion gear 570 also includes an elongated shaft portion 578 that extends outwardly and away from the rear surface 554 of the security plate 550 when the pinion gear is mounted within the opening 556. The pinion gear 570 is adapted to transfer the rotation of the external dial assembly 600 to the motor chassis assembly 520. According to one practice, the dial element 600 need only be rotated in selected circumstances, such as when the power provided by the power sources is low, also known as an emergency mode.

The magnet 576 is also adapted to interface with the sensors of the display assembly 422. Specifically, the PCB 442 of the electronics layer 440 can include a rotary encoder that can comprise for example one or more Hall Effect sensors. The encoder can determine for example the rotary position of the dial element 600. The encoder converts the rotary position of the dial element into an electrical signal for processing by the door lock system 10. The rotary position of the outer bezel 420 can be determined by the position of the magnet 576 relative to the encoder 328. As the magnet passes by the encoder, the encoder senses the change in magnetic energy and generates an electrical signal in response. This signal can be correlated to the rotary position of the dial 600.

Figure 18:
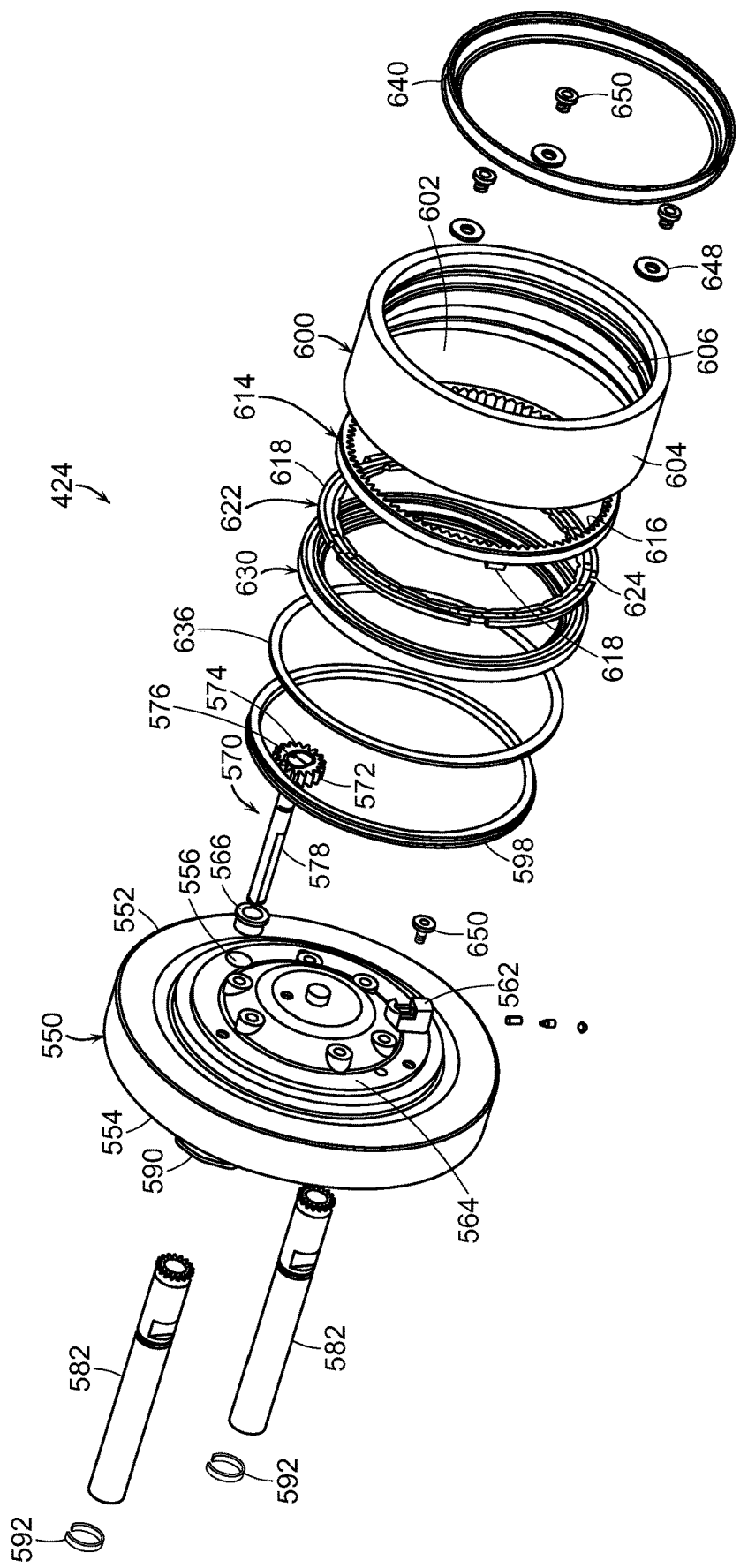
FIG. 18 is an exploded view of the components comprising the outer bezel portion of the outer bezel assembly according to the teachings of the present invention.
Figure 19:
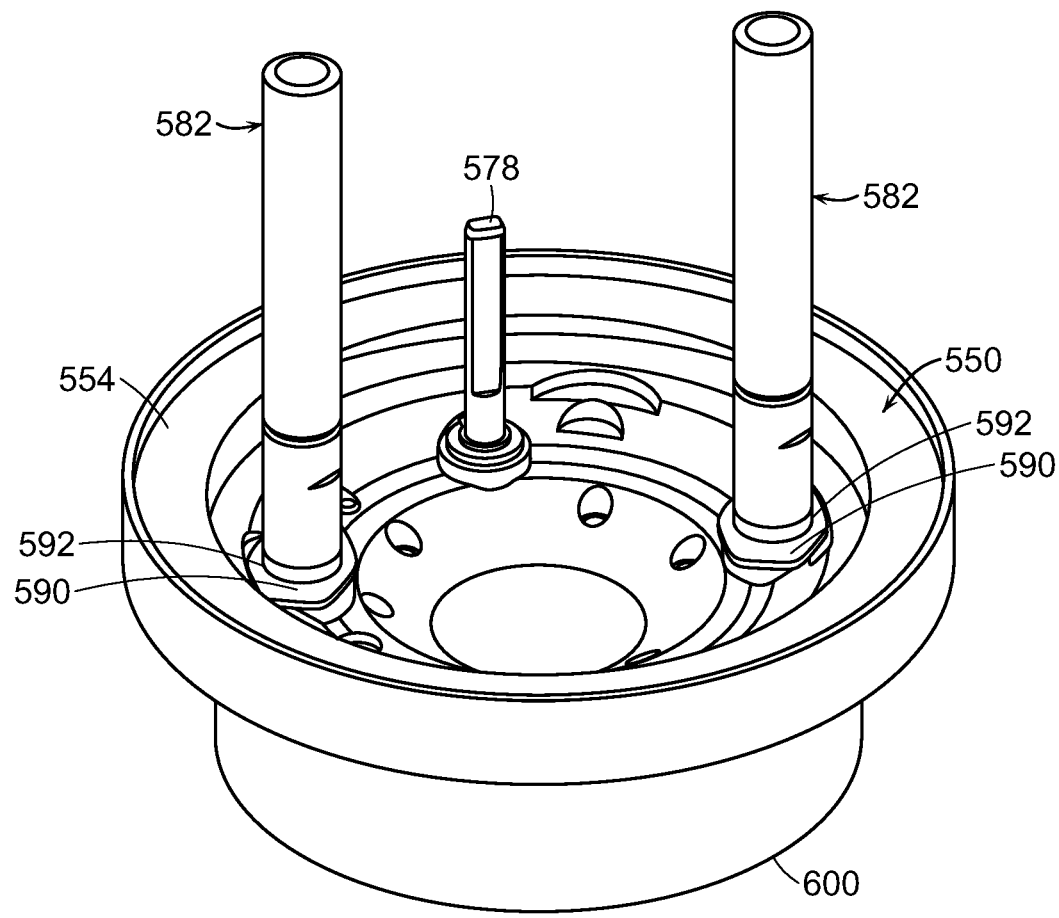
FIG. 19 is a perspective rear view of the outer bezel portion of the outer bezel assembly illustrating the stand-offs according to the teachings of the present invention.
Figure 20:
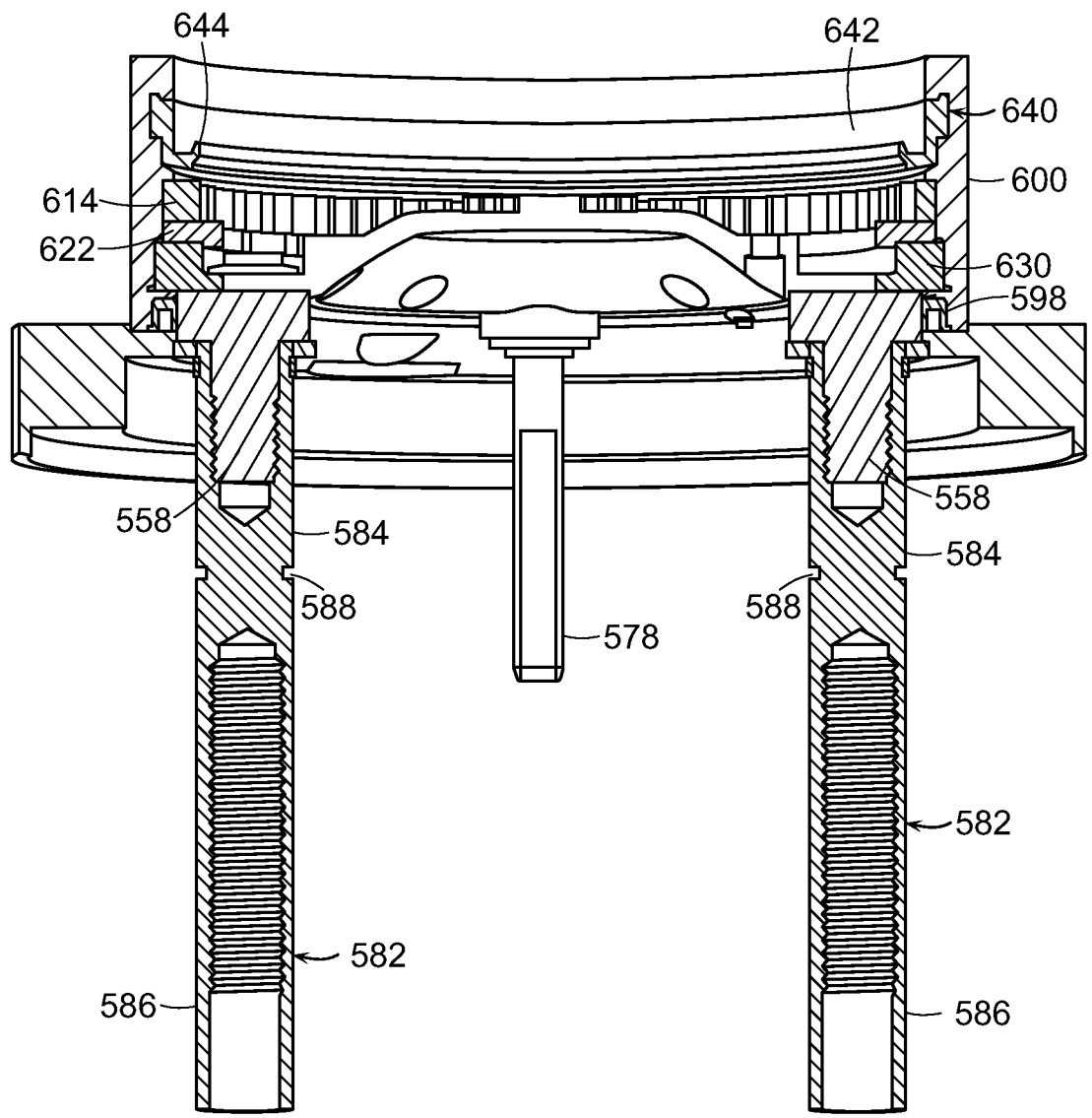
FIG. 20 is a cross-sectional view of the outer bezel portion according to the teachings of the present invention.
Figure 21:
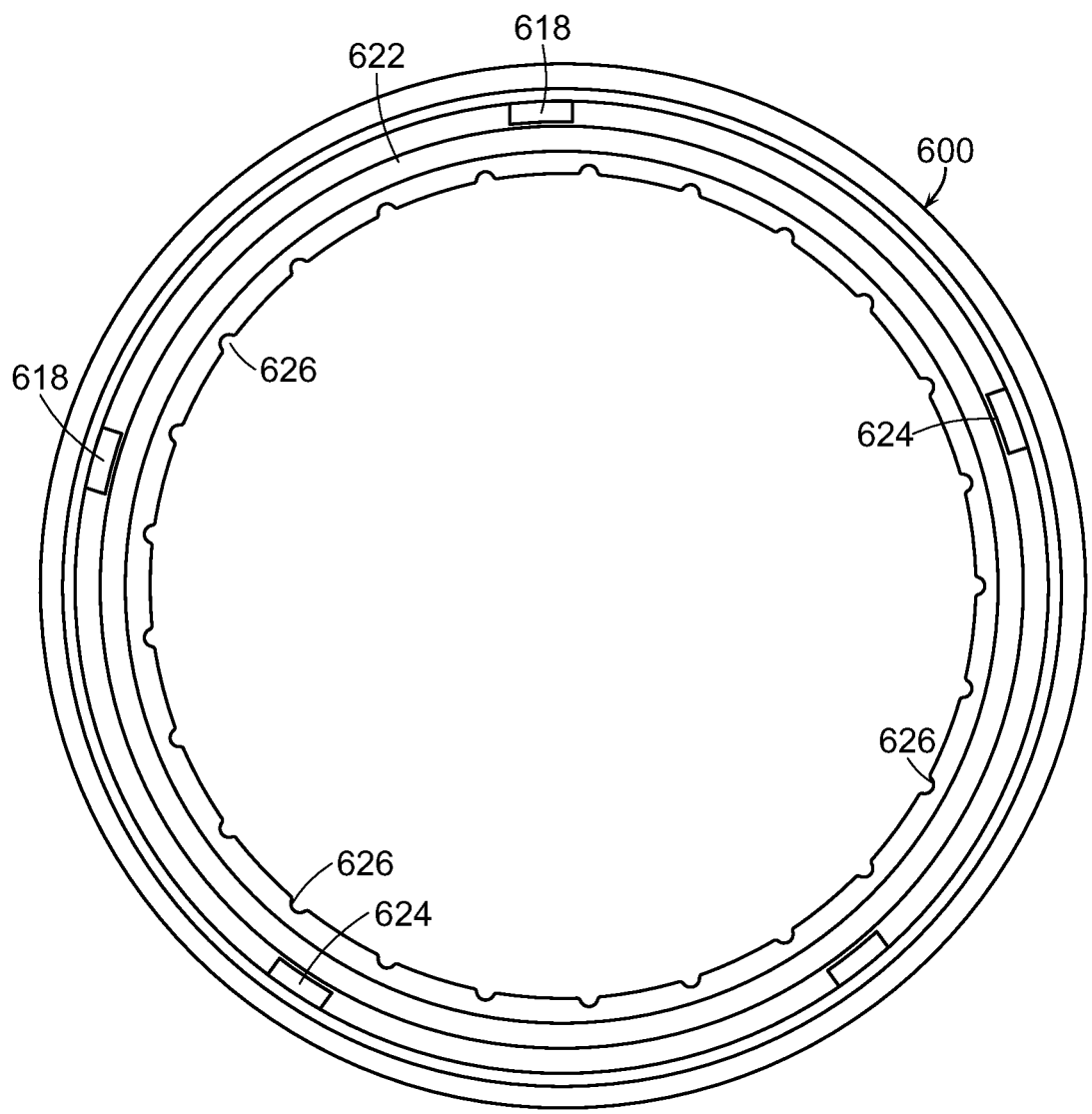
FIG. 21 is a perspective top view of the dial element mounting selected components, such as the detent ring and the gear ring according to the teachings of the present invention.
Figure 22:
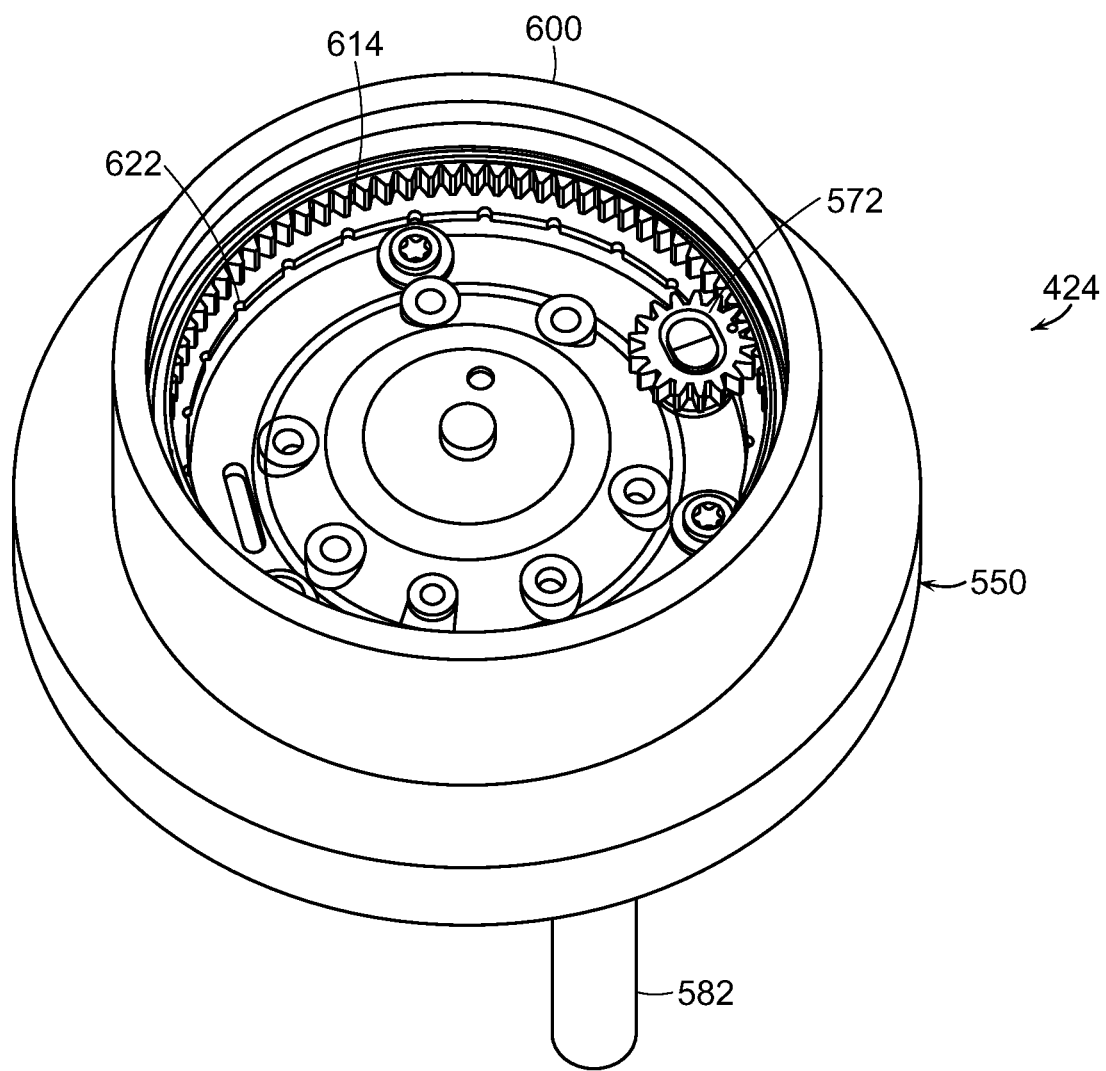
FIG. 22 is a perspective view of the bezel assembly portion of the outer bezel assembly according to the teachings of the present invention.

As shown in FIGS. 18-20, the rear surface 554 of the security plate 550 also includes a pair of threaded outwardly extending mounting protrusions 558, 558 that are adapted to mount a pair of stand offs 582, 582. The stand-offs 582 have a first end 585 having a threaded aperture forming a female end of the stand off for threadingly receiving and mounting the mounting protrusions 558, 558. The stand-offs also include an opposed second end 586 that also includes an aperture that is at least partly threaded for receiving a post from the inner bezel assembly 16. According to one practice, the threads of the first end 584 and the threads of the second end 586 are threaded in opposite directions. For example, the aperture formed in the first end 584 preferably has left handed threads formed therein and the aperture formed in the second end 586 has right handed threads. The opposite threads allow the user to more easily disengage the inner bezel assembly 16 from the outer bezel assembly 24 in the event that the posts and stand-offs are inadvertently stuck together. The bezel assembly 424 further includes an indexer or stopper element 592 mounted over each stand off 582, and which are held in place by a retaining ring 592. The stopper elements prevent the stand-off from accidentally rotating through mechanical interference with the rear surface of the security plate when the posts from the inner bezel are inserted into the second end 586 of the stand offs 582. Further, the motor chassis housing portion of the outer bezel assembly 24 is also adapted to seat on the stand-offs 582. An optional sealing element 546 can be mounted to a peripheral portion of the rear surface 554 of the security plate and is preferably disposed between the door panel and the security plate to form a weather tight seal, FIG. 14.

The outer bezel 420 also includes a lip seal element 598 that is disposed about a central raised protrusion formed on the front surface 552 of the security plate 550. The lip seal element 598 forms a weather tight seal between the security plate 550 and a rotatable dial element 600. The dial element 600 has a circular main body that has a central opening 602 formed therein. The main body has a smooth outer surface 604 and an inner surface 606 that has a series of grooves or channels formed therein for seating selected components. The inner surface 606 has a selected channel that is sized and configured for seating an annular rotatable gear ring 614. The gear ring 614 has an inner surface that includes a series of gear teeth 616 and has a top or side surface that includes a series of circumferentially spaced apart raised protrusions 618 that function as aligning and retention features. The gear ring 614 is press fit into an associated channel of the dial element 600. The gear ring is adapted to interface with the pinion gear 570. The gear ring 614 is also coupled to an annular detent ring 622. The detent ring has formed on an outer circumferential surface a series of cut-outs 624 that are aligned with the raised protrusions 618 of the gear ring 614, FIGS. 18 and 21. The interface of the protrusions and the cutouts aligns the detent ring relative to the gear ring and rotatably connects the two rings. The detent ring 622 also includes an inner circumferential surface having a series of detents 626 formed thereon. The detents 626 are intended to interface with other structure as described below to provide a tactile feel to the user when the dial element 600 is rotated.

The dial element 600 also mounts a bearing ring 630. The bearing ring includes a first end surface that contacts an end surface of the detent ring 622, and a retaining ring 636 is positioned adjacent the opposed end surface. The retaining ring 636 can be mounted if desired in a channel formed in the inner surface 606 of the dial element 600. On an opposed end of the dial opposite the end mounting the retaining ring, a seal element 640 can be mounted within a dedicated groove or channel. The seal element 640 can have any selected shape or size, and preferably has a cup-like shape, FIG. 23. Specifically, the seal element 640 has a main body portion 642 that seats within the channel and a curved portion 644 that is adapted to interface with and contact a backside of the display housing 460 of the display assembly 422, FIG. 24. The dial 600 and associated components are then mounted to the security plate 550 and on the lip seal 598. Various washers 648 and screws 650 can be coupled to the security plate 550.

Figure 23:
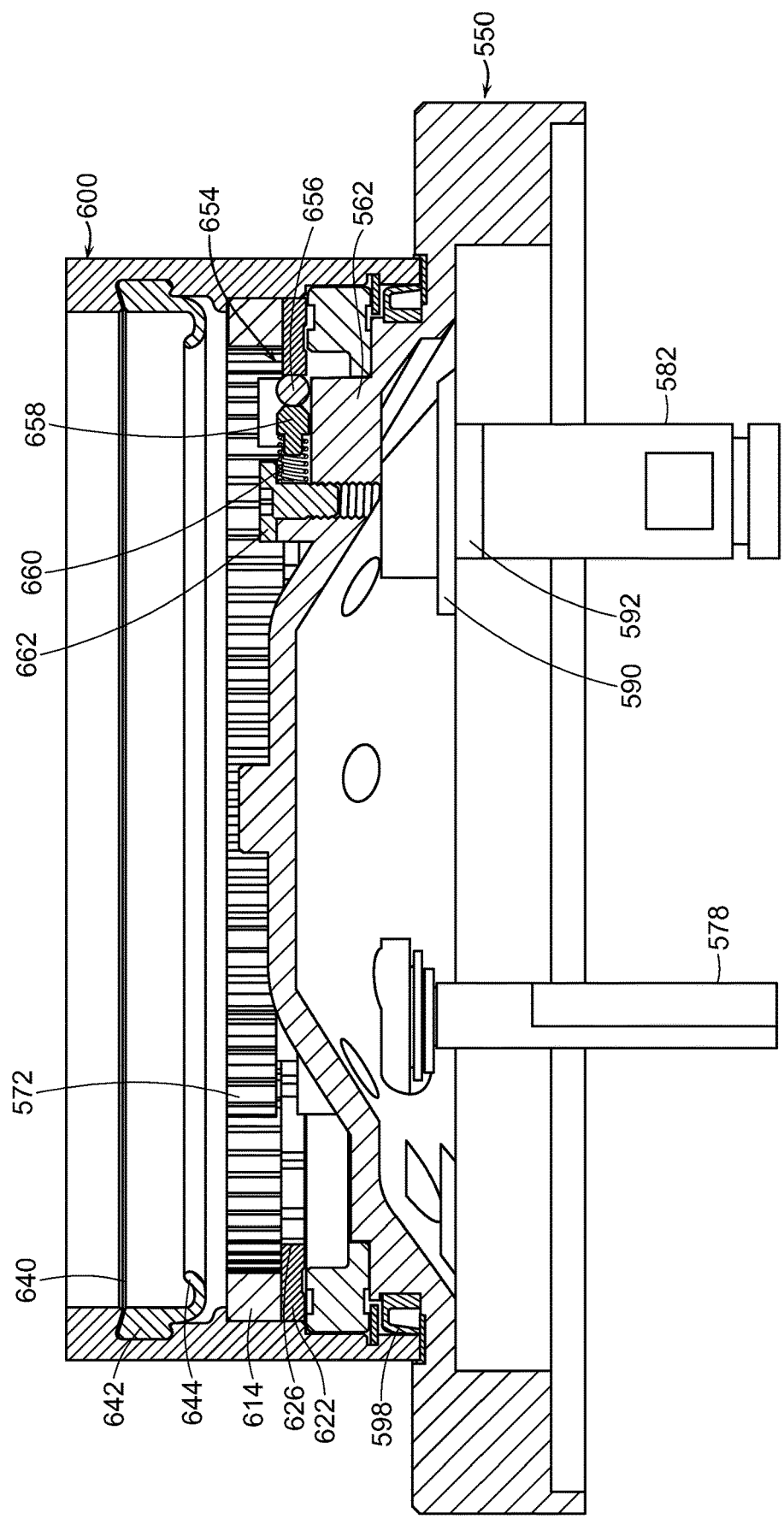
FIG. 23 is a cross-sectional view of the bezel assembly portion of the outer bezel assembly according to the teachings of the present invention.
Figure 24:
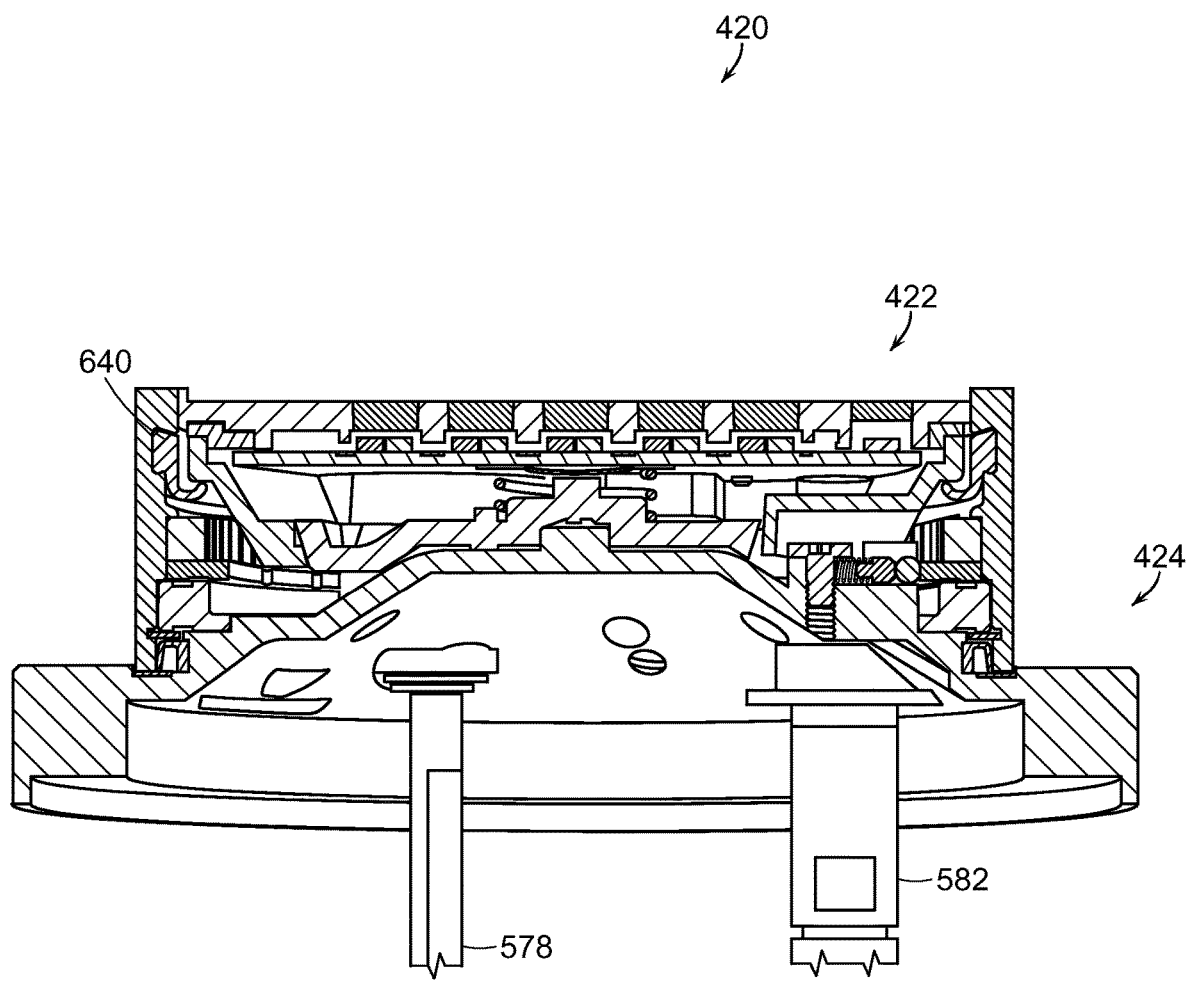
FIG. 24 is a cross-sectional view of the outer bezel assembly of the present invention illustrating the interaction between the dome switch and the force concentrator as well as other components according to the teachings of the present invention.
Figure 25:
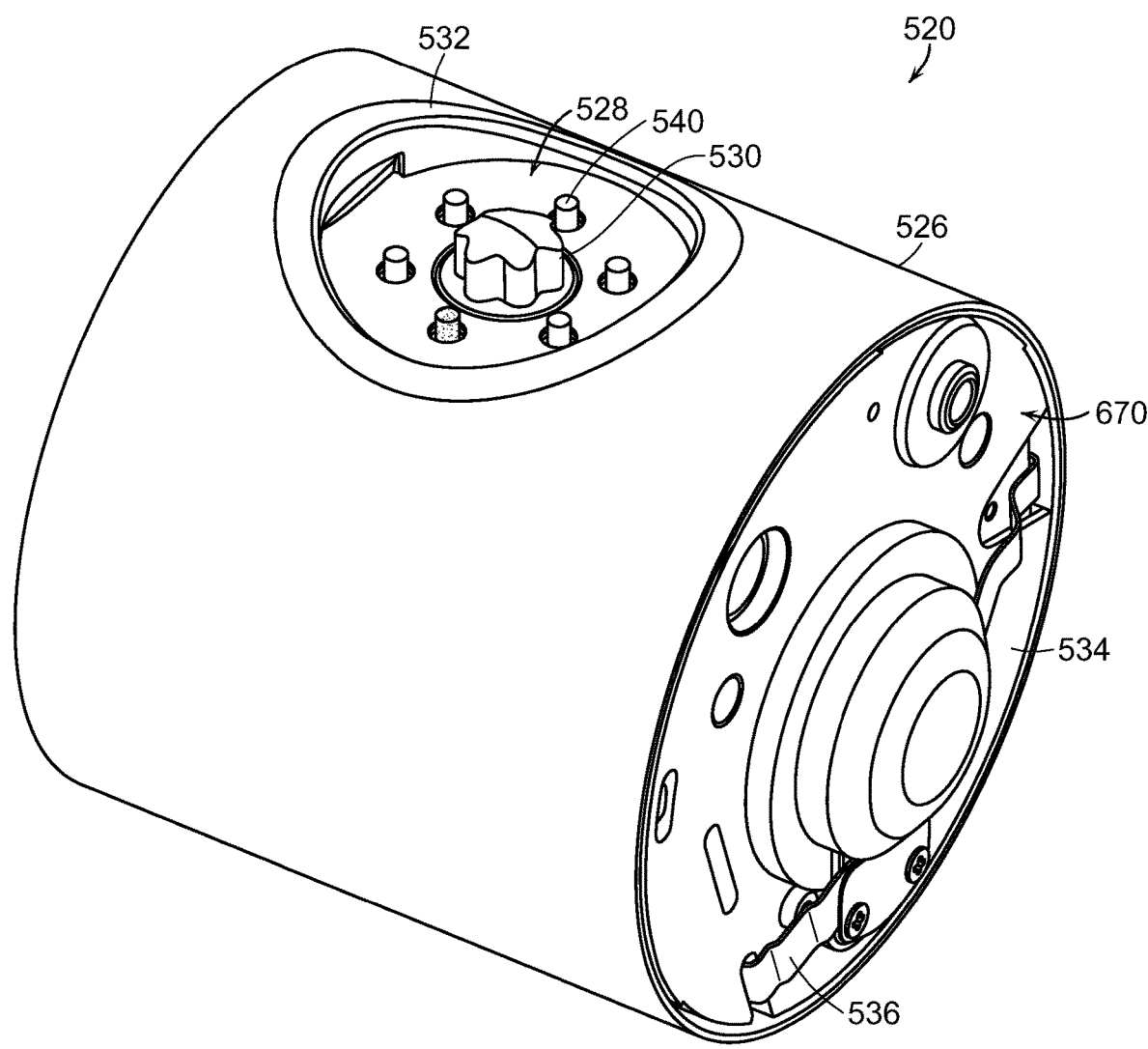
FIG. 25 is a perspective view of the motor chassis assembly portion of the outer bezel assembly according to the teachings of the present invention.

FIGS. 23 and 24 illustrate a detent assembly 654 that operates with the detent ring 622 and selected surface features formed on the security plate 550 to provide tactile feedback to the user when rotating the dial element 600. The front surface 552 of the security plate 550 includes a detent housing element 562 that extends outwardly from the front surface. The detent housing element 562 includes a housing having an internal chamber for mounting selected components. In particular, the chamber mounts a biasing element, such as a spring 660, a spring pin 658 and ball element 656. A spring stop element, such as fastener 662, can also be employed to form a spring seat. The opposite end of the spring is coupled to one end of the spring pin 658, the opposite end of which applies a force against the ball element 656. The force applied by the spring element 660 and associated pin 658 applies a biasing force against the ball element 656, thus forcing the ball element at least partially out of the chamber of the detent housing element 562 and into one of the detents 626 formed in the detent ring 622. As can be readily discerned from the current disclosure, the dial element 600 when rotated by the user also serves to rotate the gear ring 614 and associated detent ring 622. When the detent ring is rotated, the ball element 656 is moved out of a first selected detent and into an adjacent detent based upon the direction of rotation. The ball element 656 moving out of a first selected detent and into an adjacent detent provides a tactile response to the user when rotating the dial element 600. The detent ring provides the user with a tactile sensation that corresponds to selected positions of the dial element. In this manner, the user can determine whether the dial has moved one or more selected positions. The rotatable dial element can be employed to enter information, such as a security code or other selected information, into the door lock system.

The illustrated security plate 550 also includes a slot 564 formed on the front surface 552 for seating a portion of the flex assembly 454. Specifically, the flex assembly 454 which extends outwardly from the rear of the display assembly 422, when assembled, then passes through the slot 564 of the security plate for subsequent connection to and/or communication with a main printed circuit board housed within the motor chassis assembly 520.

Moreover, the stand offs 582 further include along the length of its outer surface between the first end 584 and the second end 586, and preferably closer to the first end 584, a detent groove 588 for seating a further retaining ring (not shown), FIG. 20. The detent grooves 588 and associated detent rings define the outer axial extent that the inner bezel assembly 16 and the outer bezel assembly 24 can move relative to each other in an axial direction. The ability for the inner and outer bezel assemblies to be spaced within a predefined range allows the door lock system 10 to be mounted to doors having varying thicknesses.

Still further, the display assembly 422 is axially movable so as to allow the assembly to be depressed or moved relative to the bezel assembly 424. This movement allows the user to select displayed information. In this regard, the electronics layer 440 includes on a backside thereof the dome switch 452 that is adapted to be resilient and hence can be depressed. The user can depress the dome switch by applying an axial force to the display assembly. When the force is applied, the dome switch is forced against a selected stationary support structure, such as the force concentrator 470. The dome switch 452 is forced against the force concentrator 470 and hence is flexed. The dome switch in combination with the force concentrator serves to limit the axial travel of the electronic assembly during use. The axial travel of the display assembly can be limited by the security plate 550. The dome switch also generates and hence supplies the electrical signals to the PCB that allows a user to select and enter information and to send lock and unlock commands to the door lock system.

FIGS. 25-40 illustrate the motor chassis assembly 520 of the outer bezel assembly 24. The motor chassis assembly 520 includes the outer housing or can 526 that can be formed as a single integrated piece or can be formed from multiple housing components. The housing 526 has an opening 528 that allows access to a spline gear interface having a spline gear 530, a trim ring 532, and series of pin-type contacts 540. The trim ring 532 has a selected undercut or threaded configuration that allows the dead bolt assembly 30 to connect thereto via a twist-lock feature. The chassis assembly further includes a top housing component 534 that has coupled thereto a flex lead 536 for coupling to the main PCB of the assembly.

As shown in FIGS. 25-28, the illustrated can or housing portion 526 has a main body having a first end 684 that is open to form a chamber 676 for seating the motor and gear assembly 670. The housing has an opposed second end 686 that is relatively closed but includes a central opening 678 for seating a portion of the battery puck assembly 40 of the inner bezel assembly 16. The second end 686 also includes an opening that corresponds to the drive element chamber 524 and one or more fastener receiving apertures for receiving set screws and the like. The relatively cylindrical side or outer surface 682 of the housing 526 also includes a spline gear opening 680 for overlying the spline gear 530 of the motor and gear assembly 670 and for seating or accommodating the trim ring 532. The inner surface of the second end 686, which also corresponds in part to the floor of the chamber 676, mounts a connection element 690 that mounts an input gear 826. The drive element 360 which seats in the drive element chamber 524 rotates the input gear 826 when the dial element 260 of the inner bezel assembly 16 is rotated.

Figure 26:
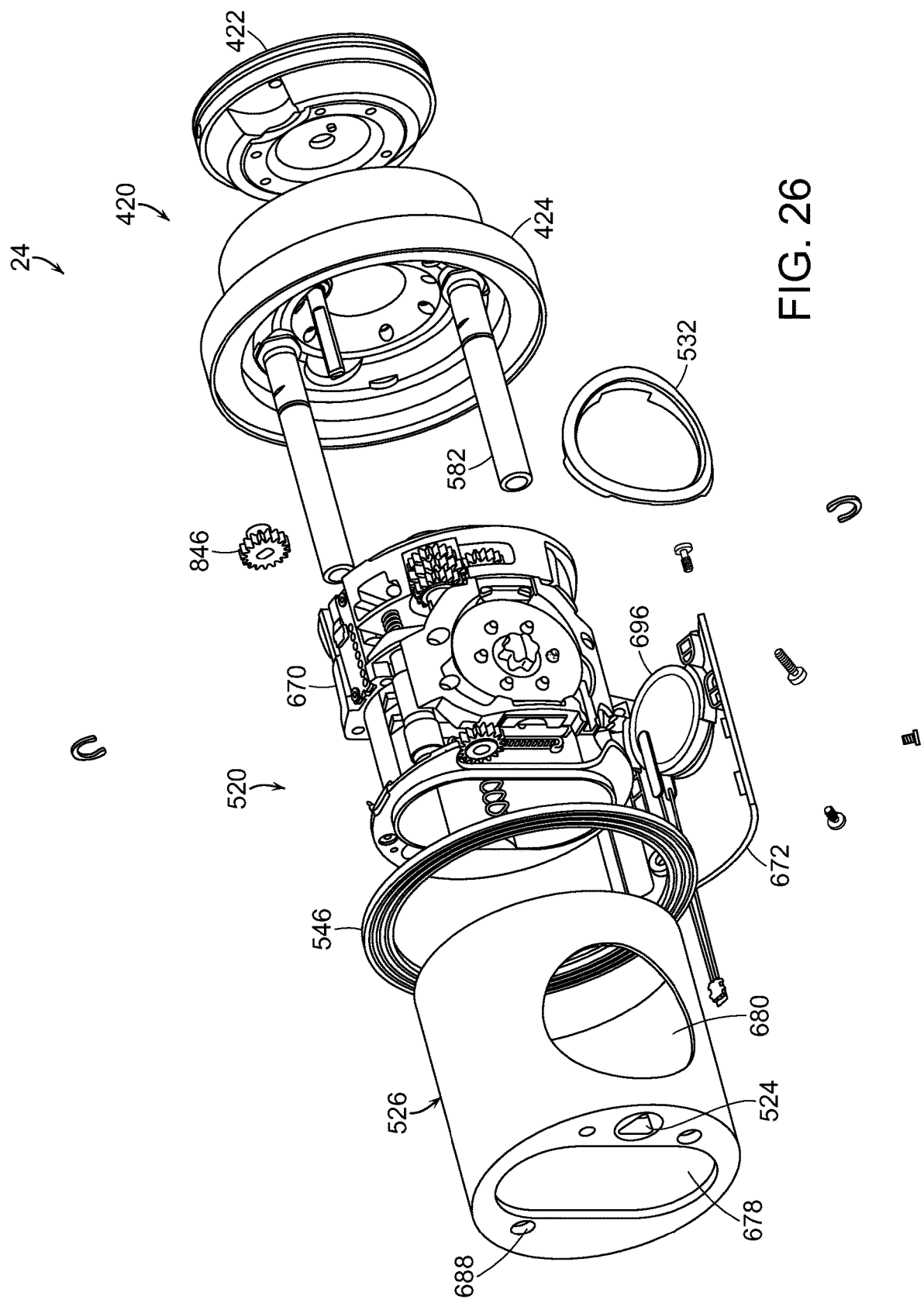
FIG. 26 is an exploded perspective rear view of the outer bezel assembly according to the teachings of the present invention.
Figure 27:
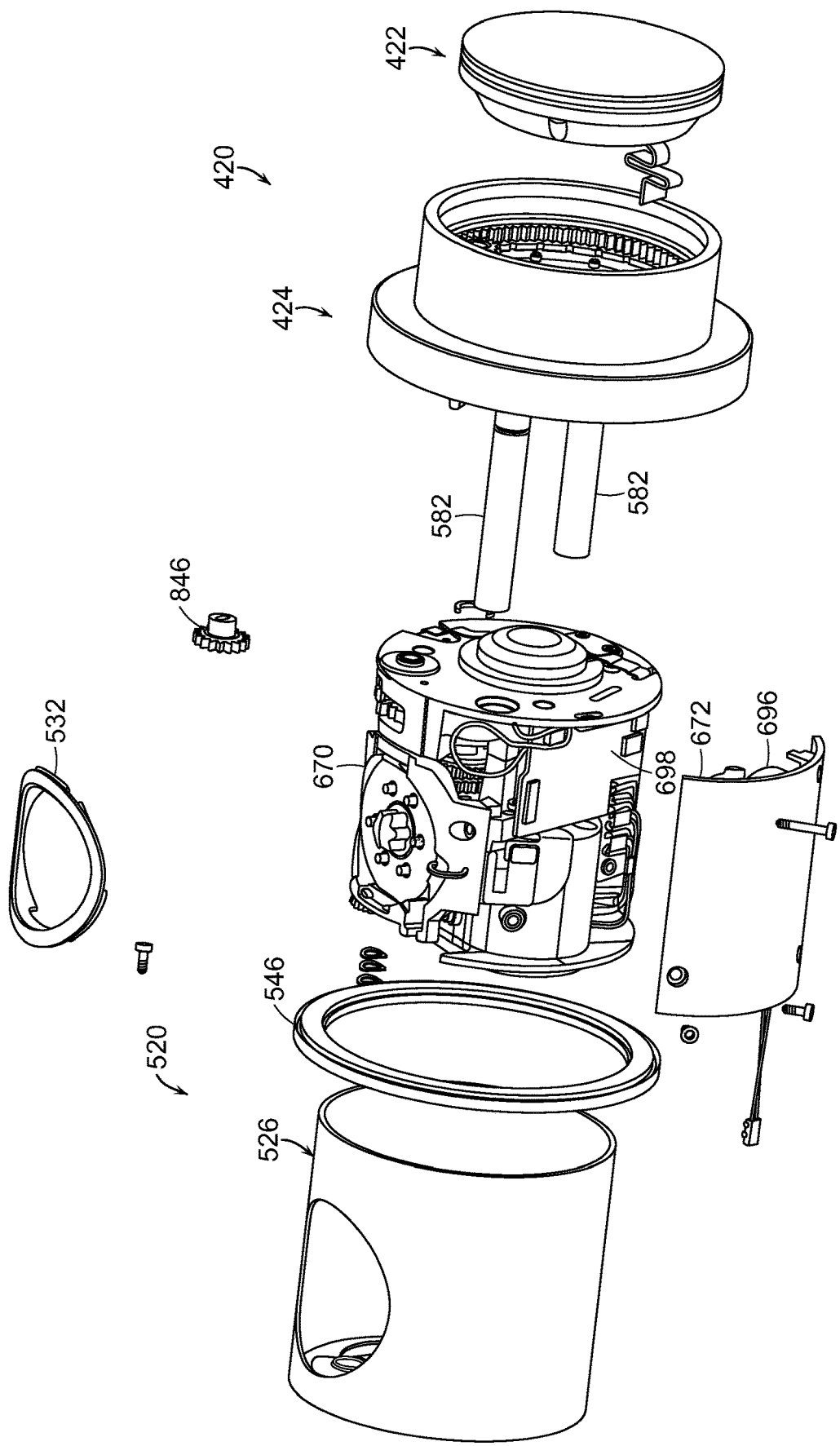
FIG. 27 is an exploded perspective side view of the outer bezel assembly according to the teachings of the present invention.
Figure 28:
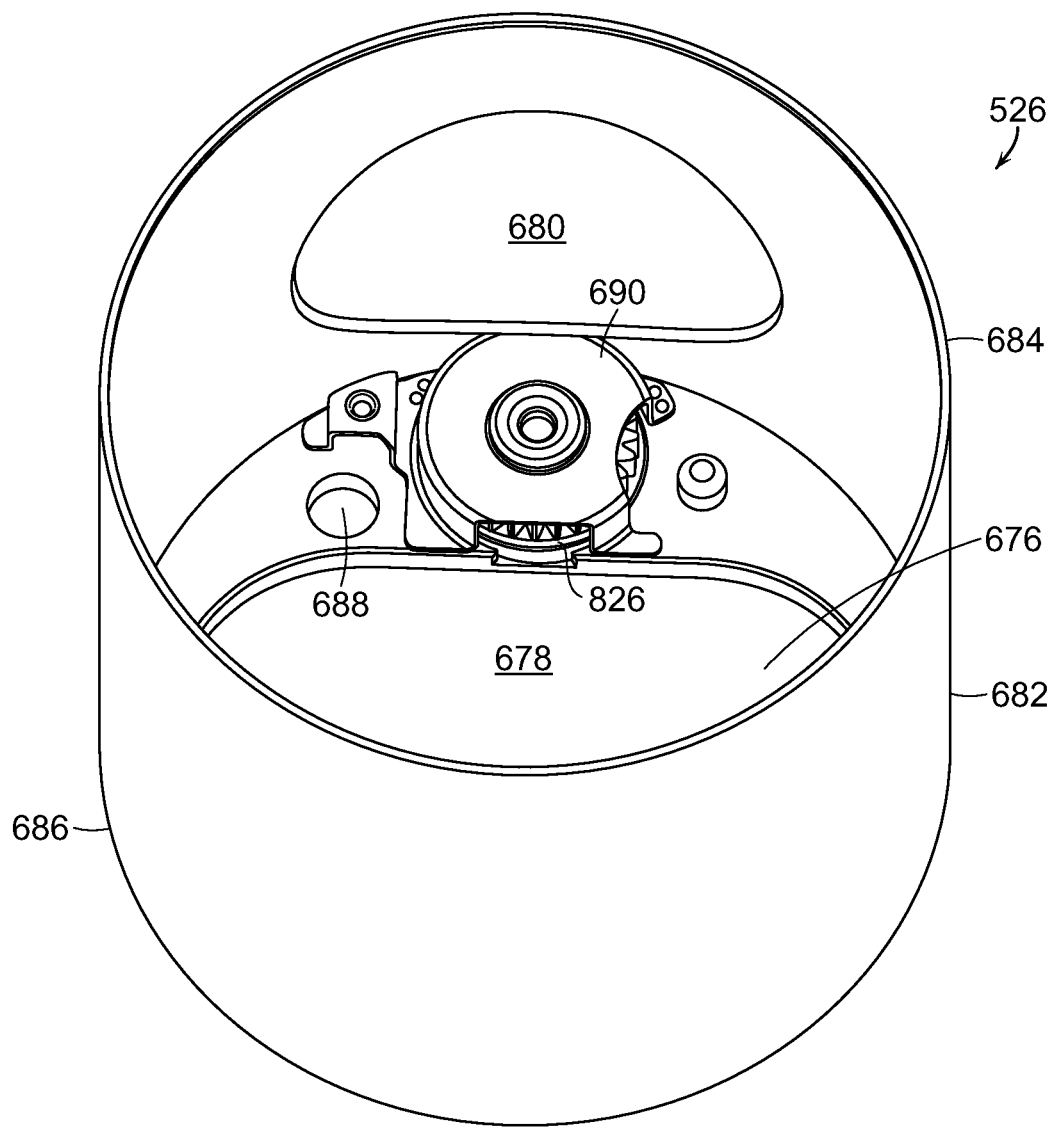
FIG. 28 is a perspective view of the inside of the outer housing portion of the motor chassis assembly illustrating the mounting of the input gear

As shown in FIGS. 26 and 27, the motor chassis assembly 520 includes a motor and gear assembly 670 having different gear assemblies for allowing the assembly to activate the dead bolt assembly 30. The various gear assemblies are adapted to interface with the drive element 360 of the inner bezel assembly 16 so as to transmit rotary movement of the dial element 260 to the motor and gear assembly 670, which in turn transmits the rotary force to the output spline gear 530. Likewise, the motor and gear assembly 670 is adapted to be mechanically coupled to the output pinion gear 570 of the outer bezel 420. The rotary movement of the dial element 600 is transmitted to the output pinion gear 570, which in turn is mechanically coupled to selected gears within the motor and gear assembly 670. This rotary force is then transmitted to the output spline gear 530. The motor and gear assembly can include one or more cover portions 672 that overly and are secured to the motor and gear assembly. The cover portions 672 can mount selected system components, such as for example a power source, such as a secondary or back-up power source 696. The motor and gear assembly can include any selected number of PCBs and associated electrical connections, and any selected number of electronic components, such as sensors, motors, and the like. The PCBs can include a main PCB or motherboard 698 or can employ a distributed series of PCBs each housing selected electronic components. The back-up power source provides sufficient power for the door lock system 10 to operate in the event that the primary power source, provided by the batteries of the battery puck assembly, contains an insufficient level of power to operate the system. The secondary power source can be coupled for example to the main PCB 698 of the motor chassis assembly 520. The secondary power source 696 thus provides a redundant power mechanism that enables the door lock system to function properly in adverse circumstances (e.g., M-mode).

Figure 29:
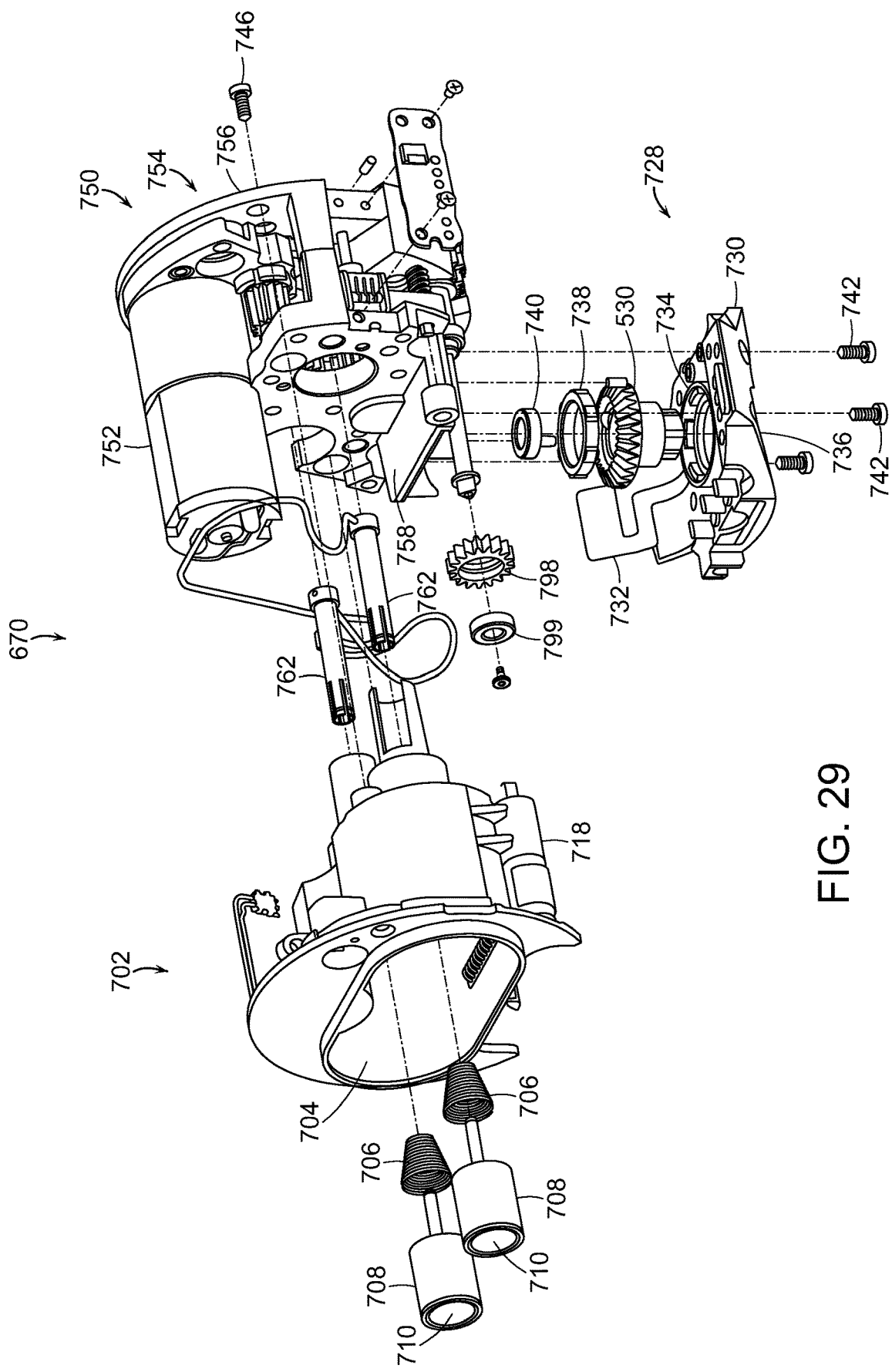
FIG. 29 is a partial exploded view of the motor and gear assembly portion of the outer bezel assembly according to the teachings of the present invention.

As shown in FIG. 29, the motor and gear assembly 670 further includes a main housing sub-assembly 702, a spline cover subassembly 728, and a motor unit subassembly 750. The motor and gear assembly 670 allows movement of selected gears contained therein when driven by one or more internal motor elements. The internal motor elements enable remote operation of the door lock assembly by operating one or more gear assemblies without requiring manual movement of the dial elements of either of the bezel assemblies. The motor and gear assembly can also transmit a selected force to the deadbolt assembly 30 by manual operation of the dial element of either the inner bezel assembly 16 or the outer bezel assembly 24. The motor and gear assembly 670 can also be operated in an emergency mode when the batteries housed within the battery puck assembly are incapable of providing sufficient power to operate the assembly.

The main housing sub-assembly 702 has a main body portion that has an opening 704 formed at one end for receiving a pair of biasing elements, such as springs 706, and a pair of terminals or plungers 708. The springs and plungers are mounted within the opening 704 and within selected recesses formed therein. The plungers have mounted within end portions thereof a magnet 710. The opening is intended to accommodate or seat at least a portion of the battery puck assembly 40 when mounted within the door lock system. The plungers 708 and magnets 710 help maintain electrical and mechanical connection, in addition to the battery plate 130, between the power sources (e.g., batteries) mounted within the battery puck assembly and the motor chassis assembly 520. The main housing sub-assembly further mounts on an outer surface thereof a first motor 718, such as a pager motor. The motor 718 is intended to operate with a shifter assembly and associated gears as described below. The main body and can also include selected electrical connections, such as flex connections.

The spline cover subassembly 728 includes a spline cover housing 730 that includes a series of apertures formed in a relatively circular pattern about a central opening 736. The housing seats an electrical interface assembly 732 that includes a circular arrangement of the pin type contacts 540. The pin type contacts 540 are arranged and positioned on the interface assembly so as to seat within the series of apertures. The spline cover subassembly is also configured to mount the spline gear 530 for interfacing with the deadbolt assembly 30. The subassembly also includes a bearing ring 734 for seating in the central opening. Other bearing rings 738, 740 can also be included. The spline cover subassembly can be coupled to the motor chassis assembly and/or the motor unit assembly by suitable fasteners 742.

Figure 30:
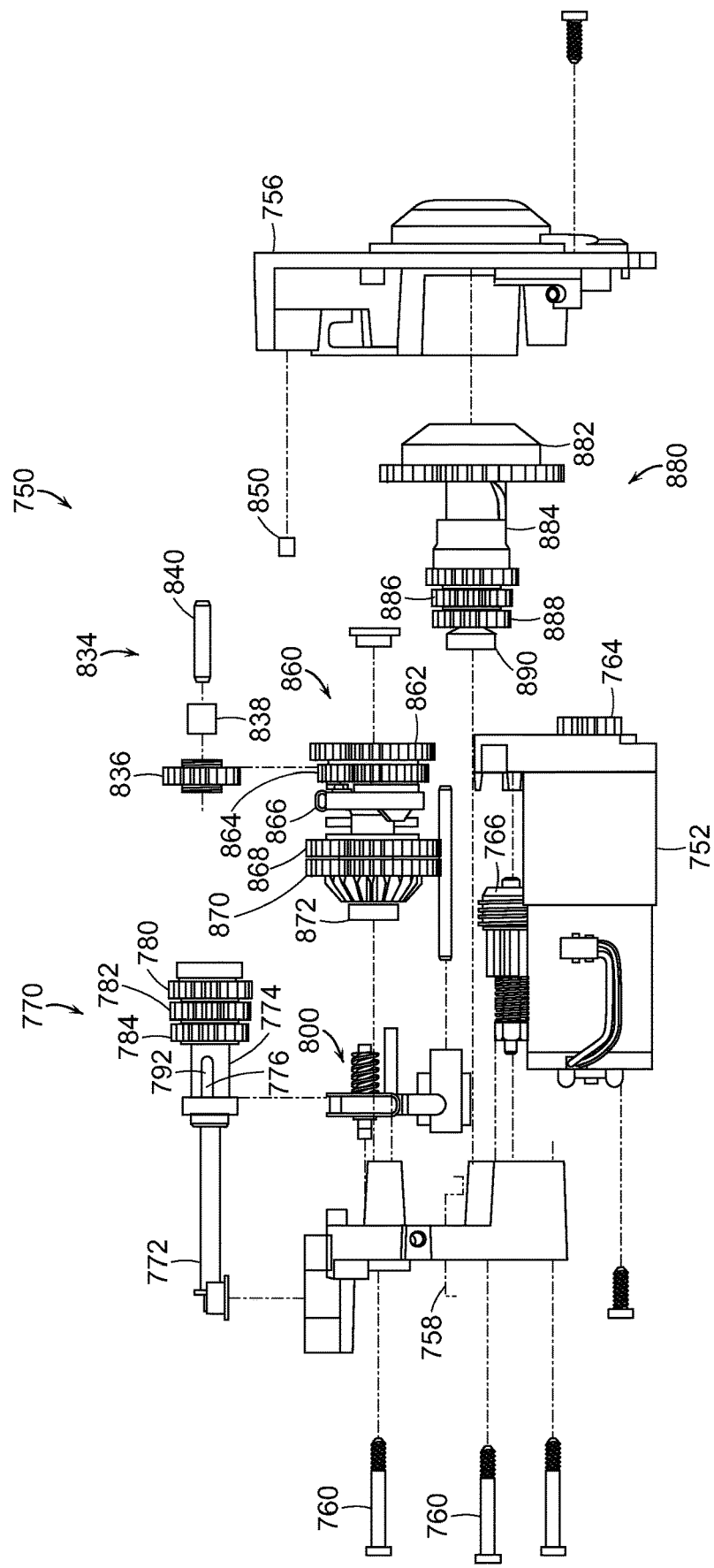
FIG. 30 is an exploded view of the motor unit subassembly according to the teachings of the present invention.
Figure 31:
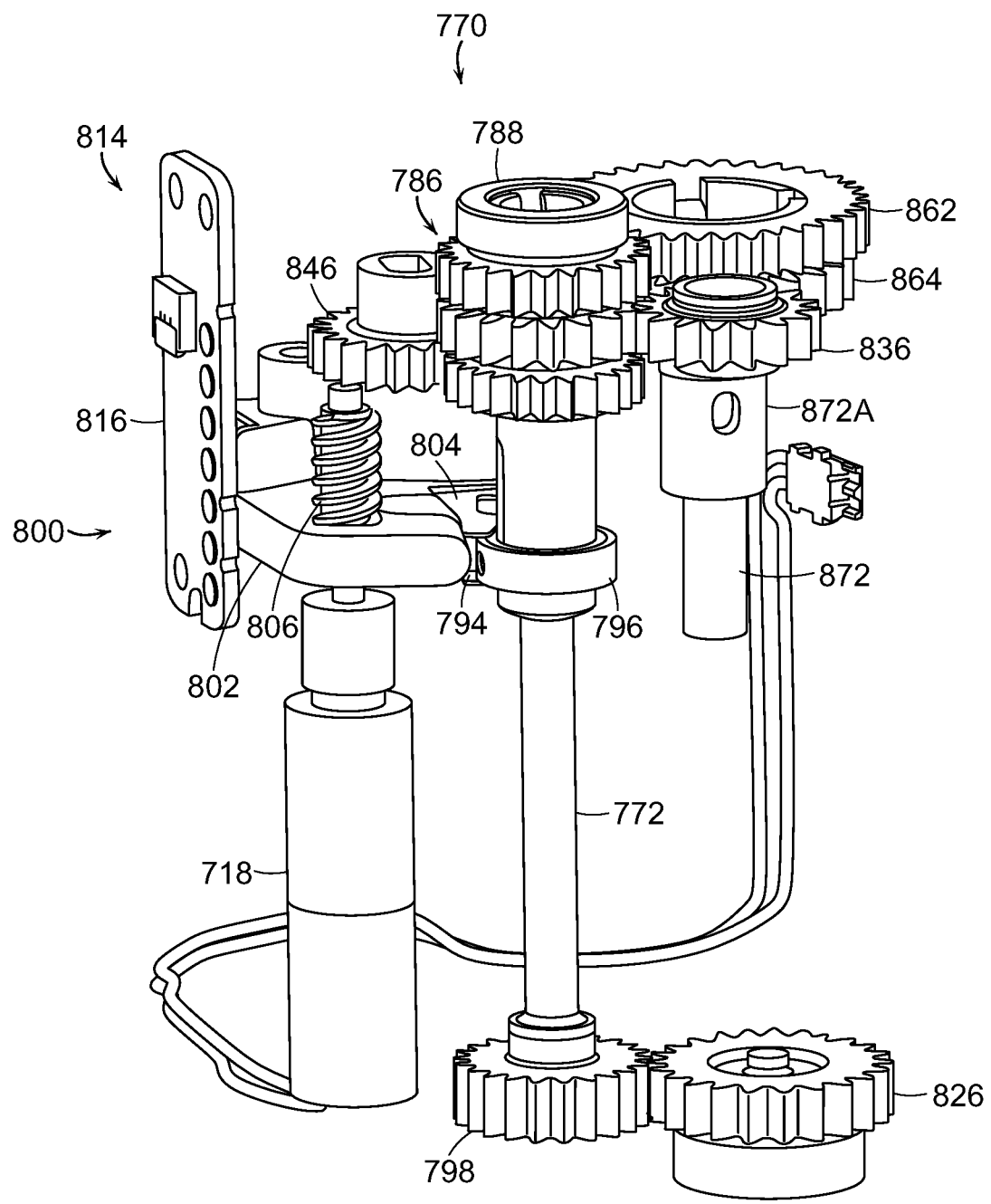
FIGS. 31 and 32 are isolation views of the shifter gear assembly and selected gears that interact therewith according to the teachings of the present invention.
Figure 32:
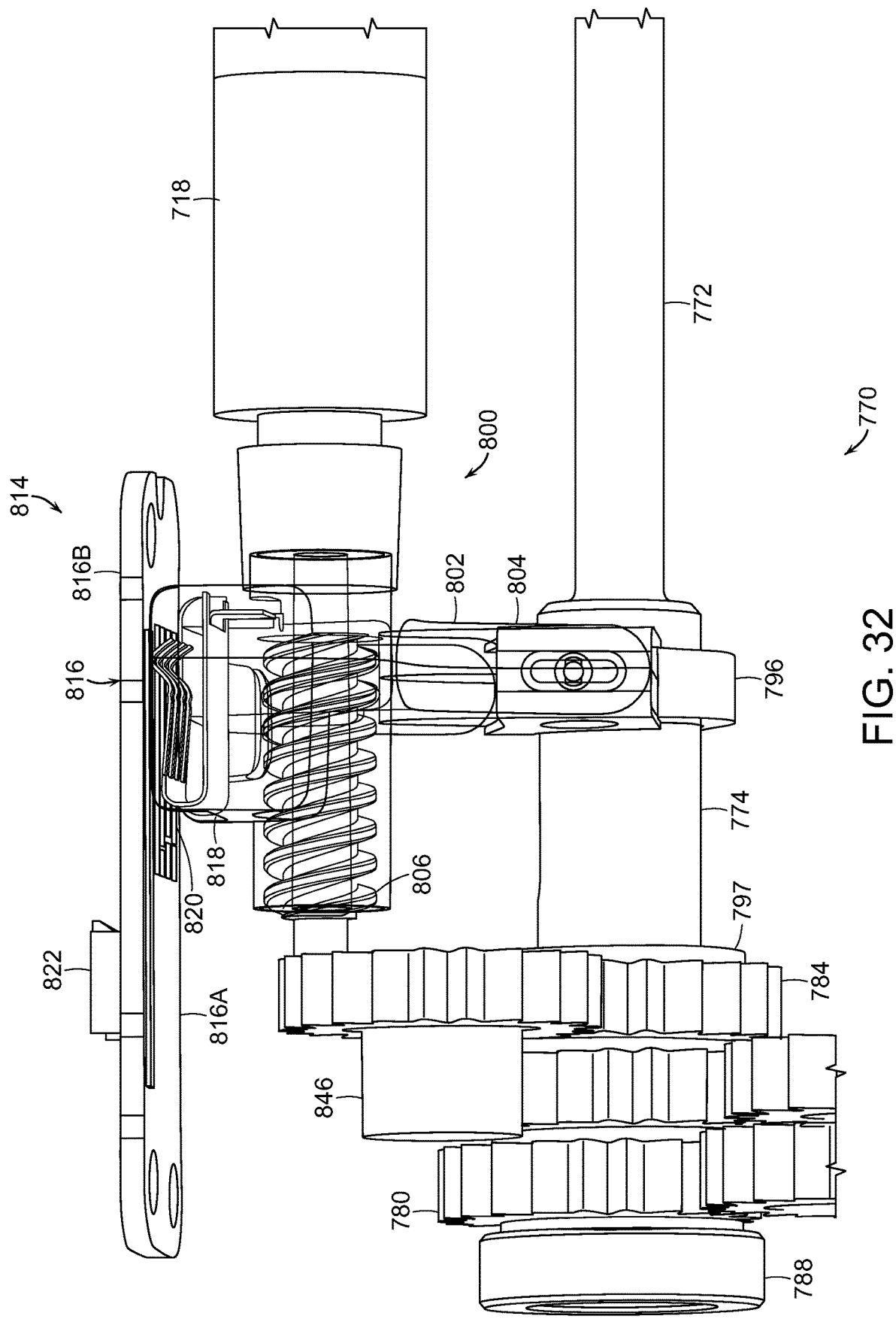
Figure 33A:
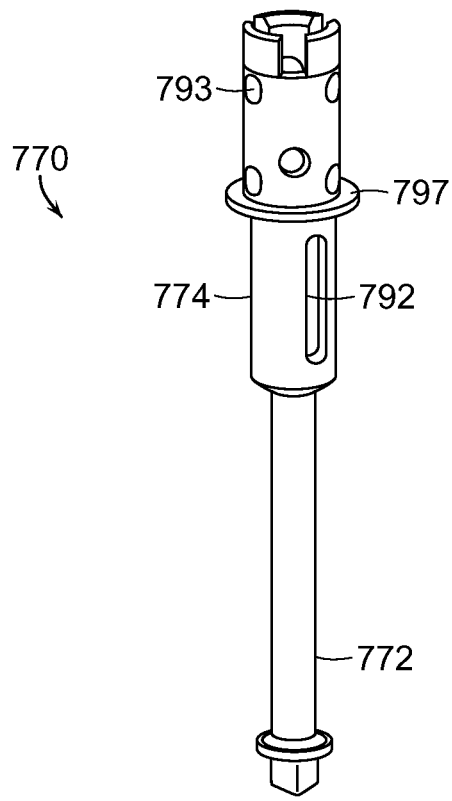
FIG. 33A is an isolation perspective view of the shifter gear shaft and related housing of the shifter gear assembly according to the teachings of the present invention.
Figure 33B:
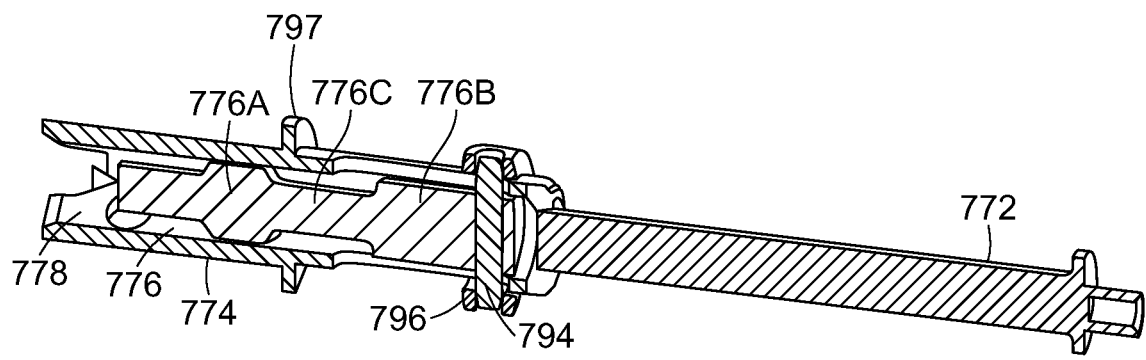
FIG. 33B is a cross-sectional view of the shifter shaft and shuttle element components of the shifter gear assembly according to the teachings of the present invention.
Figure 34:
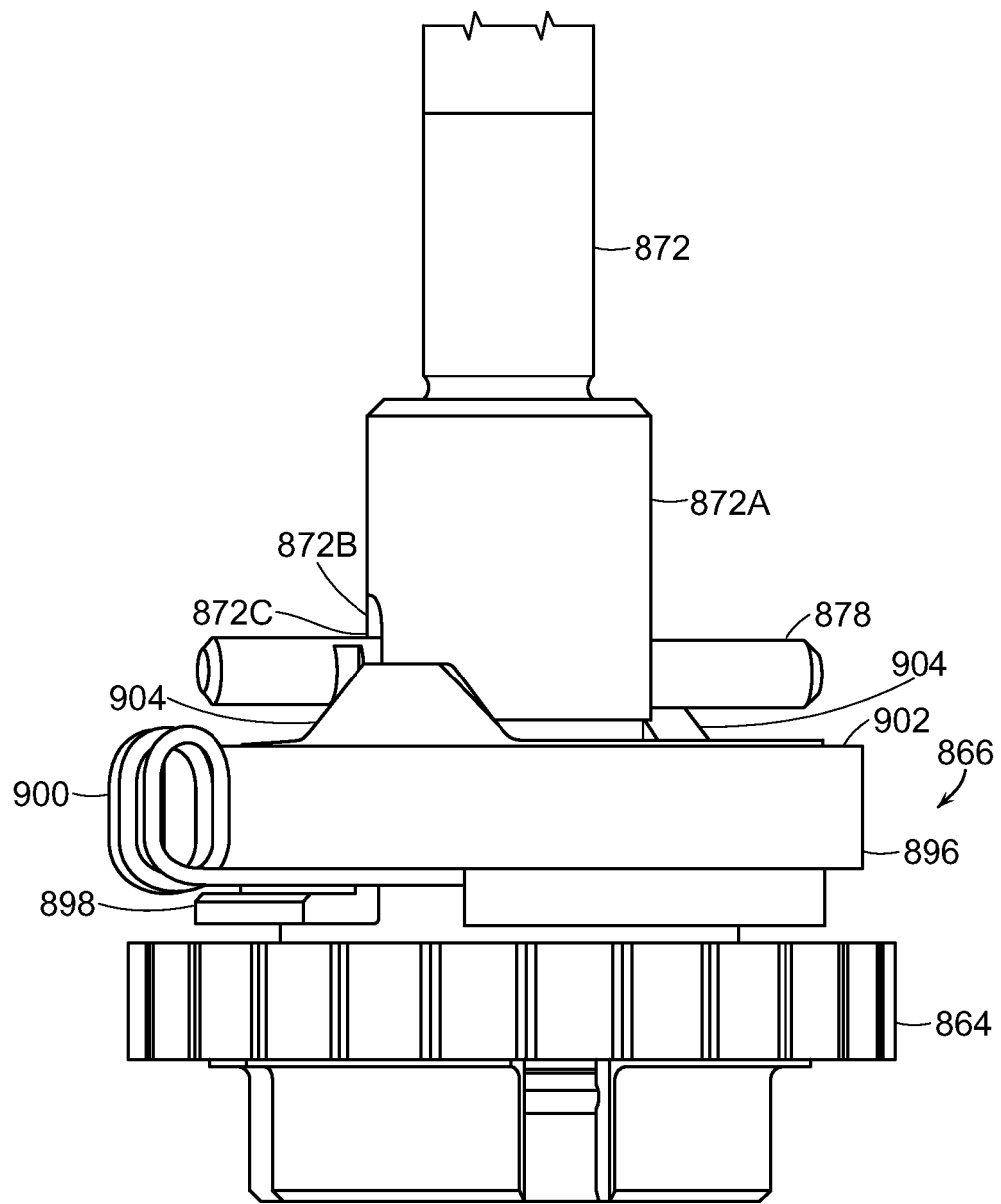
FIG. 34 is an exploded isolation view of the kicker gear assembly portion of the manual output gear assembly according to the teachings of the present invention.
Figure 35A:
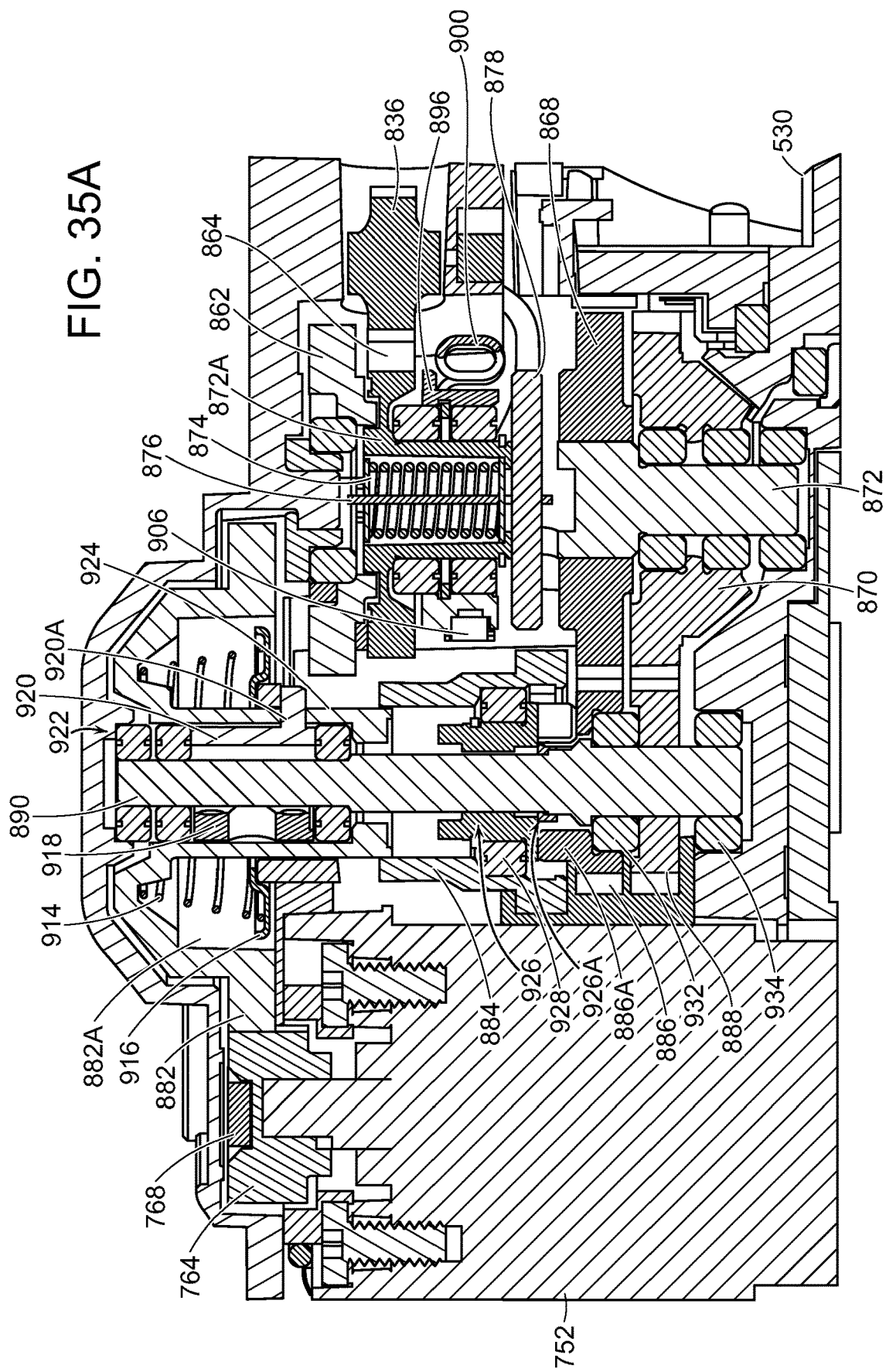
FIG. 35A is a cross-sectional view of the motor chassis assembly illustrating the interaction between the power output shaft and associated gears and the manual output shaft and associated gears with the cam gear and shuttle element disconnected from the motor input gear according to the teachings of the present invention.
Figure 35B:
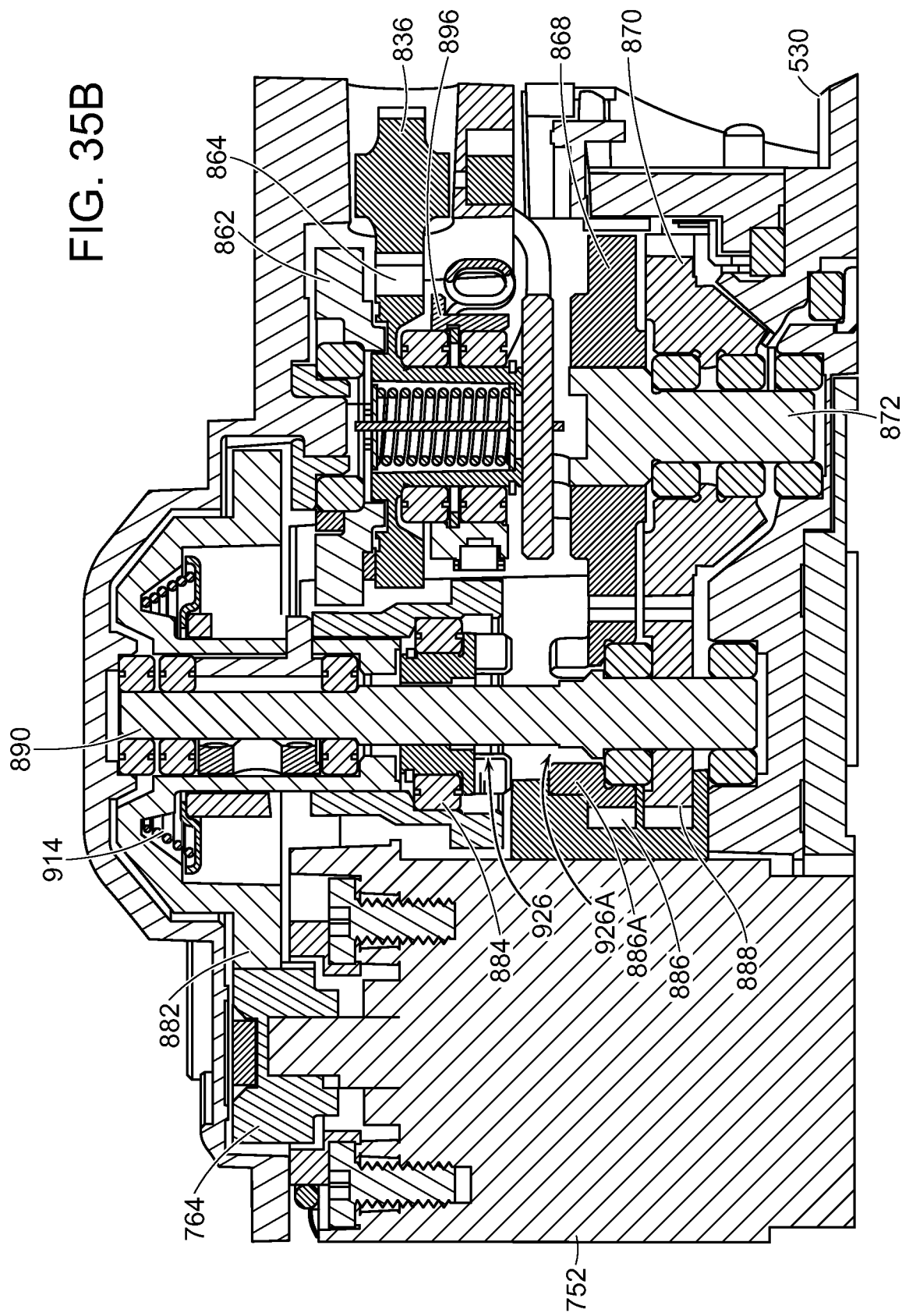
FIG. 35B is a cross-sectional view of the motor chassis assembly illustrating the interaction between the power output shaft and associated gears and the manual output shaft and associated gears with the cam gear and shuttle element connected to the motor input gear according to the teachings of the present invention.

As shown in FIGS. 30-32, the motor unit subassembly 750 includes a main housing that mounts a series of components, including a series of gears and associated elements and a primary motor unit 752. The main housing 754 includes a front housing unit 756 and a base housing unit 758 that are secured together by suitable fasteners 746 and 760. The front housing unit has a magnet 850 mounted therein for operating with a kicker gear assembly as described below. The primary motor unit 752 is mounted to the front housing unit 756 and has a motor output shaft that includes a motor shaft gear 764. The motor gear 764 further has a magnet 768 mounted therein. The motor includes a pair of post-type contacts 762, 762 for coupling to the plungers 708. The post-type contacts form one of the power terminals, such as the negative terminal, of the power sources of the door lock assembly. The motor 752 is also coupled to a drag gear 766. The drag gear 766 provides a selected amount of drag force to selected gears in order to allow the gears to transfer force therebetween. Specifically, the drag gear 766 provide a selected resistance to one or more gears of the motor gear assembly, and specifically to the cam gear 884.

The motor unit subassembly 750 also includes a shifter gear assembly 770 for shifting selected gears associated therewith depending upon the handedness of the door (e.g., left handed or right handed). The various shifter gears can also be shifted by the shifter assembly depending upon if the outer bezel assembly is operated in an emergency mode (M-mode). As shown in FIGS. 30-33B, the shifter gear assembly 770 includes a set of shifter gears 786 that are coupled to an upper portion of the shifter shaft 772. The shifter gears 786 can include an outermost gear 780, an intermediate or reverse gear 782, and an innermost gear 784. A bearing ring 788 can be mounted to the outermost gear 780. The upper portion of the shifter shaft 772 also includes a housing 774 forming a chamber 778 that mounts a shuttle element 776 therein. The illustrated shuttle element 776 has a cylindrical main body portion that has a pair of opposed larger diameter portions 776A and 776B, with a narrower body portion 776C disposed therebetween. The housing 774 also includes a series of holes 793 and a pair of opposed slots 792. A series of ball elements 790 can also be mounted within the chamber 778 to interact with the shuttle element 776. The ball elements help selectively engage selected ones of the shifter gears 786 depending upon the position of the shuttle element within the chamber 778. The housing 774 further includes a flange 797 for seating the shifter gears. The shuttle element 776 also includes an opening that is adapted to seat a pin element 794. The pin element 794 is configured to pass through the opposed slots 792 and at least partly seats within a shifter collar 796. The collar 796 is coupled to a shifter nut assembly 800. The shifter nut assembly raises and lowers the shuttle element 776 within the chamber 778 via the collar and pin 796, 794 respectively. The pin element 794 can thus travel along a path defined by the slots 792. The shifter gear assembly further includes a shifter input gear 798 that is coupled to a lower end of the shaft 772 disposed opposite the housing 774. The shifter input gear 798 is coupled to the shaft 772 via a bearing ring and associated fastener 799.

The shifter nut assembly 800 includes a main housing 802 that seats a spring element 804 that is coupled to the collar 796 of the shifter gear assembly 770. A lead screw 806 seats within a threaded aperture formed in the main housing 802, and the lead screw is coupled at one end to the motor 718. The main housing 802 also mounts an encoder circuit assembly 814 that includes a PCB 816. A contact encoder 818 is further coupled to the PCB and to the housing 802 of the shifter nut assembly 800. A first surface 816A of the PCB that contacts the encoder 818 has a circuit 820 formed thereon for interfacing with the contact encoder 818. The opposite or second side 816B of the PCB 816 includes one or more electronic components, including for example, an accelerometer, a linear encoder, and any selected sensors. The PCB 816 and contact encoder 818 help automatically determine the handedness of the door within which the door lock system 10 of the invention is mounted, and then automatically adjusts the shuttle element 726 within the housing 774 to reflect this assessment. Alternatively, the shuttle element can be adjusted during initial installation. The motor 718 when actuated turns the lead screw 806, which in turn actuates or moves the shifter nut assembly 800 either upwardly or downwardly. Since the collar and pin assembly 794, 796 is attached to the shuttle element 776, the shuttle element 776 is moved into one or more selected upwardly or downwardly positions. The collar and pin assembly and hence the shuttle element 776 can be disposed into any selected number of operating positions, and preferably can be disposed in one of five operating positions. The positions include a neutral position, which is the position the system is disposed in prior to installation. The system is installed either in a right handed or a left handed door, and the system has normal and M-mode operating positions for each type of installation. The various positions are described in further detail in FIGS. 36-40. In each position, the shuttle element engages a different set of ball elements 790 to selectively engage or disengage one or more of the shifter gears 786. The engagement of the selected shifter gears 786 allows the shuttle element 776 to connect selected gears of the shifter gear assembly with selected gears of the manual output gear assembly 860.

The shifter input gear 798 is coupled to an input gear 826. The input gear 826 is mounted within the can or housing 526 of the motor chassis assembly 520, FIG. 28. The input gear 826 is in turn coupled to the drive housing element 360 of the inner bezel assembly 16 so as to transfer the rotational force of the drive element to the shifter gear assembly 770. The shifter gear assembly 770 can be secured to the main chassis housing by any suitable fastening mechanism.

As shown in FIGS. 30, 33A-33B, and 35A-35B, the motor unit subassembly 750 also includes a motor gear assembly 880 for allowing the primary motor 752 to convey rotational energy through the gear assembly to the spline gear 530. The motor 752 operates the gears of the motor gear assembly 880 during automatic operation. Specifically, as a user approaches the door lock system from outside the dwelling, an electronic device within the possession of the user activates through the antenna elements of the outer bezel assembly 24. The antenna conveys signals to the primary PCB 698, which in turn activates the motor. The motor activates the spline gear 530 through the motor gear assembly 880, thus moving the deadbolt assembly 30. The motor gear assembly 880 includes in a stacked formation a motor input gear 882, a cam gear 884, a power shaft transfer gear 886, and a transfer gear 888. The gears are stacked on an output shaft 890. Those of ordinary skill in the art will readily recognize that bearing rings can be employed to couple one or more of the gears to the output shaft 890.

The motor input gear interfaces with the motor gear 764 and can be rotated thereby. The motor input gear 882 has a relatively dome shape and has a chamber 882A formed therein. The chamber 882A seats a spring element 914 that is contained within the chamber 882A by a spring stop plate 916. The chamber 882A further mounts a spacer element 918 and a pin element 920 that has a post 920A. A series of bearing rings can be mounted about the power output shaft 890. The illustrated cam gear 884 has a main body that includes a spiral type cam groove 924 formed therein. The cam groove 924 seats the post 920A of the pin element 920 and an upper surface of the cam gear abuts the spring stop plate 916. Thus, the spring 914 and associated stop plate 916 serve to provide a downward (in the figure) axial bias to the cam gear 884. The cam gear also includes an internal chamber that mounts a shuttle element 926. The shuttle element 926 includes a plurality of fingers 926A that extend or protrude outwardly from a bottom surface of the shuttle element. A bearing ring 928 is disposed about the shuttle element and is positioned between the shuttle element and the inner surface of the chamber of the cam gear 884. The power shaft transfer gear 886 is disposed adjacent the cam gear 884 and has a plurality of fingers 886A that extend or protrude from a top surface of the gear. The fingers 886A of the power shaft transfer gear 886 engage with the fingers 926A of the shuttle element 926 when the spring 914 biases the cam gear downwardly into the normal engagement position, FIG. 35A. The transfer gear 888 is disposed adjacent the power shaft transfer gear 886 and is separated thereby by a bearing ring 932. The transfer gear 888 has a central opening having a flat formed therein that mates with a flat formed in the lower portion of the power output shaft 890. The power output shaft 890 terminates in a final bearing ring 934.

As shown in FIGS. 30-35B, the motor unit subassembly 750 further includes a manual output gear assembly 860 for allowing manual operation of the dial elements of the bezel assemblies to be conveyed to selected gears and then eventually to the spline gear 530. The manual output gear assembly 860 includes in a stacked formation an outermost or uppermost manual output gear 862, a lower manual output gear 864, a kicker gear assembly 866, a manual output transfer gear 868, and a beveled spline gear 870. The beveled spline gear can also preferably comprise a combination of separate gears that are rotationally coupled together. For purposes of discussion, they will be discussed as a single gear. The gears are stacked on a manual power output shaft 872. Those of ordinary skill in the art will readily recognize that bearing rings can be employed to couple one or more of the gears to the output shaft 872. The output shaft 872 has a larger diameter top portion 872A that has a chamber 872C formed therein. The larger diameter portion 872A also has a pair of opposed slots 872B formed therein. The chamber is sized and configured for seating a kicker spring 874 that is coupled to a kicker bar 876. The kicker spring 874 is mounted within the chamber 874C between a pair of spring plates. The plates are preferably slotted to allow portions of the kicker bar to pass therethrough. The kicker bar preferably includes an opening that allows a kicker pin 878 to pass therethrough. The kicker pin 878 also passes through the pair of opposed slots 872B.

As illustrated for example in FIGS. 31 and 34-35B, the kicker gear assembly 866 includes a kicker gear 896 having a main body that has an external slot 898 formed therein for mounting wireform kicker element 900. The wireform kicker element 900 is simply a metal wire that is rolled to form a series of loops. The kicker gear 896 also includes a top surface 902 that has a pair of cam features 904 formed thereon. The cam features are intended to operate with the kicker pin 878. The wireform kicker element 900 and the associated cam features 904 help kick or push the cam gear 884 of the motor gear assembly 880 if the cam gear is stuck in an upper engaged position (FIG. 35B) into a lower disengaged position (FIG. 35A). Specifically, if the cam gear 884 is stuck in an up position, the teeth of the cam gear at the same level and in the same rotational travel path as the wireform kicker element 900, FIG. 35B. The kicker gear 896 also includes a magnet 906 formed in an outer surface thereof and operates in conjunction with the magnet 850 to help sense the rotational position of the kicker gear 896. The kicker gear 896 is rotated and the wireform kicker element 900 contacts the teeth of the cam gear 884. The wireform kicker element 900 rotates or "pushes" the cam gear 844 in a rotational direction. Since only the wireform kicker element 900 contacts the cam gear, if the torque provided by the kicker gear assembly exceeds a selected maximum amount, which is defined by the interoperability of the cam features 904, pin 878, kicker spring 874, and kicker bar 876, the wireform element disengages from the cam gear 884. Hence, the wireform kicker element, cam features, pin, and kicker elements operate in essence as an over torque protection mechanism while concomitantly providing enough torque to rotate the cam gear 884. Specifically, the torque applied by the kicker gear is limited to a preselected amount defined by the kicker pin 878 riding up the cam features 904 against the bias of the kicker spring 874. Once the pin 878 fully passes over the cam feature 904, the spring 874 biases the pin 878 back into its normal position. The rotation of the kicker gear assembly 866 is repeated until the cam gear is sufficiently rotated to disengage the cam gear 884 from the motor input gear 882. As also shown, when the motor output gear assembly 860 is disposed adjacent motor gear assembly 880, the power shaft transfer gear 886 engages with the manual output transfer gear 868 and the transfer gear 888 engages with the beveled spline gear 870.

The illustrated motor unit subassembly 750 further includes an idler gear assembly 834 for interfacing with the shifter gear assembly 770 and one or more output gears of the manual output gear assembly 860. The idler gear assembly 834 includes an idler gear 836 that is coupled to a bearing ring 838 and a shaft 840. The idler gear 836 ensures that the proper gear rotation is conveyed by the shifter gears 786 to the manual output gear assembly 860 depending upon the particular handedness of the door. For example, if the door is a right handed door, meaning the door lock assembly is mounted on the right side of the door, then the outermost shifter gear 780 engages directly with and rotates the axially outermost manual output gear 862. Hence, a clockwise rotation of the shifter gear 780 results in a counter-clockwise rotation of the manual output gear 862. There is no need for the idler gear to convert the rotational direction of the output gear. If, however, the door is a left handed door, meaning the door lock assembly is mounted on the left side of the door, then the intermediate shifter gear 782 engages with and rotates the idler gear 836, which in turn interfaces with and rotates the axially lower manual output gear 864. Hence, a clockwise rotation of the shifter gear 782 results in a clockwise rotation of the output gear 864, with the idler gear rotating in a counter-clockwise direction.

The illustrated motor unit subassembly 750 also includes a drive gear 846 that is coupled to the pinion gear shaft 578 of the pinion gear 570. The drive gear 846 transfers the force from rotary movement of the dial element 600 of the outer bezel assembly 24 via the pinion gear portion 572 of the pinion gear to the shifter gear assembly 770 when operated in M-mode operation.

FIGS. 30-35B illustrate additional components of the motor chassis assembly 520 of the present invention, and specifically illustrate the separate motor and manual power trains or shafts formed within the assembly. The motor chassis assembly 520 includes a main motor 752 that is mounted to the front housing unit 756 of the main housing 754. The motor has an output shaft that terminates in a motor shaft gear 764. The motor shaft gear 764 can be coupled to a motor input gear 882 that is circumferentially disposed about a main output or power output shaft 890. A cam gear 884 is also disposed about the power output shaft 890 and is disposed vertically above a power shaft transfer gear 886. The cam gear 884 is vertically translatable along the power output shaft 890 so as to transfer the power from the motor 752 to the spline gear 530 or to disengage the motor from the spline gear. A cam gear shuttle element 926 is disposed within the cam gear 884. When the motor is operated, rotation of the motor shaft gear 764 rotates the motor input gear 882. When rotated, the post 920A of the pin element spacer 920 rides along the spiral cam groove 924, thus lifting or raising the cam gear 884 away from the power shaft transfer gear 886 against the bias of the spring 914 and into selected engagement with the motor input gear 882. The fingers 926A of the shuttle element 926 disengage from the fingers 886A of the power shaft transfer gear 886. Further, the cam gear shuttle element 926 is rotationally coupled to the main power output shaft 890 via flats formed in the shaft surface and in the central opening of the shuttle element, so that when the cam gear 884 engages the motor input gear 546 via the post 920A, FIG. 35B, the output of the motor 752 can be transferred to the power output shaft 890 and hence to the power transfer gear 888. The power shaft transfer gear is rotationally decoupled from the power shaft 890 via the bearing ring 932. The motor chassis assembly 520 further includes a second shaft, such as the manual power output shaft 872. The manual power output shaft 872 mounts the manual output beveled spline ear 870. The rotation of the power transfer gear 888 rotates the beveled gear 870, which in turn rotates the output spline gear 530. The beveled gear 872 is also rotationally decoupled from the shaft 872. As such, operation of the motor transfers rotationally energy to the output spline gear 530 without rotating the manual power output shaft 872. This prevents the dial elements from rotating when the deadbolt assembly is actuated by the motor 752. When the motor ceases to operate, the spring 914 biases the cam gear 884 out of engagement with the motor input gear 882.

Similarly, a manual power output shaft or power train 872 is formed within the motor chassis assembly 520. The manual power output shaft 872 forms part of the manual power gear assembly 860. The motor chassis assembly 520 further includes at one end of the manual power output shaft 872 a beveled spline gear 870 that is disposed about the shaft and is adapted to engage the power transfer gear 888 as well as the spline gear 530, and a manual output transfer gear 868 that is disposed adjacent the spline output transfer gear 870 and is adapted to engage the transfer gear 886. The manual power output shaft 872 includes at an opposite end a pair of manual output gears 862 and 864. Although not illustrated in the cross-sectional views of FIGS. 35A and 35B, the shifter gear assembly 770 is disposed above the manual output gear assembly 860 and is adapted to engage with the output gears 862 and 864.

The motor chassis assembly 520 still further includes an idler gear 836 that is disposed adjacent the manual output gear assembly 860, and can be disposed for example adjacent the lower gear 784 of the shifter gears 786, FIG. 31. The idler gear 836 is adapted to reverse the drive direction of rotation of one or more of the shifter gears, and specifically the intermediate shifter gear 782, depending upon the handedness of the door. Since the intermediate shifter gear 782 engages with the idler gear 836, a clockwise rotation of the shifter gear results in a counter-clockwise rotation of the idler gear. The idler gear is also in contact with the output gear 864 of the manual output gear assembly 860. The counter-clockwise rotation of the idler gear results in a clockwise rotation of the output gear.

In operation, the motor chassis assembly 520 can be operated in a manual mode where movement of the dial elements of either the inner bezel assembly 16 or the outer bezel assembly 24 (when disposed in M-Mode) can activate the spline gear 530, and hence operate the dead bolt assembly 30. The motor chassis assembly 520 can also be alternatively operated in an automatic mode where the main motor 752 can serve to provide power to activate the spline gear and hence the dead bolt assembly. When operated in the automatic mode, the motor chassis assembly 520 receives from an electronic device a control signal that is processed eventually by the main PCB 698. In response to receipt of this actuation or control signal, the motor 752 through the shaft gear 764 actuates and serves to rotate the motor input gear 882. The rotation of the motor input gear 882 moves the cam gear 884 via the pin element 920 and associated post 920A, which in turn moves the shuttle element 926 axially along the shaft 890 and into mating engagement with an inner portion of the motor input gear 882, FIG. 35B, against the axial bias applied by the spring 914. Further, the shuttle element 926 is coupled to the power output shaft 890 via flats formed both on the shaft and within the central opening of the shuttle. Hence, once the shuttle is operatively coupled to the motor input gear 882, rotation of the motor input gear is imparted to the output shaft 890 via the shuttle element 926. The shaft then rotates the power transfer gear 888, which is also rotationally coupled to the output shaft 890. The power transfer gear 888 engages with and rotates the manual output transfer gear 870, which serves to rotate the spline gear 530. In summary, the force from the motor 752 is transferred to the spline gear 530 through the motor shaft gear 764, the motor input gear 882 by way of the cam gear 884 and associated shuttle element 926, the power output shaft 890, the power transfer gear 888, and then to the manual output spline gear 870. Once the dead bolt assembly 30 is operated by the spline gear 530, the motor shaft is briefly operated in reverse to disengage the cam gear 884 and hence the shuttle element 926 from the motor input gear 882, FIG. 35A. Further, if the cam gear 884 is for unwanted reasons stuck in the engaged position with the motor input gear 882, then the kicker gear 896 can rotate slightly the cam gear 884 to disengage the gear from the motor input gear 882. When the door lock system of the present invention is operated in the automatic mode, the inner and outer bezel assemblies and in particular the dial elements are isolated from movement of the aforementioned gears. As such, the dial elements do not rotate when the dead bolt assembly is operated by way of the primary motor 752.

When operated in manual mode, the rotation of the dial elements of either bezel assembly serves to mechanically rotate one or more elements of the shifter gear assembly 770. That is, rotation of the dial element 600 of the outer bezel assembly 24 rotates the pinion gear assembly 570, FIG. 22. The pinion gear assembly via the pinion shaft 578 then serves to rotate the drive gear 846, which in turn rotates the innermost shifter gear 784, FIG. 31. The shifter gear assembly 770 engages at least one of the manual output gears 862 and 864, depending upon whether the door lock system is mounted on the right hand side of the door (right handed door) or on the left hand side of the door (left handed door). Similarly, rotation of the dial element 260 of the inner bezel assembly 16 rotates the pinion gear assembly 350, and specifically rotates the triangular drive element 360, FIGS. 8 and 10A. The triangular drive element interfaces with the input gear 826, FIG. 31, that is mounted within the can type housing 526, FIG. 28. The input gear engages with and rotates the shifter input gear 798, which in turn rotates one or more of the shifter gears 786. The shifter gears can then rotate one or more of the output gears 862, 864, depending upon the handedness of the door. For example, if the illustrated door lock system 10 is mounted in a right handed door, then the dial element 260 of the inner bezel assembly 16 is moved in a clockwise direction to lock the door and in a counter-clockwise direction to unlock the door. For left handed doors, the direction is reversed. That is, the dial element 260 is moved in the counter-clockwise direction to lock the door and in the clockwise direction to unlock the door.

At initial mounting and installation, the door lock system 10 can be set-up or initialized to reflect this mounting arrangement. The initialization can either be done by the user during initial installation, or the door lock system can perform this determination automatically via the encoder circuit assembly 814, FIGS. 31-32. For right handed doors, the gear assembly is positioned and oriented to engage and rotate with one of the output gears 862, 864. Specifically, the lower output gear 864 of the manual output gear assembly 860, and for left handed doors the gear assembly engages with and rotates the upper output gear 862 of the manual output gear assembly 860. Rotation of either output gear 862, 864 rotates the manual output shaft 872, which in turn rotates the manual output transfer gear 868. The transfer gear 868 engages with and rotates the power shaft transfer gear 886. Since the fingers 886A of the transfer gear 886 are coupled together with the fingers 926A of the shuttle element 926, rotation of the transfer gear 886 serves to rotate the shuttle element, which in turn rotates the power output shaft 890. When the shaft 890 is rotated, the power transfer gear 888 is rotated, which in turn rotates the beveled spline gear 870. The beveled spline gear then serves to rotate the output spline gear 530.

FIGS. 33A-33B and 36-40 illustrate the various positions of the shuttle element 776 of the shifter gear assembly 770 of the present invention. The illustrated shuttle element 776 moves into selected vertical positions within the chamber 778 of the housing portion 774 based on whether the dial element of the inner or outer bezel assembly is initialized for mounting in right or left handed doors. If for example the dial element 600 of the outer bezel assembly 24 is being operated, then the pinion gear assembly 570 of the outer bezel assembly engages with a drive gear 846. The transfer gear 846 in turn engages with and rotates the innermost gear 784 of the set of shifter gears 786. Conversely, if the dial element 260 of the inner bezel assembly 16 is rotated, the drive or pinion gear assembly 350 engages with the input gear 826, which in turn engages the shifter input gear 798 of the shifter gear assembly 770. The shuttle element 776 is adapted to engage selected gears of the set of shifter gears 786 by selectively engaging shifter bearings or ball elements 790 contained within the housing portion 774 of the shifter shaft 772. By engaging selected ones of the ball elements, then the shuttle element can engage selected shifter gears.

Figure 36:
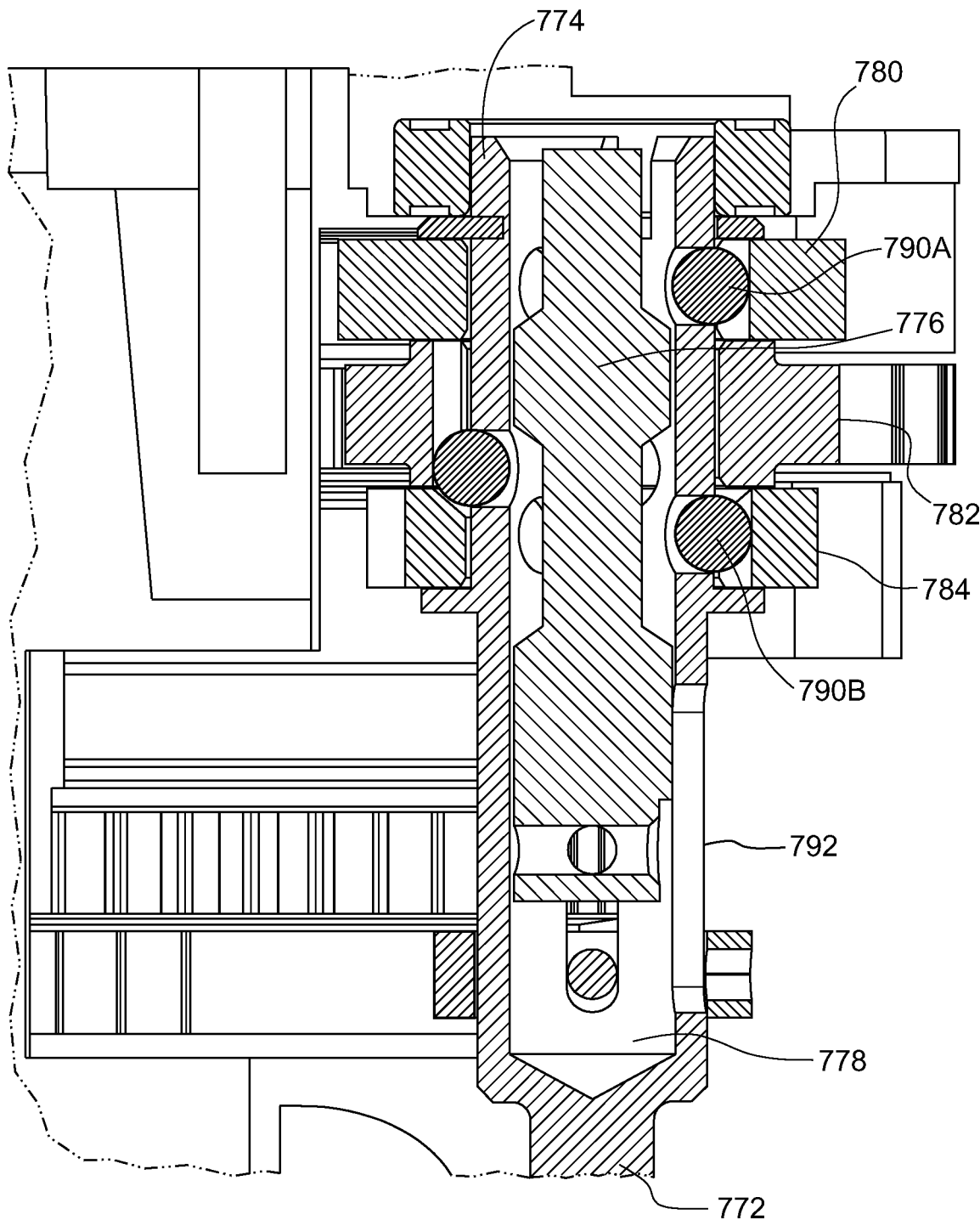
FIG. 36 is a partial cross-sectional view of the shifter gear assembly of the motor chassis assembly illustrating the shuttle element disposed in a neutral position, which occurs prior to installation, according to the teachings of the present invention.

As illustrated for example in FIG. 36, the shuttle element 776 is disposed in a centrally located neutral position. The shuttle element is typically disposed in this position for example when the door lock system is initially purchased and prior to installation. In this position, the main body of the shuttle element does not engage any of the shifter ball elements 790. Since the shuttle element 776 does not contact and is not forced into engagement with any of the shifter ball elements 790 and hence any of the shifter gears 786, the shifter gears are not actuated. From this neutral position, the shuttle element 776 can move either vertically upward within the chamber 482 or vertically downward within the chamber 778 depending upon if the door lock system is mounted in a right handed door or a left handed door, and whether the unit is being operated in under normal conditions or in an emergency mode (M-mode). For the sake of simplicity, we discuss the movement of the dial element 260 of the inner bezel assembly 16 during normal operation, although movement of the dial element of the outer bezel assembly can also effectuate a similar response when operating in M-mode. Under normal operation, the inner bezel assembly is operatively connected to the motor gear assembly and the outer bezel assembly is operatively disconnected therefrom.

As shown and as will be readily understood by one of ordinary skill in the art, the pager motor 718 through the shifter nut assembly 800 moves the shuttle element 776 within the chamber 778 between the various positions. The movement and operation of the shifter gear assembly 770 defines which power paths are connected to the inner bezel assembly 16. The shifter nut assembly 800 has main housing 802 and associated spring 804 that is coupled to a collar 796 and pin 794 of the shifter gear assembly 770. The collar and pin are in turn coupled to the shuttle element 776. The position of the shifter nut assembly can be varied or changed based on movement of the lead screw 806 that is driven by the first motor 718. The shifter nut assembly 800 is further coupled to an encoder circuit assembly 814 that can control and determine the position of the shifter nut assembly. This enables the door lock system to determine the position of the shuttle element during operation.

Figure 37:
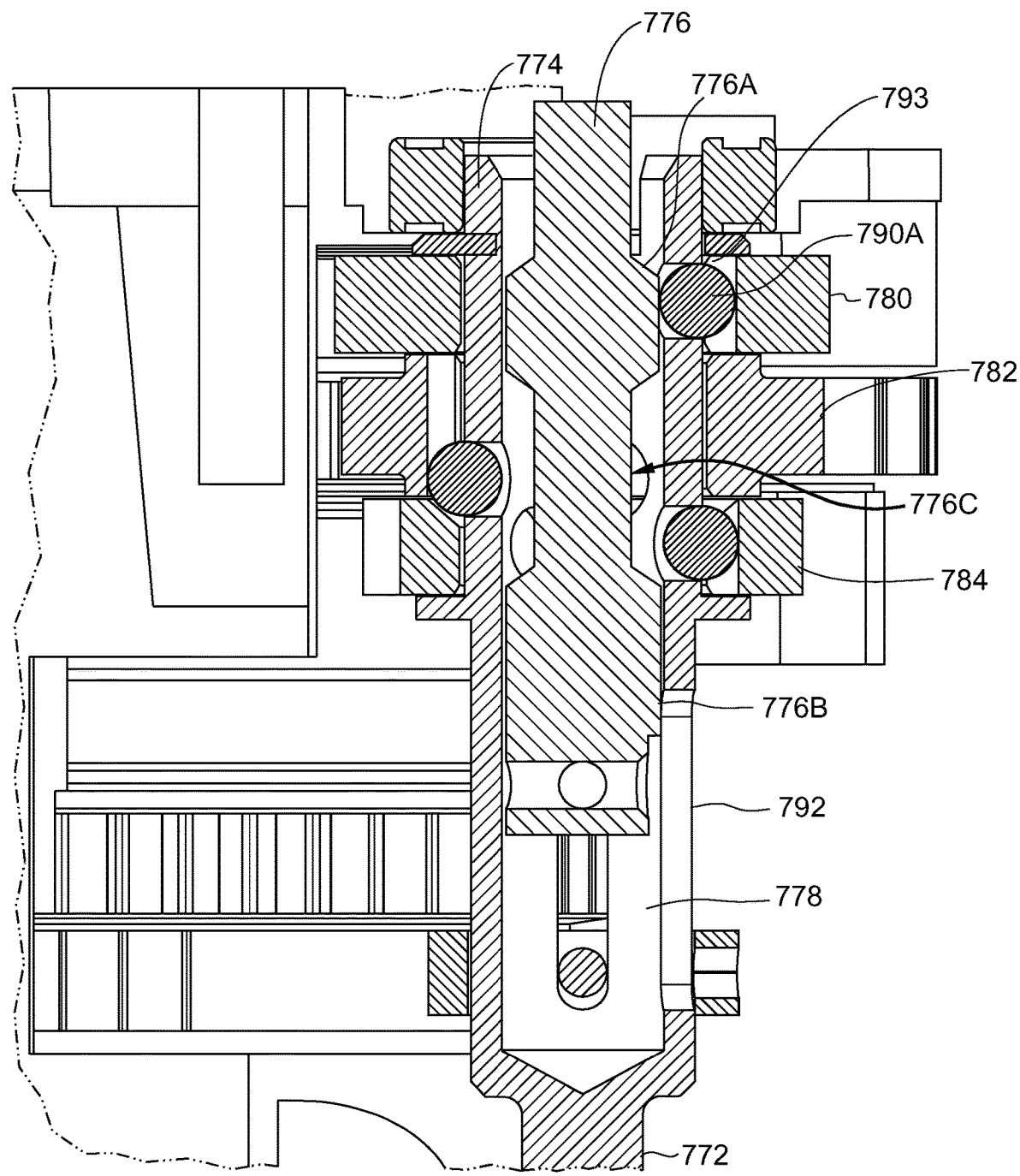
FIG. 37 is a partial cross-sectional view of the shifter gear assembly of the motor chassis assembly illustrating the shuttle element disposed in a selected position when the door lock system of the present invention is installed in a right handed door according to the teachings of the present invention.

When the door lock system is mounted in right handed doors, the shuttle element is disposed in the position illustrated in FIG. 37. The illustrated shuttle element 776 is moved vertically upward in the chamber 778 by the shifter nut assembly 800 and motor 718 such that the upper larger diameter portion 776A of the shuttle element 776 contacts selected ball elements 790 and moves the ball elements at least partly out of the chamber 778 and into the holes 793 formed in the housing 774. The ball elements also engage in this configuration the upper or outermost shifter gear 780. The outermost shifter gear 780 then engages with and rotates the manual output gear 826 of the manual output shaft, FIGS. 31, 35A and 35B. The rotation of the dial element 260 of the inner bezel assembly 16 can hence be transferred to the output spline gear 530 through the manual output gears 868 and 870 of the manual output shaft 872 and the gears 886 and 888 of the power output shaft 890. This positioning and engagement of the gears is essentially established once the door lock system is mounted within the door and is automatically established, and this mechanical and operational connection is typical during normal operation of the door lock system.

Figure 38:
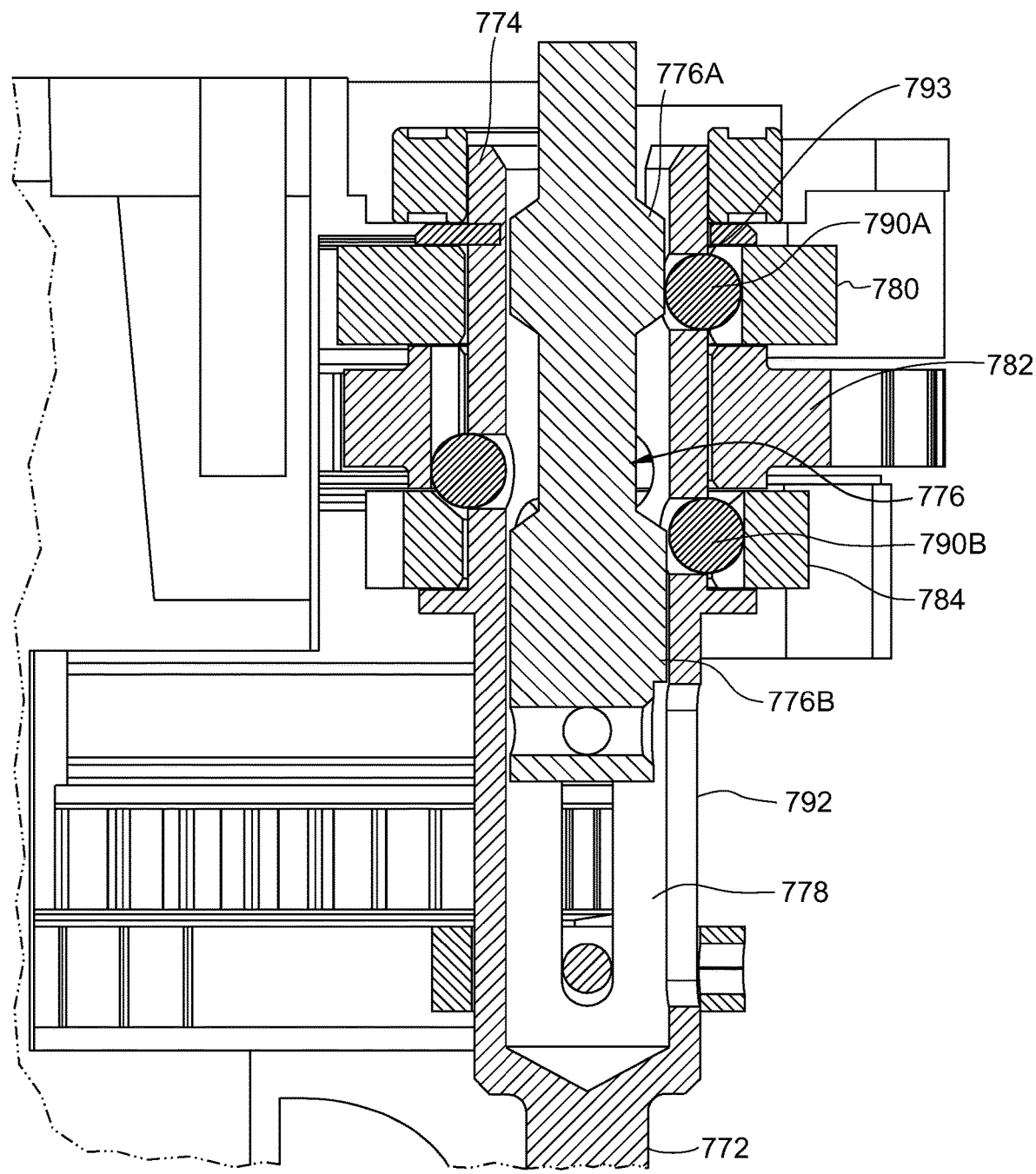
FIG. 38 is a partial cross-sectional view of the shifter gear assembly of the motor chassis assembly illustrating the shuttle element disposed in a selected position when the door lock system of the present invention is installed in a right handed door during M-mode operation, according to the teachings of the present invention.
Figure 39:
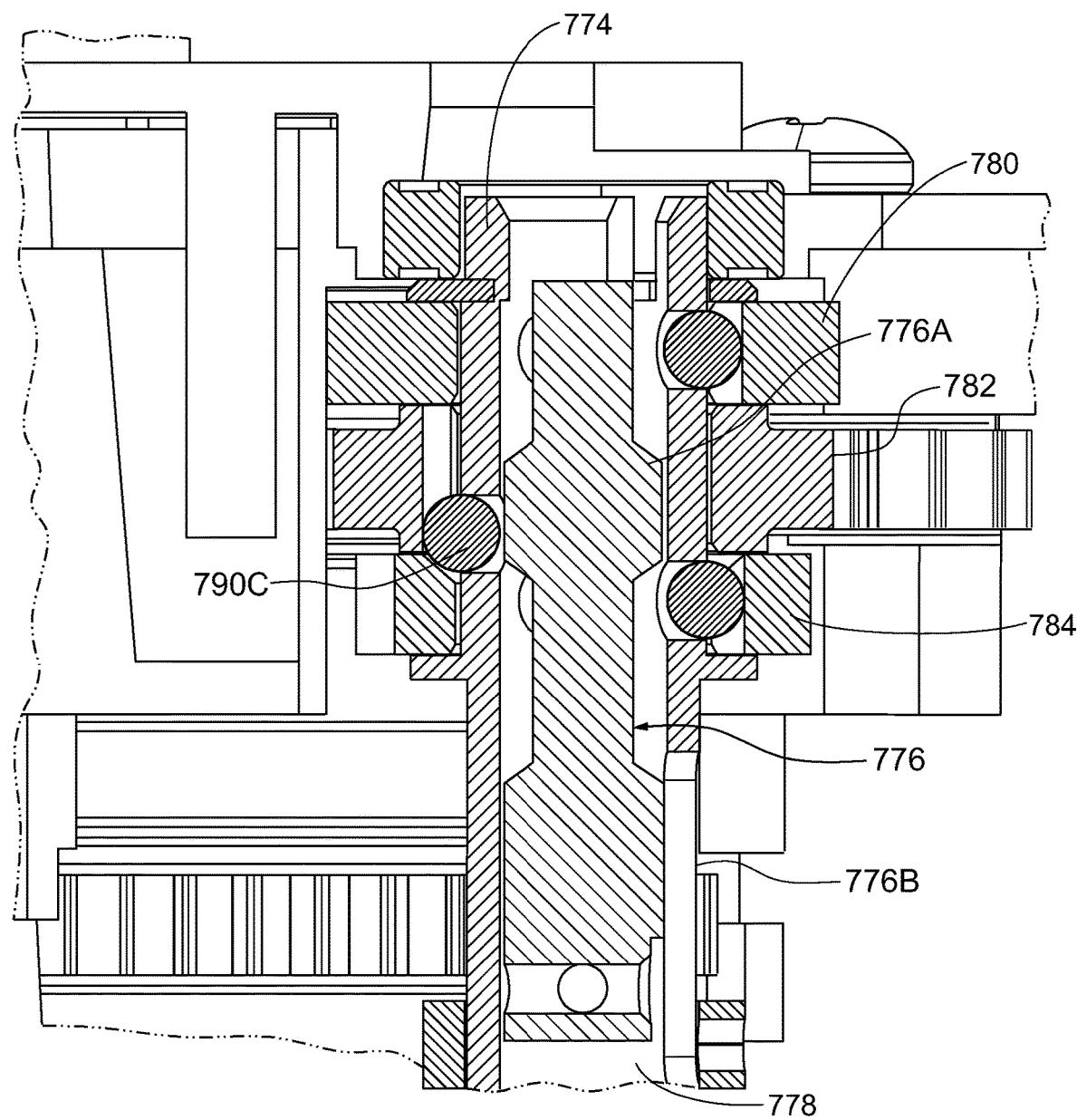
FIG. 39 is a partial cross-sectional view of the shifter gear assembly of the motor chassis assembly illustrating the shuttle element disposed in a selected position when the door lock system of the present invention is installed in a left handed door, according to the teachings of the present invention.

When operated in M-mode, the shuttle element 776 is moved into a vertically higher position within the chamber 778 by the shifter nut assembly 800 and the motor 718, as illustrated in FIG. 38. As shown, the upper larger diameter portion 776A of the shuttle element 776 contacts the shifter ball element 790A and moves the ball element at least partially out of an aperture 793 formed in the housing portion 774 of the shifter shaft 772 into engagement with the upper shifter gear 780 (similar to normal operation, FIG. 37). The upper shifter gear 780 then engages with and rotates the manual output gear 862 of the manual output shaft, FIGS. 31 and 35A-35B. The lower larger diameter portion 776B of the shuttle element 776 also contacts the shifter ball element 790B and moves the ball element at least partially out of an aperture 793 formed in the housing portion 774 of the shifter shaft 772 and into engagement with the lower or innermost shifter gear 784. The engagement of the shifter gear 784 enables the manual movement of the dial element 600 of the outer bezel assembly 24 to be transferred to the manual gear assembly 860 in addition to the inner bezel assembly so as to manipulate the dead bolt assembly 30. That is, the lower shifter gear 784 is coupled to the drive gear 846, FIG. 31, which is in turn coupled to the shaft 578 of the pinion gear assembly. The pinion gear is in turn coupled to the gear ring 614 and hence to the dial element 600, FIGS. 18 and 20. This occurs since typically under M-mode operation the outer bezel assembly 24 is manipulated by the user in order to gain access to the dwelling.

If the door lock system 10 of the present invention is mounted in a left handed door, then the shifter gear assembly 770 is positioned via the shifter nut assembly 800 and the motor 718 so as to engage different shifter gears. Specifically, the shuttle element 776 is disposed in the position illustrated in FIG. 39. The illustrated shuttle element 774 moves vertically downward relative to the neutral position in the chamber 778 such that the upper larger diameter portion 776A of the shuttle element 776 contacts the shifter ball element 790C and moves the ball element at least partially out of an aperture formed in the housing portion 774 of the shifter shaft into engagement with the intermediate shifter gear 782. The intermediate shifter gear 782 then engages and rotates the manual output gear 864 of the manual output shaft, FIGS. 31 and 35A-35B. The rotation of the dial element 260 of the inner bezel assembly 16 can hence be transferred to the output spline gear 530 through the manual output shaft 872 and through the manual output transfer gear 868 and the spline transfer gear 870. This positioning and engagement of the gears is essentially established once the door lock system is mounted within the door and is automatically configured, and this mechanical and operational connection is typical during normal operation of the door lock system in left handed doors.

Figure 40:
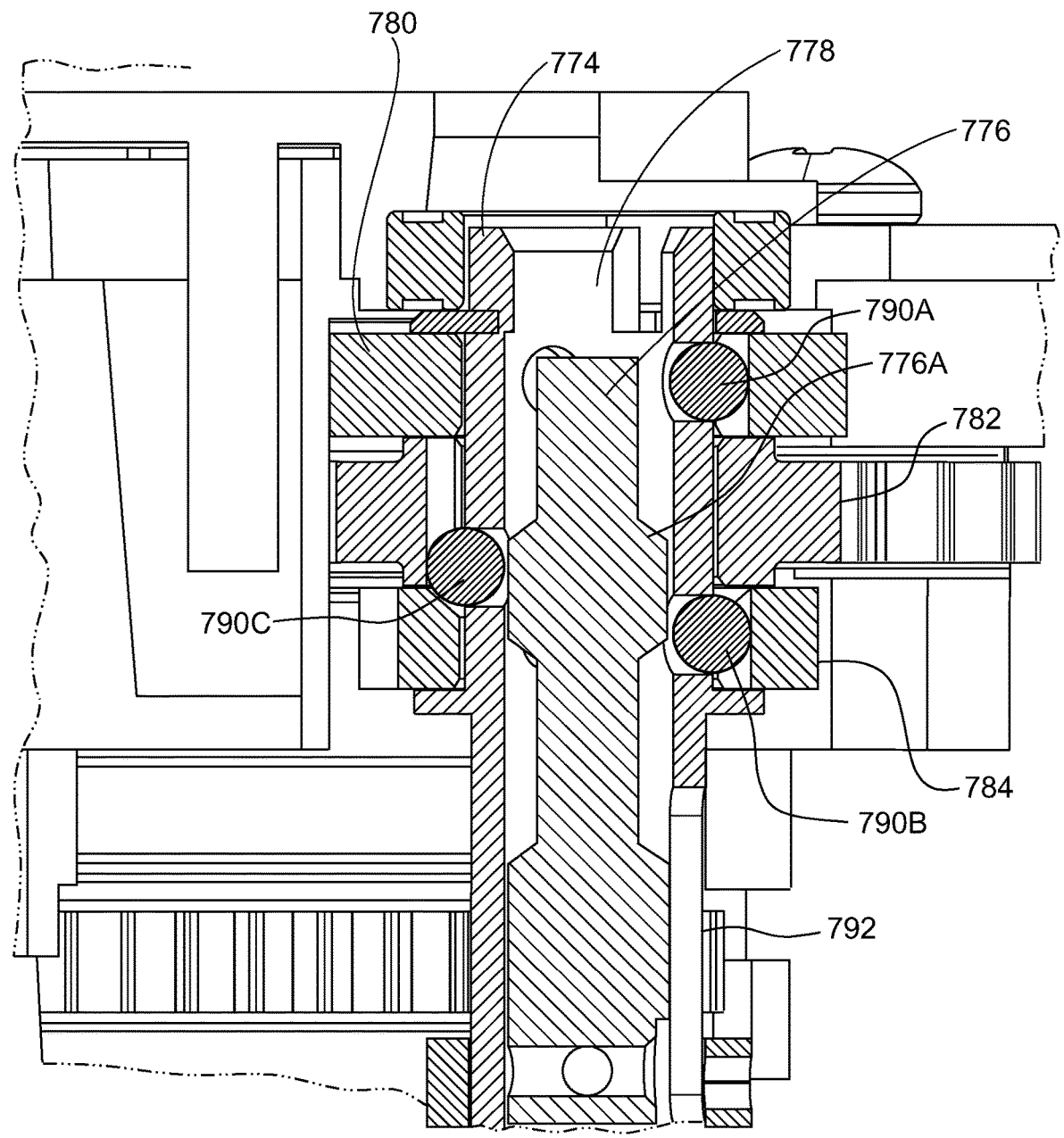
FIG. 40 is a partial cross-sectional view of the shifter gear assembly of the motor chassis assembly illustrating the shuttle element disposed in a selected position when the door lock system of the present invention is installed in a left handed door during M-mode operation, according to the teachings of the present invention.

When operated in M-mode, the shuttle element 776 is disposed in a still yet vertically lower position within the chamber 778 as illustrated in FIG. 40. As shown, the upper larger diameter portion 776A of the shuttle element 776 still contacts the shifter ball element 790C, but now also engages the shifter ball element 790B and moves the ball element at least partially out of an aperture 793 formed in the housing portion 774 of the shifter shaft into engagement with the lower shifter gear 784. Similar to M-mode operation in right handed doors (FIG. 38), the engagement of the lower shifter gear 784 enables the manual movement of the dial element 600 of the outer bezel assembly 24 to be transferred to the manual output gear assembly 860 in addition to the inner bezel assembly 16 so as to manipulate the dead bolt assembly 30.

As shown in FIGS. 1-4C and 41-53, the illustrated door lock system 10 includes a dead bolt assembly 30 and a strike cup 1002 that interfaces with the spline gear 530 of the motor chassis assembly 520. The illustrated dead bolt assembly 30 can directly interface with the spline gear 530 and can be directly connected to the trim ring 532 of the motor chassis assembly 520 by a twist lock feature, FIG. 41. The door lock system of the present invention also contemplates the use of an extension component 1038 that forms part of the deadbolt assembly 30, FIGS. 4A and 4C. The extension component 1038 also connects to the trim ring 532 via a twist lock feature, and connects to the remainder of the dead bolt assembly 30 via suitable mechanical connections.

Figure 41:
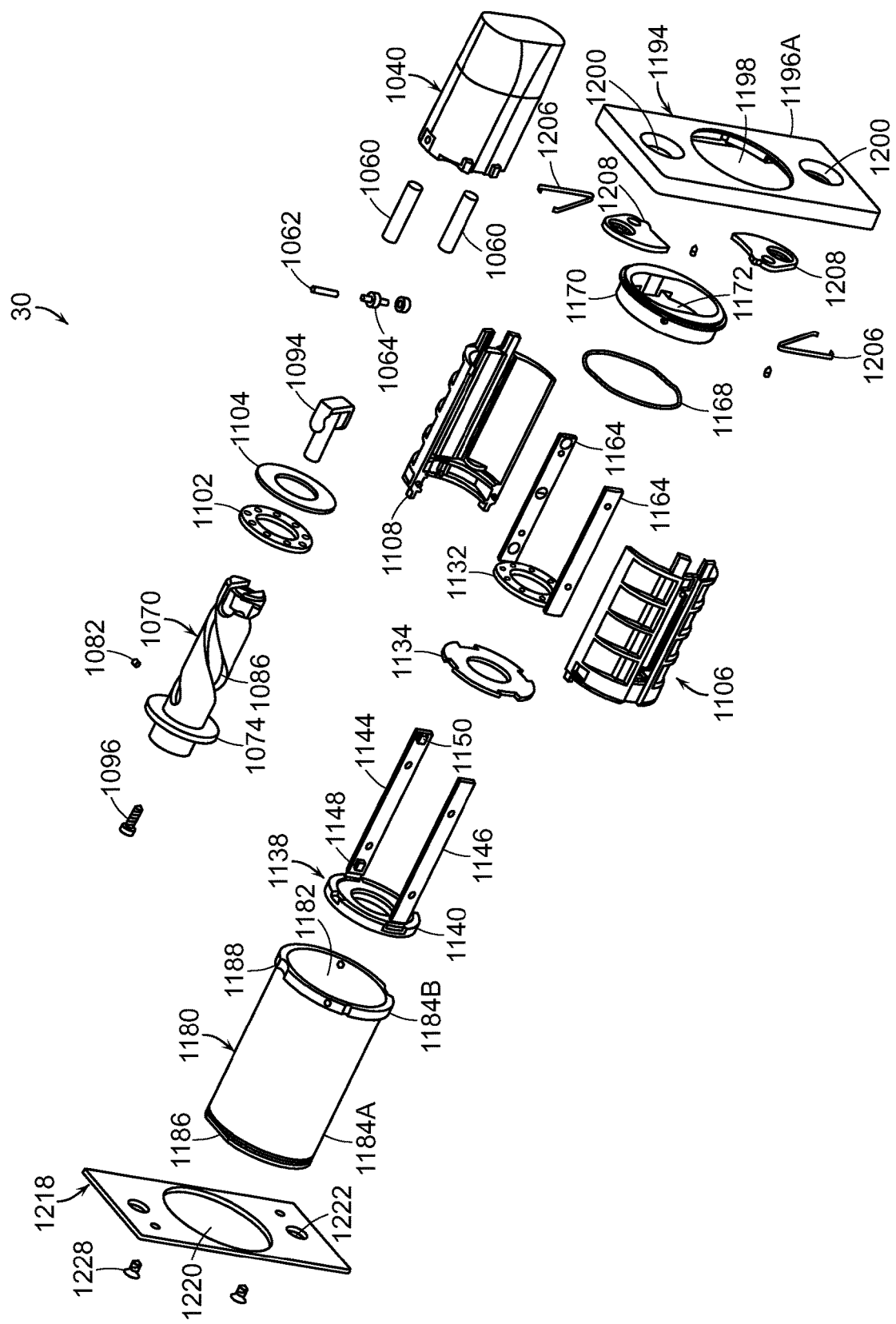
FIG. 41 is an exploded view of the deadbolt assembly portion of the door lock system according to the teachings of the present invention.
Figure 42:
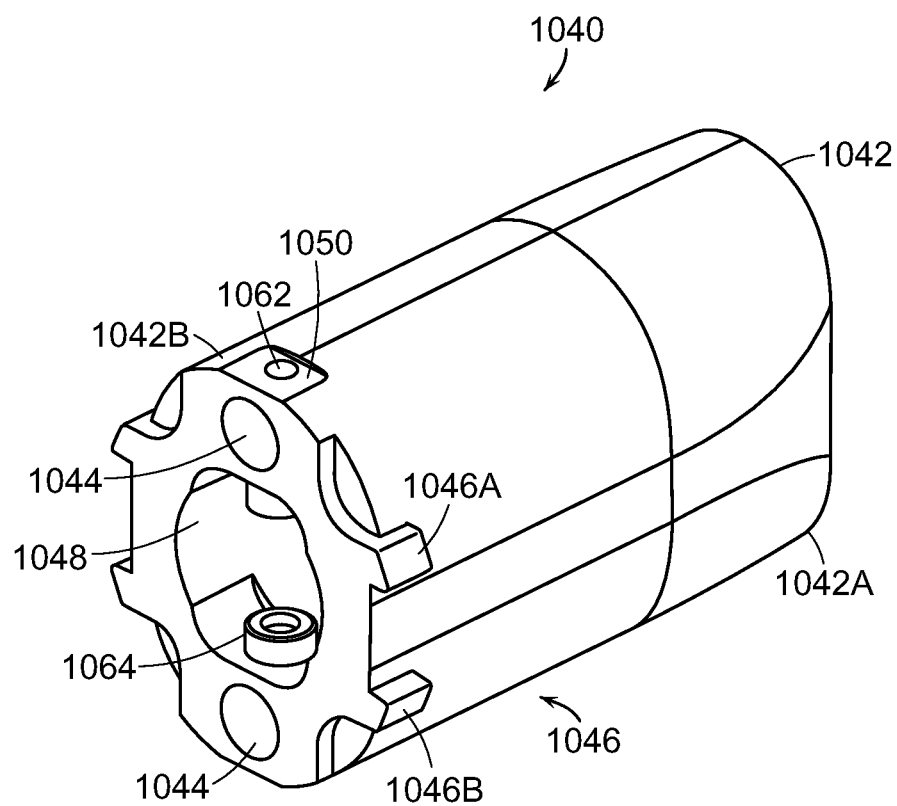
FIG. 42 is a perspective rear view of the bolt element portion of the deadbolt assembly according to the teachings of the present invention.
Figure 43:
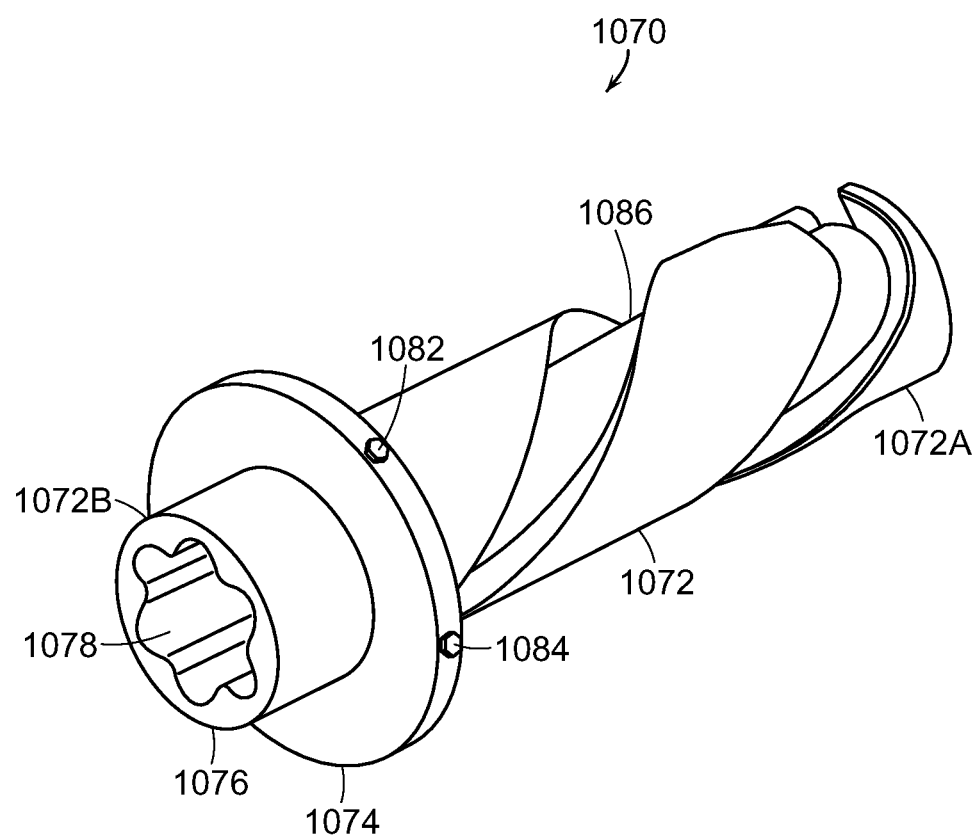
FIG. 43 is a perspective view of the bolt helix portion of the deadbolt assembly according to the teachings of the present invention.
Figure 44:
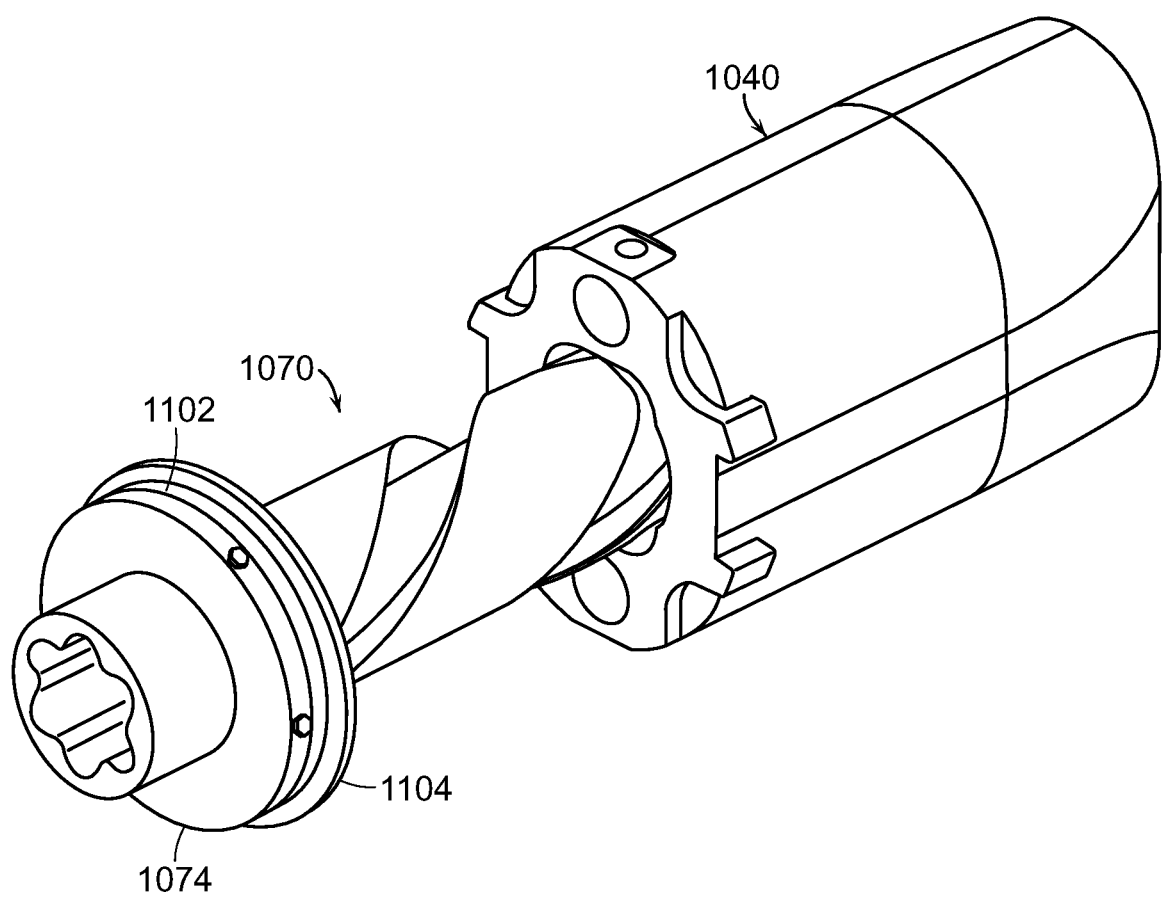
FIG. 44 is a perspective view of the bolt helix mounted to the bolt element according to the teachings of the present invention.
Figure 45:
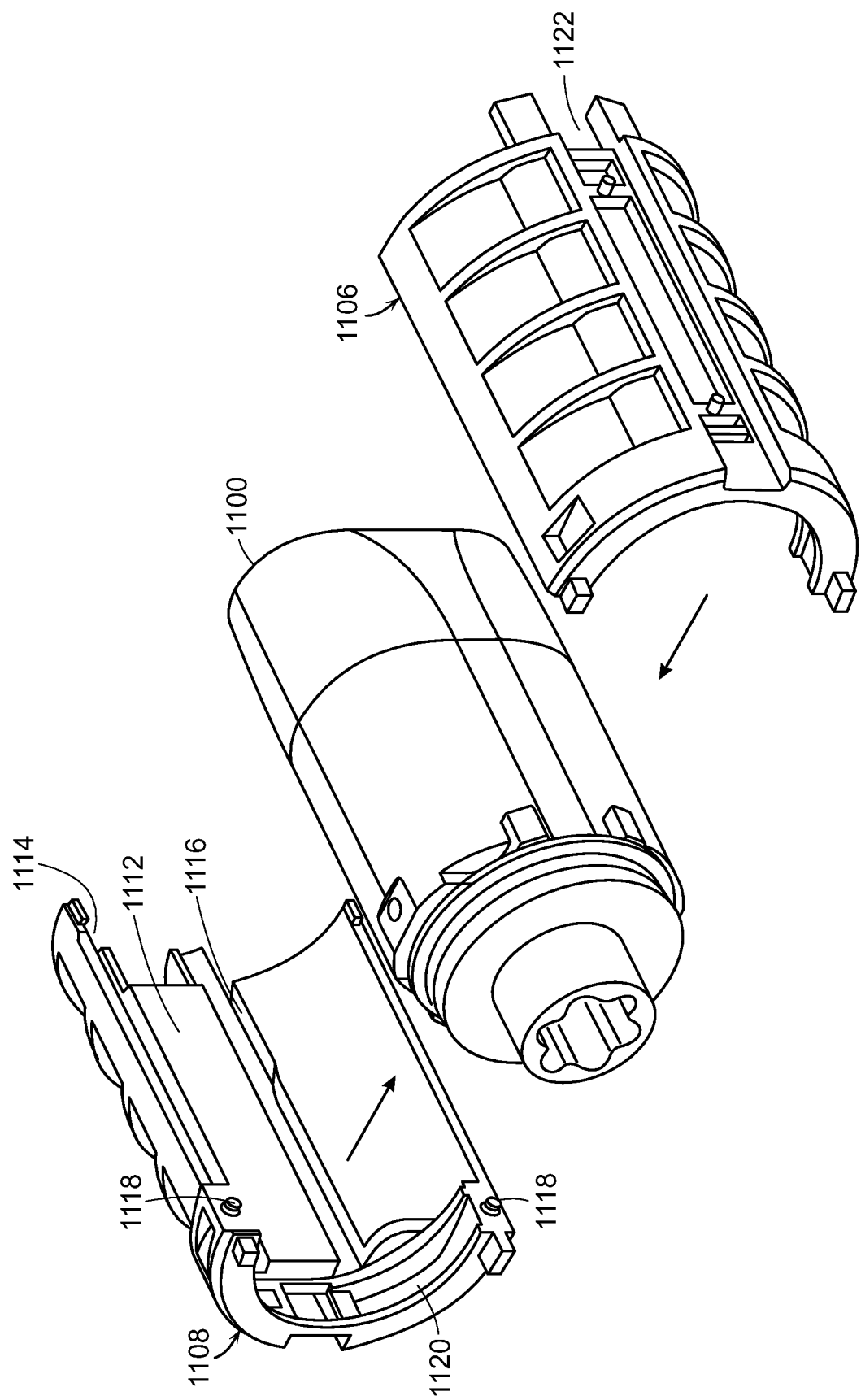
FIGS. 45 and 46 are perspective views of the housing elements and bolt element of the deadbolt assembly.
Figure 46:
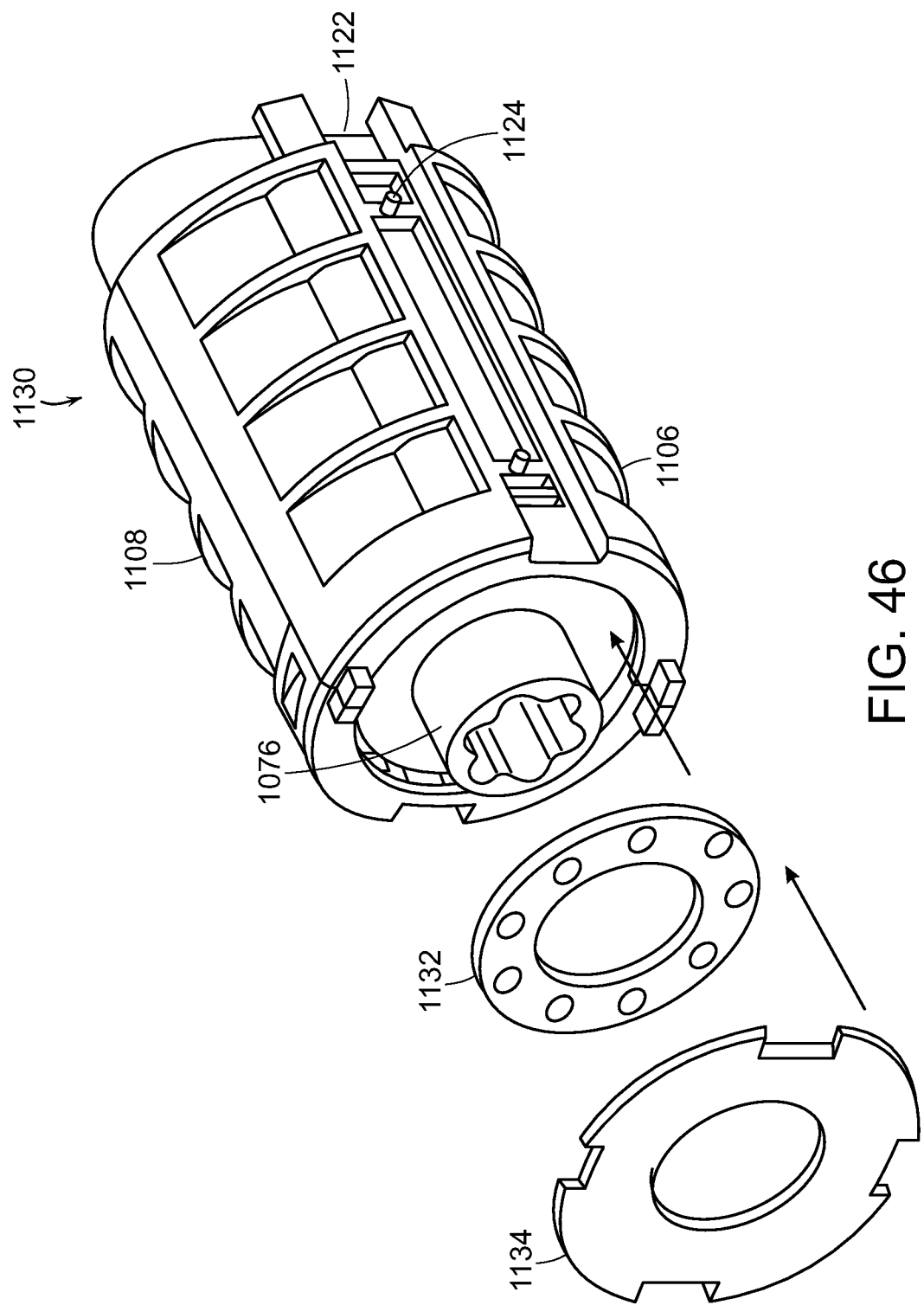
Figure 47A:
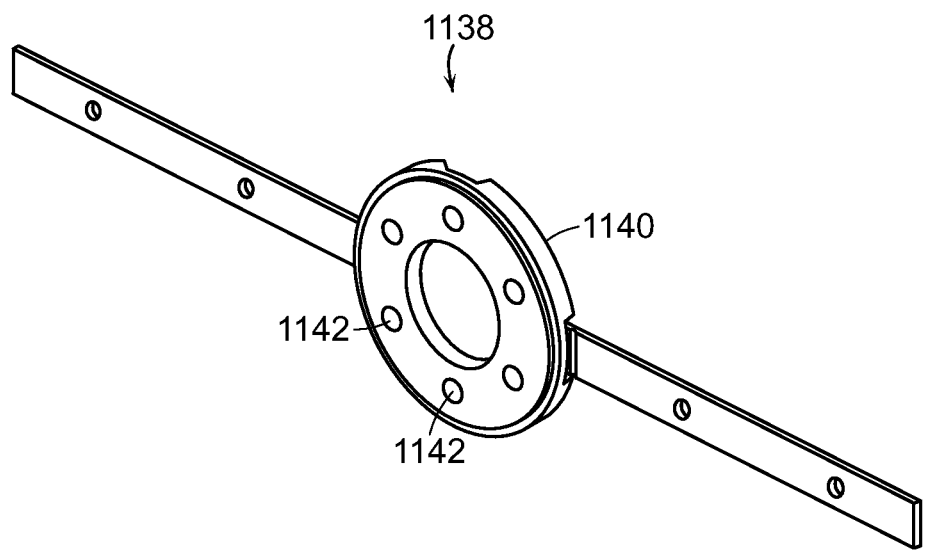
FIGS. 47A and 47B are perspective views of the flex circuit assembly portion of the deadbolt assembly illustrating selected sensors attached thereto according to the teachings of the present invention.
Figure 47B:
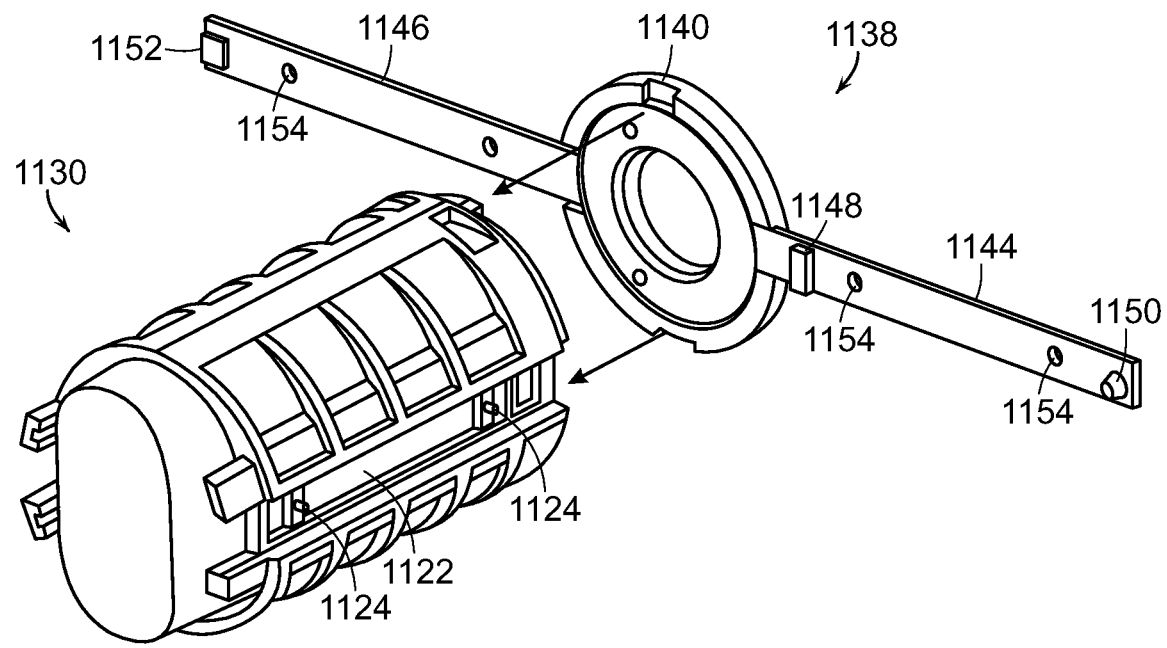
Figure 49:
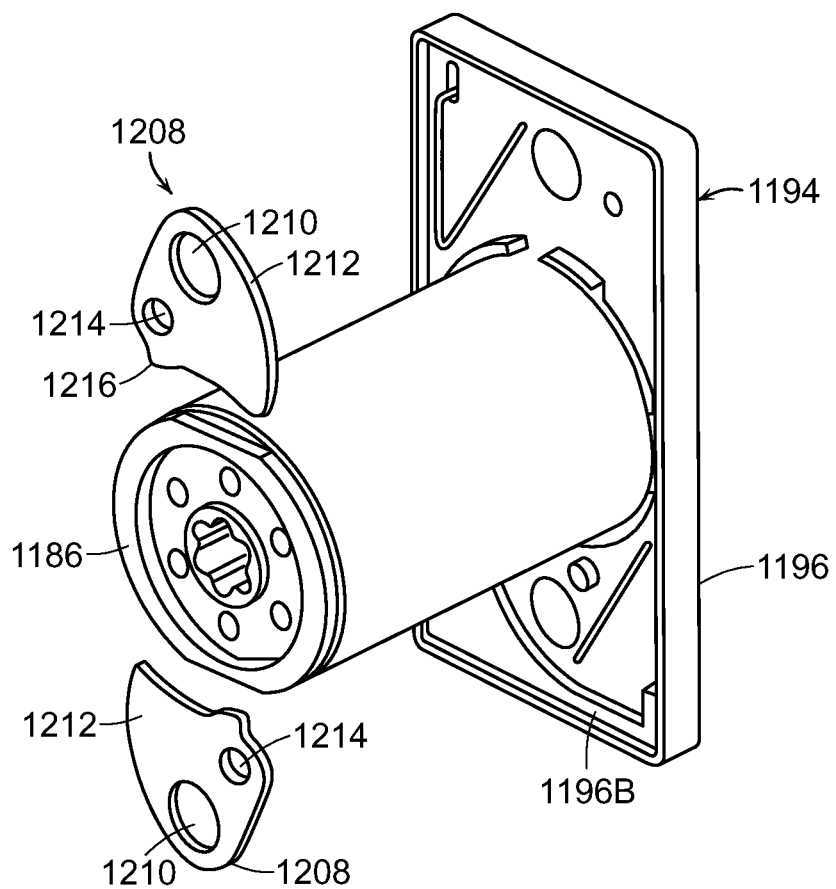
FIG. 49 is a rear partially assembled view of the deadbolt assembly illustrating the placement of the bolt shutter plates and spring elements according to the teachings of the present invention.

As shown in FIGS. 41 and 42, the illustrated bolt element 1040 has a main body 1042 having a first end 1042A and an opposed second end 1042B. The first end 1042A is a closed end that is adapted to seat within the strike cup assembly 1002 and the second end includes an opening forming a chamber 1048. The second end also has a pair of opposed openings 1044, 1044 for seating reinforcement or safety pins 1060, 1060. The safety pins 1060 are formed of a material that is different than the material of the main body 1042, and is preferably made from a material that is stronger and harder than the material of the bolt main body. According to one practice, the safety pins are made of a hardened steel material and the bolt main body is made of a steel material, such as 316 steel. The safety pins strengthen the main body 1042 of the bolt element 1040 and make it difficult for someone to hack or saw through the bolt element. The main body 1042 of the bolt element 1040 also has formed on opposite sides of the main housing at the second end 1042B a pair of transverse openings 1050. The transverse openings 1050 are sized and configured for seating a post 1062 that when mounted therein extends at least partly into the chamber 1048. Cam followers 1064 are mounted on the posts 1062 at the edges of the chamber 1048. The cam followers are adapted to interface with a bolt helix having a spiral groove. The outer surface of the main housing 1042 also has formed thereon connection elements 1046 for coupling to external housing elements. The connection element formed on each side includes a pair of opposed prong elements 1046A, 1046B.

As shown in FIGS. 41-44, the dead bolt assembly 30 further includes a bolt helix 1070 that has a main body 1072 having a first end 1072A and a second end 1072B. The second end 1072B has a flange element 1074 formed thereon and an end adapter portion 1076 having a central cavity 1078 that has an end portion having a shape similar to the shape of the spline gear 530. The end adapter portion 1076 is thus intended to seat on and mates with the spline gear 530 and is thus rotated thereby. The central cavity is formed through the main body of the bolt helix 1070 and thus extends between the first and second ends 1072A, 1072B. The flange element 1074 has a peripheral or circumferential surface that is adapted to mount magnets 1082, 1084. The magnets 1082, 1084 operate in conjunction with selected sensors to help determine if the bolt element 1040 is disposed in a deployed position or a retracted position. The bolt helix 1070 also has a spiral groove 1086 formed in an outer surface thereof. The illustrated bolt helix further mounts a thrust bearing 1102 that interfaces with the flange element 1074 and a thrust plate 1104 that seats adjacent the thrust bearing. The thrust bearing 1102 allows the bolt helix 1070 to smoothly rotate when driven by the spline gear 530.

The bolt helix 1070 is sized and configured for mounting within the chamber 1048 of the bolt element 1040. Prior to mounting the bolt helix therein, a helix stop element 1094 is mounted within the chamber 1048 of the bolt element 1040. The bolt helix 1070 and associated thrust bearing and plate are then mounted in the chamber 1048 such that the cam followers are seated within the spiral groove 1086, and the bolt helix is secured to the helix stop element 1094 by a suitable fastener 1096. The helix stop element 1094 helps prevent the cam followers 1064 from disengaging with the spiral groove 1086 during use. The spiral groove 1086 is intended to interface with and seat the cam followers 1064 such that when the bolt helix 1070 is rotated by the spline gear 530, the cam followers move along the spiral groove from the second end 1072B to the first end 1072A. The movement of the cam followers 1064 along the spiral groove moves the bolt element 1040 between the deployed and retracted positions. The thrust bearing 1102 and the thrust plate 1104 are pressed between the flange 1074 and the relatively flat end face of the second end 1042B of the bolt element 1040. The combination of the bolt element and the bolt helix forms a bolt helix subassembly 1100.

As shown in FIGS. 45-48, the bolt helix sub-assembly 1100 is then coupled to the housing elements 1106 and 1108. The housing elements each have a main body having an outer surface and an inner surface. The inner surface of each housing element includes a surface feature that is adapted to interface with the connection elements 1046 of the bolt element 1040. Specifically, the housing elements 1106, 1108 have a raised feature 1112 on the inner surface that has a groove 1114, 1116 disposed on each side thereof. The raised surface feature 1112 is sized and configured for seating between the prong elements 1046A, 1046B of the connection element 1046. The prongs 1046A, 1046B are also adapted to seat within the grooves 1114, 1116, respectively. The raised surface feature and associated grooves function as guide elements for guiding the bolt element as the bolt moves axially relative to the bolt helix 1070. The inner surfaces of the housing elements also include a vertical groove 1120 that seats at least the thrust plate 1104. The housing elements are coupled together using any selected connection technique, and can include a male and female connection to couple the housing element together. For example, the housing element employs pins 1118, 1118 that seat within corresponding apertures (not shown) formed on the other housing element. The housing elements are then snapped together about the bolt helix subassembly.

The second thrust bearing 1132 and the second thrust plate 1134 are mounted to an end of the subassembly. Specifically, the thrust bearing and thrust plate are mounted over the end adapter portion 1076 of the bolt helix 1070. The flex circuit 1138 is then also mounted over the end adapter portion 1076 and overlies the second thrust plate 1134. The illustrated flex circuit 1138 includes a main circular circuit portion 1140 that has a plurality of contacts 1142 arranged in a circular manner and which correspond in location to the contact pins 540 of the spline cover subassembly 728. The contacts 1142 convey electrical signals between the main PCB 698 and the flex circuit 1138 via the contact pins 540. The flex circuit 1138 also includes a pair of flex circuit extension arms 1144 and 1146. The flex circuit arm 1146 includes a sensor 1152 and the circuit arm 1144 includes sensor 1148 and 1150. The sensors 1150 and 1152 can be for example Hall Effect sensors that interact with magnets associated with the strike cup assembly 1002 to determine if the door is open or closed according to known techniques. The sensor 1152 interacts with the magnets 1082 and 1084 mounted on the flange 1074 of the bolt helix 1070 to determine if the bolt element is disposed in the deployed or retracted position also according to know techniques. The flex arms 1144, 1146 are then bent and seated within a flex circuit groove 1122 formed on the outer surface of each housing element 1106, 1008. The flex circuit groove also includes a pair of pins 1124, 1124 that seat within the apertures 1154 formed in the flex circuit arms. The pins help retain the flex circuit arms within the groove 1122. The illustrated shims 1164, 1164 are then seated over the flex circuit arms 1144, 1146 that are mounted within the grooves 1122 to form a short bolt chassis subassembly 1130.

The illustrated short bolt chassis subassembly 1130 then has an inner bolt housing 1170 and an associated washer 1168 that are mounted to the bolt end of the short bolt chassis subassembly 1130 and are retained thereon by a press fit technique. The washer 1168 provides a selected degree of axial flexibility to the dead bolt assembly so as to adjust to axial differences in door panels. The inner bolt housing 1170 has a central opening 1172 that allows the bolt element 1040 to pass therethrough when axially moved between the deployed and retracted positions. The subassembly 1130 and the inner bolt housing 1170 are then mounted within an outer housing enclosure 1180. The outer housing enclosure has a main body forming a central chamber 1182 that seats the subassembly 1130. The main body also includes an end portion 1184A that has a twist lock feature 1186 formed thereon. The twist lock feature 1186 is adapted to engage the twist lock feature of the motor chassis assembly 520 formed by the selected undercut or threaded configuration formed on the trim ring 532. The opposite end 1184B of the housing has a surface feature 1188 formed thereon for engaging the shutter plates 1208. The surface feature can be any suitable mechanical configuration, such as a channel or slot 1188 formed in a raised lip portion 1189, and which is adapted to contact selected portions of the shutter plates 1208. The subassembly 1130 can be secured within the outer housing enclosure 1180 by suitable fasteners to form a short bolt module subassembly 1190.

As shown in FIGS. 49-52, the short bolt module subassembly 1190 is then seated within a front face plate 1194. The front face plate includes a main body 1196 having outer or front face surface 1196A and an inner or rear face surface 1196B. The main body includes a central opening 1198 and a pair of fastener receiving apertures 1200, 1200. The central opening 1198 allows the bolt element to pass therethrough and the apertures 1200 are configured to receive suitable fasteners, such as screws, to secure the deadbolt assembly 30 to the door panel. The rear surface 1196B includes suitable recesses 1202, 1202 for mounting a pair of spring elements 1206, 1206 and for mounting a pair of bolt shutter plates 1208, 1208. The rear surface also includes pivot posts 1204, 1204 for seating the shutter plates within the recesses 1202 and for allowing pivoting movement of the plates. The bolt shutter plates 1208 each have a main body having a main opening 1210 that can be aligned with the fastener receiving apertures 1200 when disposed in a selected position. The main body also includes an occluding area 1212 that is adapted to block or occlude the fastener receiving apertures 1200 when disposed in another selected position. The plates also include a second pair of apertures 1214 for seating on the pivot posts when mounted within the recesses 1202. The main body of each shutter plate also has a spur element 1216 formed thereon. The spur element 1216 is adapted to cooperatively interact with the surface feature 1188 of the outer housing enclosure 1180.

The rear face plate 1218 is disposed over the short bolt module subassembly 1190 and seats within the rear surface of the front face plate 1194 such that is flush with the back surface when mounted therein. The rear face plate 1218 also includes a central opening 1220 for seating over the subassembly and a pair of fastener receiving apertures 1222 that are aligned with the apertures 1200 of the front face plate. The rear face plate 1218 and the front face plate 1194 are secured together by suitable fasteners 1228.

Figure 50A:
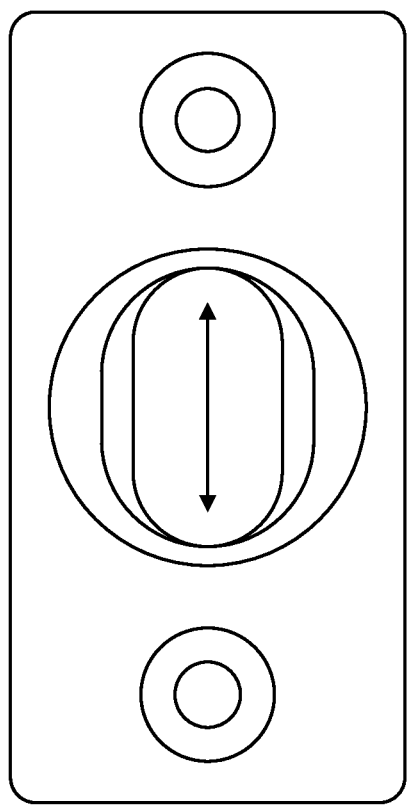
FIGS. 50A and 50B are front perspective views of the deadbolt assembly showing the rotating nature of the bolt element to move the shutter plates between an occluded position and a non-occluded position.
Figure 50B:
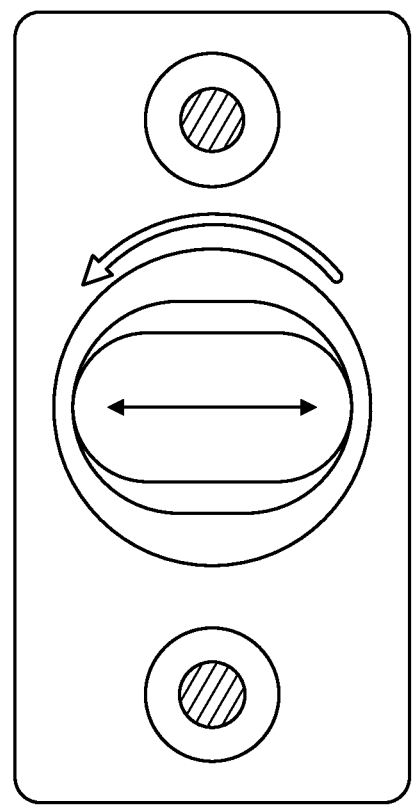
Figure 51A:
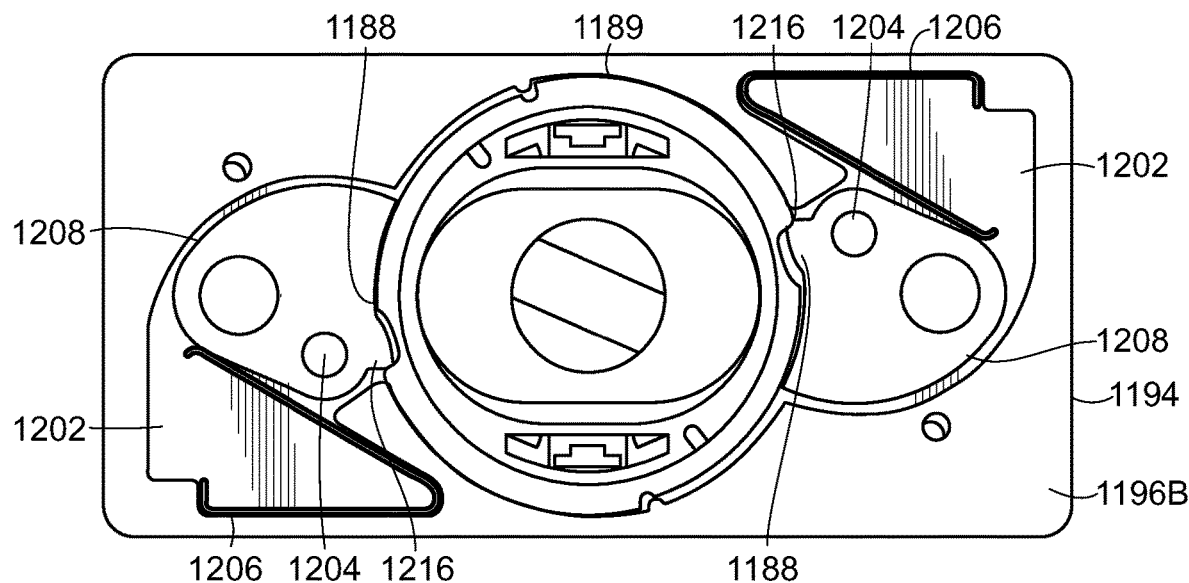
FIG. 51A is a partially assembled view of the deadbolt assembly showing the bolt shutter plates disposed in an open or non-occluding position according to the teachings of the present invention.
Figure 51B:
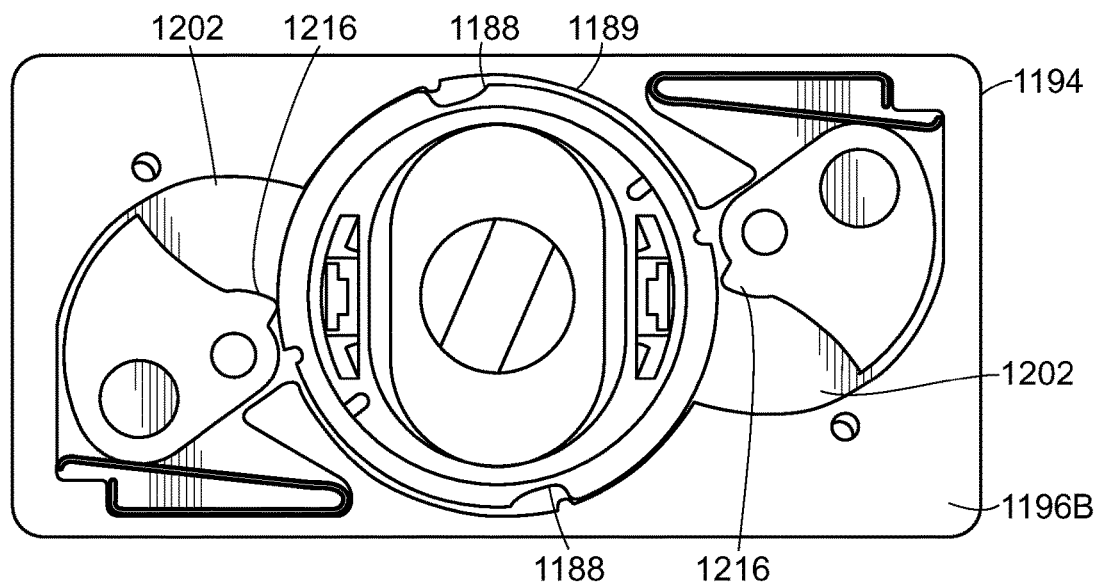
FIG. 51B is a partially assembled view of the deadbolt assembly showing the bolt shutter plates disposed in an occluding position according to the teachings of the present invention.

The bolt shutter plates 1208, 1208 are thus sandwiched between the front and rear face plates 1194, 1218 and can be pivotably moved about the pivot posts 1204. The bolt element 1040 is initially rotatably movable between selected positions as shown in FIGS. 50A and 50B. During installation of the door lock assembly, the bolt element 1040 is disposed in a relatively horizontal position. When the bolt element 1040 is disposed in this orientation, the bolt shutter plates 1208 are positioned in an occluding or blocking position such that the occluding portion or area 1212 of the plates are aligned with and hence occlude the fastener receiving apertures 1200, 1222 of the front and rear face plates 1194, 1218, as shown in FIGS. 50B and 51B. In this occluding position, the surface feature 1188 of the outer housing enclosure 1180 is disengaged from the spur elements 1216 and seats on the raised lip portion 1189 of the housing. This position forces the bolt shutter plates 1208 to pivot against the bias of the spring elements 1206 in a selected direction and are maintained in this position by the raised lip portion 1189. When the bolt element 1404 is rotated so as to be oriented in a vertical direction, the spur elements 1189 are moved from the raised lip portion 1189 of the outer housing enclosure 1180 into the surface feature 1188. When disposed as such, the spring elements 1206 force the bolt shutter plates 1208 to pivot about the pivot post 1204 into an open or non-occluded position where the main openings 1210 of the bolt plates are aligned with the fastener receiving apertures 1200, 1222, as shown in FIGS. 50A and 51A. In this position, the dead bolt assembly 30 can be mounted to the door panel 12 and specifically in the hole or opening 20, and the fasteners 32 can be used to secure the deadbolt assembly 30 to the door panel. Once the fasteners 32 are mounted within the apertures 1200, 1222, the fasteners prevent the bolt element from rotating.

Figure 52A:
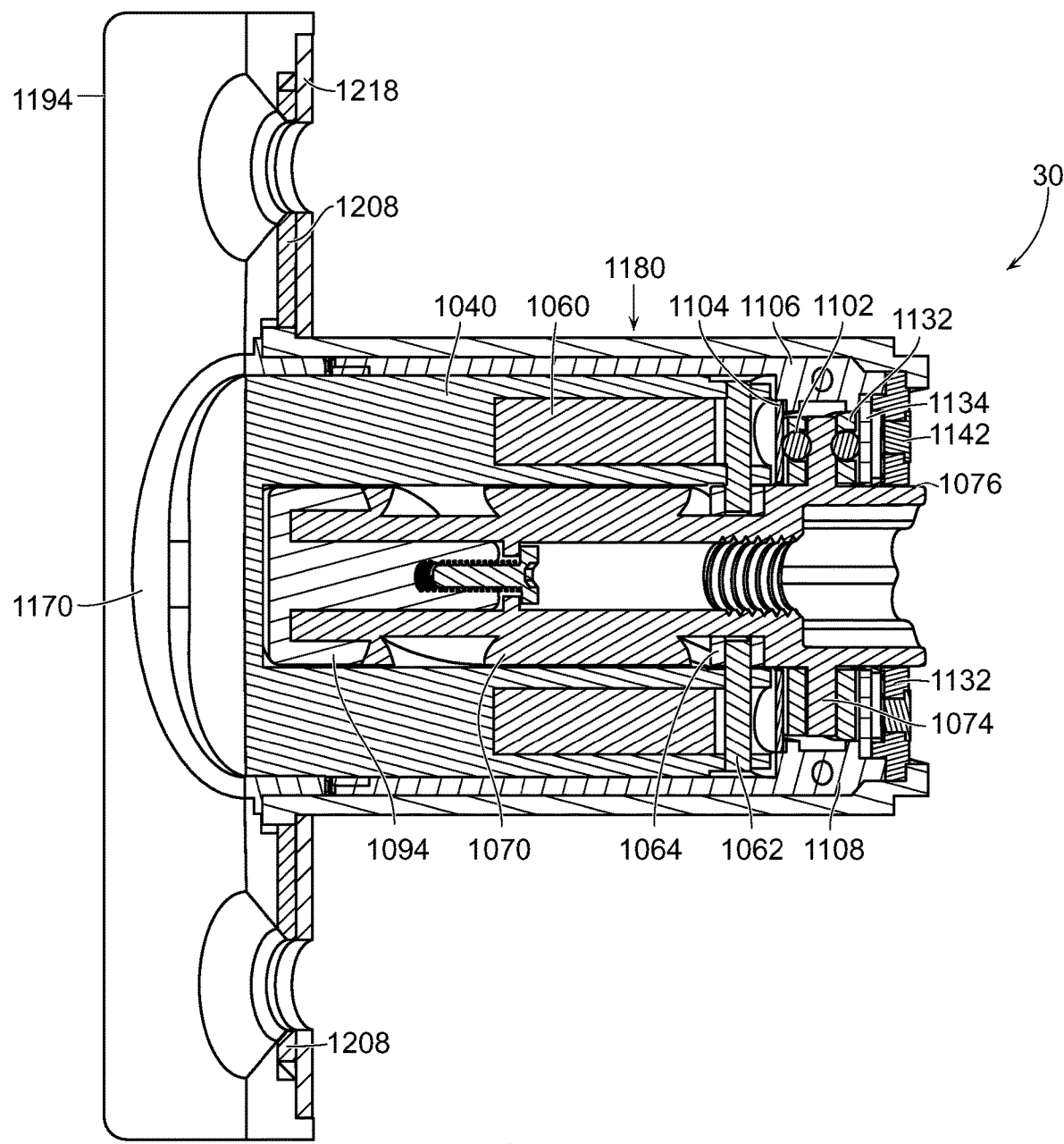
FIG. 52A is a cross-sectional view of the deadbolt assembly showing the bolt element disposed in a retracted position.
Figure 52B:
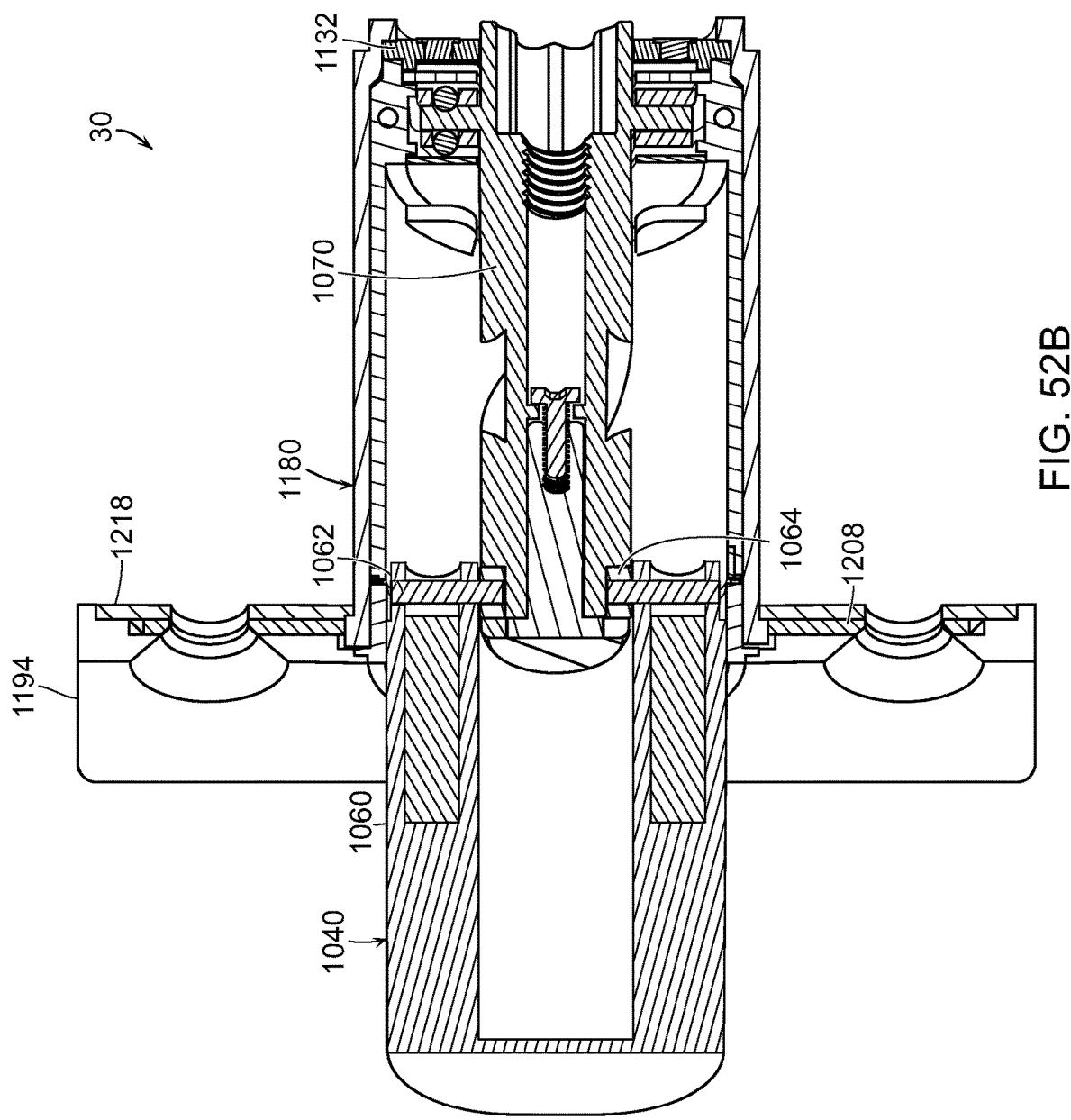
FIG. 52B is a cross-sectional view of the deadbolt assembly showing the bolt element disposed in a deployed position.

When fully assembled, the dead bolt assembly 30 is as shown in FIGS. 4A-4C and 52A and 52B. The dead bolt assembly 30 when assembled can be mounted within the transverse bore 20. The bolt assembly when mounted as such does not extend significantly or primarily within the central bore 18, and preferably does not extend at all within the central bore or only nominally into the central bore 18. The movement of the dial elements 260, 600 of the inner and outer bezel assemblies and/or actuation of the primary motor results in rotational energy being transferred therefrom, through the gear assemblies of the motor chassis assembly 520, to the spline gear 530. The end adapter portion 1076 of the bolt helix 1070 interfaces with the spline gear 530 and the twist lock feature 1186 of the outer housing enclosure 1180, see FIGS. 41, 48, and 49, engages and locks with the trim ring 532. The rotational energy of the spline gear is transferred to the bolt helix 1070. The thrust bearings 1102, 1132 are disposed on either side the flange 1074 of the bolt helix 1070 in order to allow easy relative rotation of the bolt helix when rotationally driven by the spline gear. As shown in FIGS. 52A and 52B, the cam followers 1064, 1064 of the bolt element 1040 seat within the spiral groove 1086 formed on the outer surface of the bolt main body. When the bolt helix 1070 rotates, the cam followers 1064 follow the spiral groove 1086 and translate the rotational movement of the spline gear 530 and bolt helix 1070 into axial movement of the bolt element 1040 between a retracted position (FIG. 52A) and a deployed position (FIG. 52B). The extended or deployed position hence corresponds to a locked state of the dead bolt assembly and the retracted position corresponds to an unlocked state of the dead bolt assembly. The bolt element 1040 is thus telescopically disposed relative to the bolt helix 1070 and housing 1180 during use. As such, the dead bolt assembly 30 is thus composed of components that are axially stationary as well components that are axially movable relative to the door panel and other components. Further, the sensors 1152 associated with the flex circuit 1138 help sense the rotational position of the bolt helix 1070 and the logic associated with the PCBs correlate that rotational position with the axial position of the bolt element 1040. That is, the control logic associated with the PCBs of the door lock system 10 can determine whether the bolt element 1040 is in the deployed or retracted position based on the sensed rotational position of the bolt helix 1070.

Figure 53:
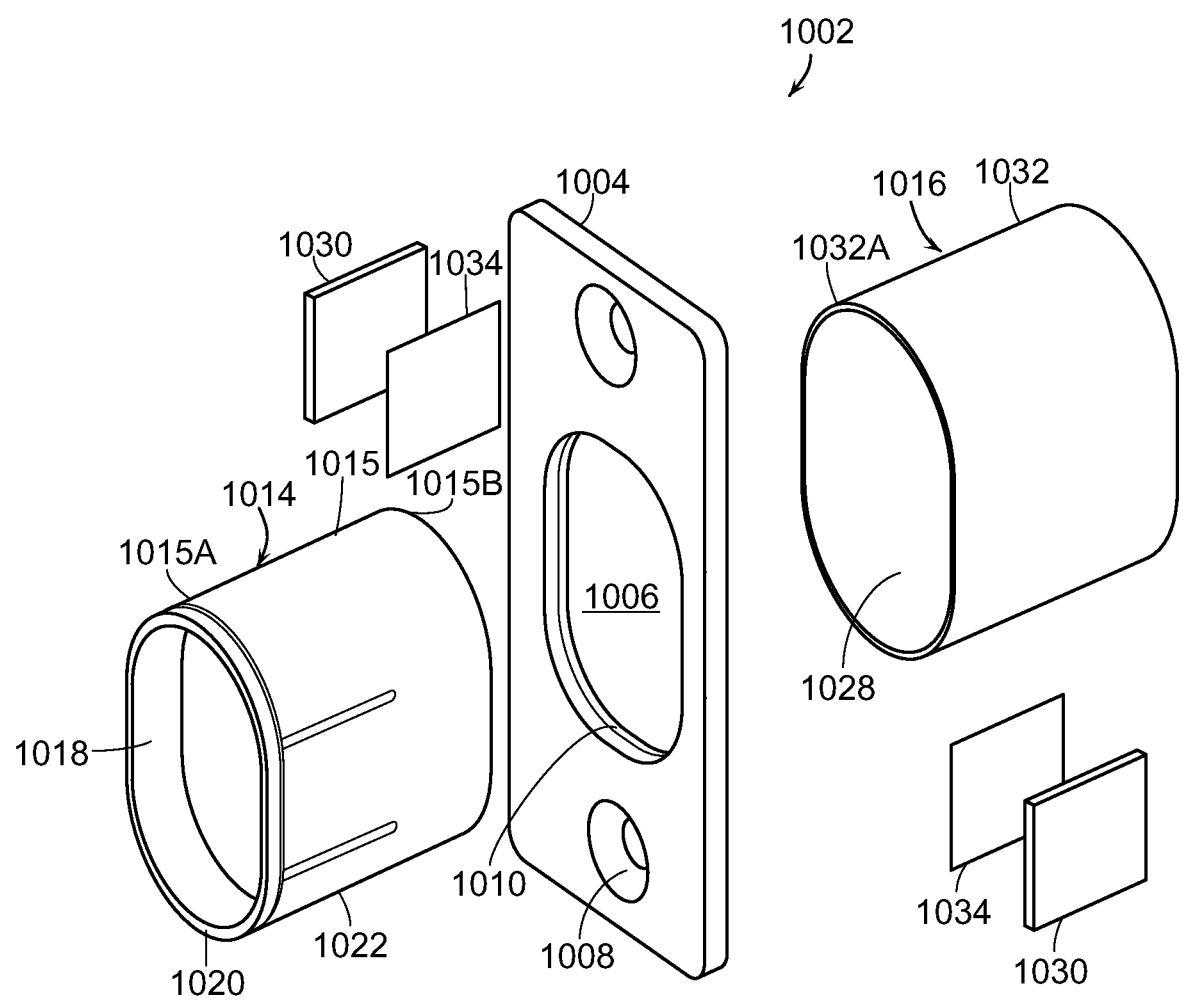
FIG. 53 is an exploded perspective view of the strike cup assembly of the door lock system according to the teachings of the present invention.

As shown in FIGS. 4A and 53, in addition to the dead bolt assembly 30, the door lock system 10 can also include a strike cup assembly 1002 that is mounted within a recess formed in the door frame and which is aligned with the transverse bore 20 formed in the door panel. The illustrated strike cup assembly 1002 includes a face plate 1004 that has a central opening 1006 for seating the bolt element 1040 from the dead bolt assembly 30 and fastener receiving apertures 1008 for receiving and mounting fasteners for securing the strike cup assembly to the door frame. The central opening 1006 also has a lip portion 1010 formed therein. The strike cup assembly 1002 further includes an inner cup housing 1014 and an outer cup housing 1016. The inner cup housing 1014 has a main body 1015 having a first end 1015A that has a central chamber 1018 formed therein that is sized and configured for seating the bolt element 1040 and an opposed second closed end 1015B. The first end 1015A also has a raised lip portion 1020 that is adapted to engage with the raised lip portion 1010 of the face plate 1004. The outer cup housing 1016 has a main body 1032 having a first end 1032A having a chamber 1028 formed therein that is sized and configured for seating the inner cup housing 1014. The inner cup housing 1014 also has an outer surface that has raised surface features 1022 configured to mount magnets 1030 formed on side surfaces thereof. The magnets 1030 can be secured to the housing by any suitable technique, including by employing a suitable adhesive strips 1034. When the inner and outer cup housings are assembled together, the face plate 1004 and the magnets 1030 are sandwiched between the cup housings. The cups can be secured together by any suitable means, such as by ultrasonic welding. The magnets 1030 are adapted to interact with the sensors 1050, 1052 that are mounted in the flex circuit 1138 of the bolt assembly 30 so as to determine, among other things, the position of the door relative to the door frame and the like. That is, the sensors mounted within the dead bolt assembly 30 sense the magnets 1030 mounted within the strike cup assembly 1002, thus enabling the door lock system 10 to determine if the door is open or closed.

The illustrated bolt element 1040 can also include tapered or chamfered edges on the second end 1042B thereof. The dimensions of the bolt element 1040 are small enough so that it only contacts the motor chassis assembly 520 without extending through the main chassis/motor housing. The sensors mounted on the flex circuit 1138 serve to detect the position of the bolt element 1040 so as to determine if the bolt is in a locked or unlocked state. That is, the door lock system 10 can determine if the bolt element 1040 is in the extended or retracted position by determining the rotational position of the flange element 1074 of the bolt element 1040 by sensing the rotational position of the magnets 1082, 1084 mounted therein with the sensor 1148 located on the flex circuit 1138. The bolt axial position is controlled by the rotational position of the flange 692. Further, if desired, the sensors can function as proximity sensors that can determine, sense or detect if the door is open or closed or if the door has been tampered with. According to another practice, the sensors can function as alignment sensors that allow the door lock system to determine the alignment of the dead bolt assembly 30 with the door frame. Alternatively, separate sensors can be provided for this purpose. According to one practice, the sensors 1150, 1152 sense the presence or absence of the magnets 1030 of the strike cup assembly 1002, thus sensing the alignment of the door with the door frame. The use of the sensors to determine the position of the bolt element and the alignment sensors (if provided separately) can be used to determine whether the door is disposed in the locked or unlocked states. When the door is disposed in the unlocked state, the door lock system of the present invention uses the alignment/location sensors to let the user know if the bolt element is aligned with the strike cup assembly mounted within the frame. It is only when they are aligned that the lock system provides notification to the owner or user that the owner can lock the door. This feature also helps prevent damage to the bolt or door frame in the case of partial door closure by detecting an improper alignment condition between the bolt and strike cup. When detected, the system can prevent actuation.

According to another practice of the present invention, the door lock system 10 can automatically lock and unlock a door to a dwelling. When performing an automatic unlocking operation, the door lock system does not require that the owner manually manipulate any portion of the assembly, such as for example pushing on a bezel portion of the system or rotating the dial elements of the inner and outer bezel assemblies. Thus, the bolt element of the dead bolt assembly is released without the owner having to physically interact with the lock.

The auto lock operation can be time based if desired. As a non-limiting example, the door lock system knows that the owner has left the dwelling data from the antennas mounted in the bezel assemblies. In one embodiment the auto lock can be a combination of sensor data and time. In another embodiment geo-fencing is utilized. With geo-fencing, the owner has exited a general or defined geographic space (the geo-fence). The intelligent door lock system determines when the owner is a selected distance away from the system and then the system moves the bolt element into the extended position (i.e., locked state).

In addition to the auto lock mode of operation, the door lock system can also be operated in a non-automatic default mode. With the default mode the owner interacts with the system, such for example by pushing the transmissive member to lock and or unlock the door. As a non-limiting example the default mode can occur when the owner is working within a selected distance from the door, and the user does not wish the electronic device to continue to interact with the door when within this defined distance, thus avoiding for example the door from repeatedly switching in an unwanted manner between locked and unlocked states. In this situation the default mode can be utilized. The owner thus has the option of using the automatic mode or the default mode.

In one embodiment, geo-fencing is used to wake up the lock system when a user is near the door lock system of the present invention. Geo-fencing provides a start-up or activation of the lock system before the owner is in Bluetooth range. Geo-fencing is not needed when the owner is within Bluetooth connection range with the owner's mobile device.

In one embodiment, the lock system is initiated for start-up mode outside of the Bluetooth range. In one embodiment the lock system utilizes auto lock and unlock with geo-fencing. This is an option for an automatic unlock that does not require the owner to push, touch or have any physical contact with the door lock system. A user typically approaches the door with the mobile device (electronic device) and needs to physically interact with the system, such as for example pushing the transmissive member of the outer bezel assembly to unlock or lock the door. Additionally, the user need not do anything with the mobile device since everything is automatic. In this manner, the bolt element is released without the owner having to interact with the lock. There is Bluetooth communication between the lock system and the mobile device as the owner approaches the lock.

In another embodiment, because the mobile device with the software application determines that the owner is approaching the dwelling and that the door lock system is operating correctly, the system can activate other devices in the dwelling, including but not limited to air conditioning, lighting, heating and the like. This is done when there is a proper Bluetooth connection.

The door lock system of the present invention thus provides a modular unit that works as an intelligent door lock system, with the connectors and electrical components mounted within the unit. This is achieved by having floating sub-systems that couple to each other without the need for external connections, without cables or wires. The dead bolt assembly 30 also is not mounted within the central bore 18 but rather is mounted within the transverse bore 20. This is achieved by providing for a bolt element that is telescopically mounted and hence movable relative to the bolt helix. Those of ordinary skill in the art will readily recognize that other arrangements of the bolt elements and bolt helix can be employed to effectuate the telescoping arrangement. For example, the components can employ a pinion and ratchet arrangement, a lid screw, and the like. Further, the dead bolt assembly 30 is an intelligent bolt assembly since it employs sensors and electrical and mechanical systems and subsystems.

As used herein, the term "electronic device" can include for example, a mobile device, any type or form of computing device or computer, a hand-held electronic device such as key fob and the like. As used herein the term mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device. For purposes of this application, a mobile device is also defined to include a fob, and its equivalents.

As used herein, the term computer or computing device is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

The door lock system of the present invention employs processing capabilities that can be implemented by one or more processors or controllers. The processors can be hard-wired or can employ a software engine to implement the control processes of the present invention. As used herein, the term engine refers to software, firmware, hardware, or other component that can be used to effectuate a purpose. The engine can typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program can include calls to hardware components (such as I/O devices), which typically requires the execution of drivers. The drivers may or may not be considered part of the engine, but the distinction is not critical. Further, information associated with the door lock system of the present invention can be stored in part locally on the device or can be stored remotely in one or more databases. An example of a suitable software engine and system for gathering or collating information which can then be used to control the door lock system of the present invention can be found in U.S. Publ. No. 2014/0239647, Ser. No. 14/194,284, the contents of which are herein incorporated by reference.

As used herein, the term database is used broadly to include any known or convenient means for storing data, whether centralized or distributed, relational or otherwise.

According to one embodiment, the door lock system 10 of the present invention can be cloud based. In another embodiment, the system can be Network System based. An IOS application can be responsible for communicating to the door lock system of the present invention via the local Bluetooth connection. Hence, the interaction between the system and the electronic device, such as a mobile device, can be via a Bluetooth connection. Further, the software application on the mobile device can function as a communication conduit between the user and the door lock system. Hence, the software application can be in essence a surrogate for the door lock system.

The cloud based service can be responsible for example for managing the user's account. This enables an owner/user to use the mobile device and third party mobile devices. Further, the backend account service cannot remotely activate the door lock system to perform a selected function, such as for example, unlocking the door. Instead, the owner can grant permission to the account service. The account service is simply a repository for account information, settings, and other information or data that is not essential to the day to day operation of the door lock system.

Further, according to the teachings of the present invention, remote operation of the door lock system can be through a lock service that runs in the cloud. The lock can thus call out to the lock service and maintain a bi-directional communication through the electronic device. In one embodiment, the owner has an open phone type line subject to cancellation by the owner. The door lock system can thus reach out to establish the communication link. The back end service can thus be divided into two elements—the account service and the lock service. A logging service can also be provided.

A new user of the door lock system 10 of the present invention can create an account via the cloud or Network System. This account enables the owner to communicate with a lock system back end, also known as an account service, such as for example through an IOS software application. In one embodiment the account service can be responsible for signing into the software application (app) and to permit creation of the account. In one embodiment this includes metadata, user first and last name, phone number and the like. After a user account is created the user directed to a user interface that displays a representation of the door lock systems in a particular dwelling. In one embodiment, the user interface is the user's mobile device display.

An account database is responsible for invitations created by the user and not the lock system. The user can via the user interface allow other users to access the door lock system. This can be achieved for example with a user list at the mobile device. The software application via one or more services can enable a user to invite someone into the dwelling and determine a specific role by granting access privileges through the door lock system. Different roles can have different permissions. As a non-limiting example, a guest can have access permissions for time of day, week, how long, and the like. This is part of the account service.

In one embodiment, as part of the registration process, the account service can issue a user a certificate specific to the user's mobile device. This is part of the security provided by the lock system. In one embodiment the lock system uses a combination of PKI and certificates to maintain secure communications between mobile devices, the Cloud or Network system and to the lock. The account service is responsive for logging, history, storage of metric data. As a non-limiting example, the last "X" number of people who accessed the lock can be provided. Such as the last 20 people who accessed the lock.

Furthermore, a lock service of the door lock system of the present invention can communicate with the system. The lock service is a socket application and maintains bi-directionality between the lock and the Cloud server. The lock calls homes and establishes this two way connection. However, the account service does not call the building. Instead, the lock calls out and establishes the socket connection. The net result is the user does not have to do any configuration to open its network. This prevents the creation of security holes in the owner's web based internal system.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is.

We claim:

1. A door lock system for mounting within a central opening formed in a door panel, the door panel further including a transverse opening formed therein that is transverse to the central opening and which communicates therewith, comprising
    an inner bezel assembly mounted to an inner surface of the door panel and being sized and configured for mounting within the central opening, the inner bezel assembly having an inner bezel unit that is mounted to the inner surface of the door and having an inner opening that communicates with the central opening of the door, and a removable puck assembly that is mounted within the inner opening of the bezel assembly and within the central opening of the door, wherein the puck assembly includes a display assembly having associated therewith an electronic display assembly that is mounted within an outer housing assembly,
    an outer bezel assembly that is coupled to an outer surface of the door panel and to the inner bezel assembly and wherein a portion of the outer bezel assembly is sized and configured for seating within the central opening of the door, and
    a deadbolt assembly sized and configured for mounting within the transverse opening formed in the door panel and having a bolt element movable between an unlocked position and a locked position,
    wherein the deadbolt assembly is coupled to the outer bezel assembly via a twist-lock connection feature, and
    wherein the deadbolt assembly is sized and configured for seating only within the transverse opening of the door panel.

2. The door lock system of claim 1, wherein the inner bezel unit includes a security plate that mounts to the inner surface of the door panel, a bearing ring that is coupled to the security plate, and a gear ring that is rotatably coupled to the bearing ring for rotating therewith, and a dial element that is coupled to the gear ring and is rotatable therewith, wherein rotational movement of the dial element results in rotational movement of the gear ring.

3. The door lock system of claim 2, wherein the inner bezel unit further includes a pinion gear assembly that is coupled to the security plate and is rotationally coupled to the gear ring, the pinion gear assembly includes a pinion gear ring that is rotationally coupled to the gear ring and a drive element that is coupled to the pinion gear and rotates therewith and which extends outwardly from a rear surface of the security plate, wherein the drive element is coupled to the outer bezel assembly, and wherein rotational movement of the dial element results in rotational movement of the pinion gear and the drive element for transferring the rotational movement of the dial to the outer bezel assembly.

4. The door lock system of claim 1, wherein the inner bezel unit includes
- a plate that mounts to the inner surface of the door panel, the plate having a front surface and a peripheral side surface, the peripheral side surface having an arcuate shaped slot formed therein, wherein the plate further has a central opening formed therein,
- a torque link assembly that is coupled to the front surface of the plate and wherein a portion of the torque link assembly seats within the arcuate slot,
- a gear cover having a central opening formed therein that is coupled to the plate and when mounted thereto the central opening of the plate is aligned with the central opening of the gear cover, and wherein a rear surface of the gear cover includes a latch housing portion having a slot formed therein that communicates with the central opening and front surface having an ejector opening formed therein, and
- an outer washer cover that is coupled to the plate and which is sized and configured for overlying a portion of the front surface of the plate and the peripheral side surface of the plate, wherein the outer washer has a connection element that is connected to at least a portion of the torque link assembly for moving the torque link assembly within the arcuate slot.

5. The door lock system of claim 4, further comprising a latch assembly that is coupled to the latch housing portion of the gear cover and which seats at least partly within the slot formed therein and is coupled to the torque link assembly, wherein rotational movement of the outer washer cover moves at least a portion of the torque link assembly within the arcuate slot via the connection element, and wherein movement of at least a portion of the torque link assembly within the arcuate slot moves the latch assembly within the slot formed in the latch housing, and wherein the latch assembly can be moved between a deployed position and a retracted position.

6. A door lock system for mounting within a central opening formed in a door panel, the door panel further including a transverse opening formed therein that is transverse to the central opening and which communicates therewith, comprising
- an inner bezel assembly mounted to an inner surface of the door panel having an inner bezel unit that is mounted to the inner surface of the door and having an inner opening that communicates with the central opening, and a removable puck assembly that is mounted within the inner opening of the bezel assembly, wherein the puck assembly includes an electronic display assembly mounted within an outer housing assembly,
- an outer bezel assembly that is coupled to an outer surface of the door panel and to the inner bezel assembly, wherein the outer bezel assembly includes an electronic display assembly, and
- a deadbolt assembly coupled to the outer bezel assembly and having a bolt element that is movable between an unlocked position and a locked position by one or more of the inner bezel assembly and the outer bezel assembly, and
wherein the deadbolt assembly is sized and configured for seating only within the transverse opening of the door panel.

7. The door lock system of claim 6, wherein the inner bezel unit includes a security plate that mounts to the inner surface of the door panel, a bearing ring that is coupled to the security plate, and a gear ring that is rotatably coupled to the bearing ring for rotating therewith, and a dial element that is coupled to the gear ring and is rotatable therewith, wherein rotational movement of the dial element results in rotational movement of the gear ring.

8. The door lock system of claim 7, wherein the inner bezel unit further includes a pinion gear assembly that is coupled to the security plate and is rotationally coupled to the gear ring, the pinion gear assembly includes a pinion gear ring that is rotationally coupled to the gear ring and a drive element that is coupled to the pinion gear and rotates therewith and which extends outwardly from a rear surface of the security plate, wherein the drive element is coupled to the outer bezel assembly, and wherein rotational movement of the dial element results in rotational movement of the pinion gear and the drive element for transferring the rotational movement of the dial to the outer bezel assembly.

9. The door lock system of claim 6, wherein the inner bezel unit comprises
- a plate that mounts to the inner surface of the door panel, the plate having a front surface having a central plate opening formed therein and a peripheral side surface, the peripheral side surface having an arcuate shaped slot formed therein,
- a torque link assembly that is coupled to the front surface of the plate and wherein a portion of the torque link assembly seats within the arcuate slot,
- a gear cover having a central opening formed therein that is coupled to the plate and when mounted thereto the central plate opening is aligned with the central opening of the gear cover, and wherein a rear surface of the gear cover includes a latch housing portion having a slot formed therein that communicates with the central opening of the gear cover, and wherein the gear cover has a front surface having an ejector opening formed therein, and
- an outer washer cover that is coupled to the plate and which is sized and configured for overlying a portion of the front surface of the plate and the peripheral side surface of the plate, wherein the outer washer has a connection element formed along an inner surface that is connected to at least a portion of the torque link assembly that is seated within the arcuate shaped slot for moving the torque link assembly therein.

10. The door lock system of claim 9, wherein the torque link assembly comprises a torque link element that is coupled to the front surface of the plate, wherein the torque link element has a main body having a first end that seats within the arcuate shaped groove and an opposed second end that seats on the front surface of the plate,
- a biasing element that is coupled to the main body of the torque link for biasing the torque link in a selected direction,
- a movable ejection ramp having a slanted ramp-like groove formed therein and which is coupled to the second end of the torque link,
- a movable latch cam being coupled to the front surface of the plate and to the ejection ramp, and
- a movable ejector element having a post that extends outwardly from a main body thereof and which seats within the ramp-like groove of the ejection ramp, wherein at least a portion of the main body of the ejector element seats within the ejector opening formed in the gear cover.

11. The door lock system of claim 10, further comprising a latch assembly coupled to the latch housing portion of the gear cover and to the torque link assembly.

12. The door lock system of claim 11, wherein the latch assembly comprises a latch element that is movable between a deployed position and a retracted position by the torque link assembly, the latch element having a pair of opposed leg portions each having a retaining plate coupled thereto, and wherein a biasing element is coupled to each leg portion of the latch element for providing a biasing force for moving the latch element into the deployed position.

13. The door lock system of claim 12, wherein the latch cam of the torque link assembly is coupled to one of the retaining plates, such that rotational movement of the washer cover moves the torque link element disposed within the arcuate slot via the connection element, wherein the arcuate slot defines the maximum extent of movement of the washer cover.

14. The door lock system of claim 13, wherein movement of the torque link element by the washer cover moves the ejection ramp, and wherein movement of the ejection ramp moves the latch cam which is engaged with the retaining plate, and wherein movement of the retaining plate by the latch cam moves the latch element in the slot from the deployed position to the retracted position.

15. The door lock system of claim 6, wherein the inner bezel assembly has a central opening and further comprises a torque link assembly and a latch assembly coupled to the torque link assembly, wherein the latch assembly includes a latch element movable by the torque link assembly between a deployed position where the latch element extends into the central opening and a retracted position where the latch element is at least partly removed from the central opening, wherein movement of the latch element from the deployed position to the retracted position enables the puck assembly to be removed from the inner bezel assembly.

16. A door lock system for mounting within a central opening formed in a door panel, the door panel further including a transverse opening formed therein that is transverse to the central opening and which communicates therewith, comprising
   an inner bezel assembly mounted to an inner surface of the door panel having an inner bezel unit that is mounted to the inner surface of the door and having an inner opening that communicates with the central opening, and an assembly that is mounted within the inner opening of the bezel assembly having an electronic display assembly,
   an outer bezel assembly that is coupled to an outer surface of the door panel and to the inner bezel assembly, wherein the outer bezel assembly includes an electronic display assembly, and
   a deadbolt assembly coupled to the outer bezel assembly and to the inner bezel assembly and having a bolt element that is movable between an unlocked position and a locked position by one or more of the inner bezel assembly and the outer bezel assembly, and
   wherein the deadbolt assembly is sized and configured for seating only within the transverse opening of the door panel.

* * * * *